US009899040B2

(12) United States Patent
Levien et al.

(10) Patent No.: US 9,899,040 B2
(45) Date of Patent: *Feb. 20, 2018

(54) METHODS AND SYSTEMS FOR MANAGING ADAPTATION DATA

(71) Applicant: Elwha LLC, Bellevue, WA (US)

(72) Inventors: Royce A. Levien, Lexington, MA (US); Richard T. Lord, Tacoma, WA (US); Robert W. Lord, Seattle, WA (US); Mark A. Malamud, Seattle, WA (US)

(73) Assignee: ELWHA, LLC, Bellevue, WA (US)

( * ) Notice: Subject to any disclaimer, the term of this patent is extended or adjusted under 35 U.S.C. 154(b) by 327 days.

This patent is subject to a terminal disclaimer.

(21) Appl. No.: 13/662,125

(22) Filed: Oct. 26, 2012

(65) Prior Publication Data
US 2013/0325454 A1 Dec. 5, 2013

Related U.S. Application Data

(63) Continuation-in-part of application No. 13/485,738, filed on May 31, 2012, which is a continuation of
(Continued)

(51) Int. Cl.
G10L 15/06 (2013.01)
G10L 99/00 (2013.01)
(Continued)

(52) U.S. Cl.
CPC ............ *G10L 99/00* (2013.01); *G06F 17/28* (2013.01); *G06F 17/289* (2013.01);
(Continued)

(58) Field of Classification Search
CPC ...... G10L 15/06; G10L 15/063; G10L 15/065
(Continued)

(56) References Cited

U.S. PATENT DOCUMENTS 4,972,485 A 11/1990 Dautrich et al.
5,214,615 A * 5/1993 Bauer ..................... 367/128
(Continued)

FOREIGN PATENT DOCUMENTS

| CN | 10-1075434 A | 11/2007 |
|---|---|---|
| EP | 1 205 906 A1 | 5/2002 |
| EP | 2 405 422 A1 | 1/2012 |

OTHER PUBLICATIONS

PCT International Search Report; International App. No. PCT/US13/48640; dated Jan. 14, 2014; pp. 1-2.
(Continued)

*Primary Examiner* — Samuel G Neway

(57) ABSTRACT

Computationally implemented methods and systems include managing adaptation data, wherein the adaptation data is correlated to at least one aspect of speech of a particular party, facilitating transmission of the adaptation data to a target device, in response to an indicator related to a speech-facilitated transaction of a particular party, wherein the adaptation data is correlated to at least one aspect of speech of the particular party, and determining whether to update the adaptation data, said determination at least partly based on a result of at least a portion of the speech-facilitated transaction In addition to the foregoing, other aspects are described in the claims, drawings, and text.

37 Claims, 36 Drawing Sheets

Related U.S. Application Data application No. 13/485,733, filed on May 31, 2012, application No. 13/662,125, which is a continuation-in-part of application No. 13/538,866, filed on Jun. 29, 2012, which is a continuation of application No. 13/538,855, filed on Jun. 29, 2012, application No. 13/662,125, which is a continuation-in-part of application No. 13/564,649, filed on Aug. 1, 2012, which is a continuation of application No. 13/564,647, filed on Aug. 1, 2012, application No. 13/662,125, which is a continuation-in-part of application No. 13/564,651, filed on Aug. 1, 2012, which is a continuation of application No. 13/564,650, filed on Aug. 1, 2012, application No. 13/662,125, which is a continuation-in-part of application No. 13/609,142, filed on Sep. 10, 2012, which is a continuation of application No. 13/609,139, filed on Sep. 10, 2012, application No. 13/662,125, which is a continuation-in-part of application No. 13/609,145, filed on Sep. 10, 2012, which is a continuation of application No. 13/609,143, filed on Sep. 10, 2012.

(51) Int. Cl.
| | | |
|---|---|---|
| *G06F 17/28* | (2006.01) | |
| *G10L 15/065* | (2013.01) | |
| *G10L 15/22* | (2006.01) | |
| *G10L 15/187* | (2013.01) | |

(52) U.S. Cl.
CPC .......... *G10L 15/065* (2013.01); *G10L 15/06* (2013.01); *G10L 15/063* (2013.01); *G10L 15/187* (2013.01); *G10L 2015/227* (2013.01); *G10L 2015/228* (2013.01)

(58) Field of Classification Search
USPC .................................. 704/200–504
See application file for complete search history.

(56) References Cited

U.S. PATENT DOCUMENTS

| | | | |
|---|---|---|---|
| 5,794,189 A | 8/1998 | Gould | |
| 5,970,451 A | 10/1999 | Lewis et al. | |
| 6,006,183 A * | 12/1999 | Lai et al. | 704/235 |
| 6,493,506 B1 * | 12/2002 | Schoner et al. | 386/334 |
| 6,823,306 B2 * | 11/2004 | Reding et al. | 704/244 |
| 7,099,825 B1 * | 8/2006 | Cook | 704/251 |
| 7,162,414 B2 | 1/2007 | Stanford | |
| 7,174,298 B2 * | 2/2007 | Sharma | 704/270.1 |
| 7,191,133 B1 * | 3/2007 | Pettay | 704/270 |
| 7,194,409 B2 | 3/2007 | Balentine et al. | |
| 7,219,058 B1 | 5/2007 | Rose et al. | |
| 7,243,070 B2 * | 7/2007 | Hoffmann et al. | 704/251 |
| 7,346,151 B2 * | 3/2008 | Erhart et al. | 379/88.14 |
| 7,660,715 B1 * | 2/2010 | Thambiratnam | 704/244 |
| 7,949,529 B2 * | 5/2011 | Weider et al. | 704/270 |
| 8,032,383 B1 * | 10/2011 | Bhardwaj et al. | 704/275 |
| 8,082,147 B2 * | 12/2011 | Parthasarathy et al. | 704/231 |
| 8,374,867 B2 * | 2/2013 | Ljolje et al. | 704/244 |
| 8,843,371 B2 * | 9/2014 | Levien et al. | 704/244 |
| 9,171,541 B2 | 10/2015 | Kennewick et al. | |
| 2001/0039494 A1 | 11/2001 | Burchard et al. | |
| 2002/0019734 A1 * | 2/2002 | Bartosik | 704/231 |
| 2002/0065656 A1 | 5/2002 | Reding et al. | |
| 2002/0091511 A1 * | 7/2002 | Hellwig et al. | 704/201 |
| 2002/0138265 A1 * | 9/2002 | Stevens et al. | 704/251 |
| 2002/0138274 A1 * | 9/2002 | Sharma | 704/270 |
| 2002/0147579 A1 | 10/2002 | Kushner et al. | |
| 2002/0188446 A1 | 12/2002 | Gao et al. | |
| 2003/0050783 A1 * | 3/2003 | Yoshizawa | 704/270.1 |
| 2003/0088421 A1 | 5/2003 | Maes et al. | |
| 2003/0093281 A1 | 5/2003 | Geilhufe et al. | |
| 2003/0115289 A1 | 6/2003 | Chinn et al. | |
| 2003/0191639 A1 * | 10/2003 | Mazza | 704/231 |
| 2004/0064316 A1 * | 4/2004 | Gallino | 704/251 |
| 2004/0088162 A1 * | 5/2004 | He et al. | 704/235 |
| 2004/0148165 A1 | 7/2004 | Beyerlein | |
| 2004/0158457 A1 * | 8/2004 | Veprek et al. | 704/201 |
| 2004/0162726 A1 | 8/2004 | Chang | |
| 2004/0176953 A1 * | 9/2004 | Coyle et al. | 704/253 |
| 2004/0199388 A1 | 10/2004 | Armbruster et al. | |
| 2004/0203651 A1 | 10/2004 | Qu et al. | |
| 2005/0049868 A1 * | 3/2005 | Busayapongchai | 704/251 |
| 2005/0058435 A1 * | 3/2005 | Chung et al. | 386/95 |
| 2005/0144255 A1 | 6/2005 | Hennecke | |
| 2005/0152565 A1 * | 7/2005 | Jouppi et al. | 381/309 |
| 2006/0121949 A1 | 6/2006 | Awada et al. | |
| 2007/0136069 A1 * | 6/2007 | Veliu | G10L 15/065 704/270 |
| 2007/0233487 A1 | 10/2007 | Cohen et al. | |
| 2008/0015848 A1 | 1/2008 | Arizmendi et al. | |
| 2008/0082332 A1 * | 4/2008 | Mallett et al. | 704/250 |
| 2009/0043582 A1 * | 2/2009 | Zhou et al. | 704/257 |
| 2009/0063144 A1 | 3/2009 | Rose et al. | |
| 2009/0204392 A1 | 8/2009 | Ishikawa | |
| 2009/0265217 A1 | 10/2009 | Aurenz | |
| 2009/0290689 A1 | 11/2009 | Watanabe et al. | |
| 2010/0070277 A1 | 3/2010 | Arakawa et al. | |
| 2010/0086108 A1 * | 4/2010 | Jaiswal et al. | 379/88.04 |
| 2010/0131273 A1 | 5/2010 | Aley-Raz et al. | |
| 2010/0204988 A1 | 8/2010 | Xu et al. | |
| 2010/0283829 A1 | 11/2010 | De Beer et al. | |
| 2011/0029307 A1 | 2/2011 | Parthasarathy et al. | |
| 2011/0086631 A1 | 4/2011 | Park et al. | |
| 2011/0119059 A1 | 5/2011 | Ljolje et al. | |
| 2011/0288863 A1 * | 11/2011 | Rasmussen | 704/235 |
| 2012/0010887 A1 * | 1/2012 | Boregowda et al. | 704/250 |
| 2012/0014568 A1 | 1/2012 | Conwell et al. | |
| 2013/0325441 A1 * | 12/2013 | Levien et al. | 704/9 |
| 2013/0325446 A1 * | 12/2013 | Levien et al. | 704/201 |
| 2013/0325447 A1 * | 12/2013 | Levien et al. | 704/201 |
| 2013/0325448 A1 * | 12/2013 | Levien et al. | 704/201 |
| 2013/0325449 A1 * | 12/2013 | Levien et al. | 704/201 |
| 2013/0325450 A1 * | 12/2013 | Levien et al. | 704/201 |
| 2013/0325451 A1 * | 12/2013 | Levien et al. | 704/201 |
| 2013/0325452 A1 * | 12/2013 | Levien et al. | 704/201 |
| 2013/0325453 A1 * | 12/2013 | Levien et al. | 704/201 |
| 2013/0325454 A1 * | 12/2013 | Levien et al. | 704/201 |
| 2013/0325459 A1 * | 12/2013 | Levien et al. | 704/231 |
| 2013/0325474 A1 * | 12/2013 | Levien et al. | 704/251 |
| 2014/0039881 A1 * | 2/2014 | Levien et al. | 704/201 |
| 2014/0039882 A1 * | 2/2014 | Levien et al. | 704/201 |

OTHER PUBLICATIONS

European Patent Office, Supplementary European Search Report, Pursuant to Rule 62 EPC; App. No. EP 13808577; dated Jan. 19, 2016 (received by our Agent on Jan. 25, 2016); pp. 1-2.

Yuasa et al.; "Operating Networked Appliances Using Gaze Information and Voice Recognition"; Proceedings of the Third IASTED International Conference, Human-Computer Interaction, bearing a date of Mar. 17-19, 2008; pp. 107-112; Innsbruck Austria.

The State Intellectual Property Office of P.R.C., First Office Action, App. No. 2013/80034866.8 (Based on PCT Patent Application No. PCT/US2013/048640); dated Dec. 2, 2016 (received by our Agent on Dec. 12, 2016); pp. 1-5 (machine translation, as provided).

Chinese State Intellectual Property Office, Notification of the Second Office Action, App. No. 201380034866.8 (Based on PCT Patent Application No. PCT/US2013/048640); dated Aug. 22, 2017 (received by our Agent on Aug. 29, 2017); pp. 1-5 (machine translation provided).

* cited by examiner

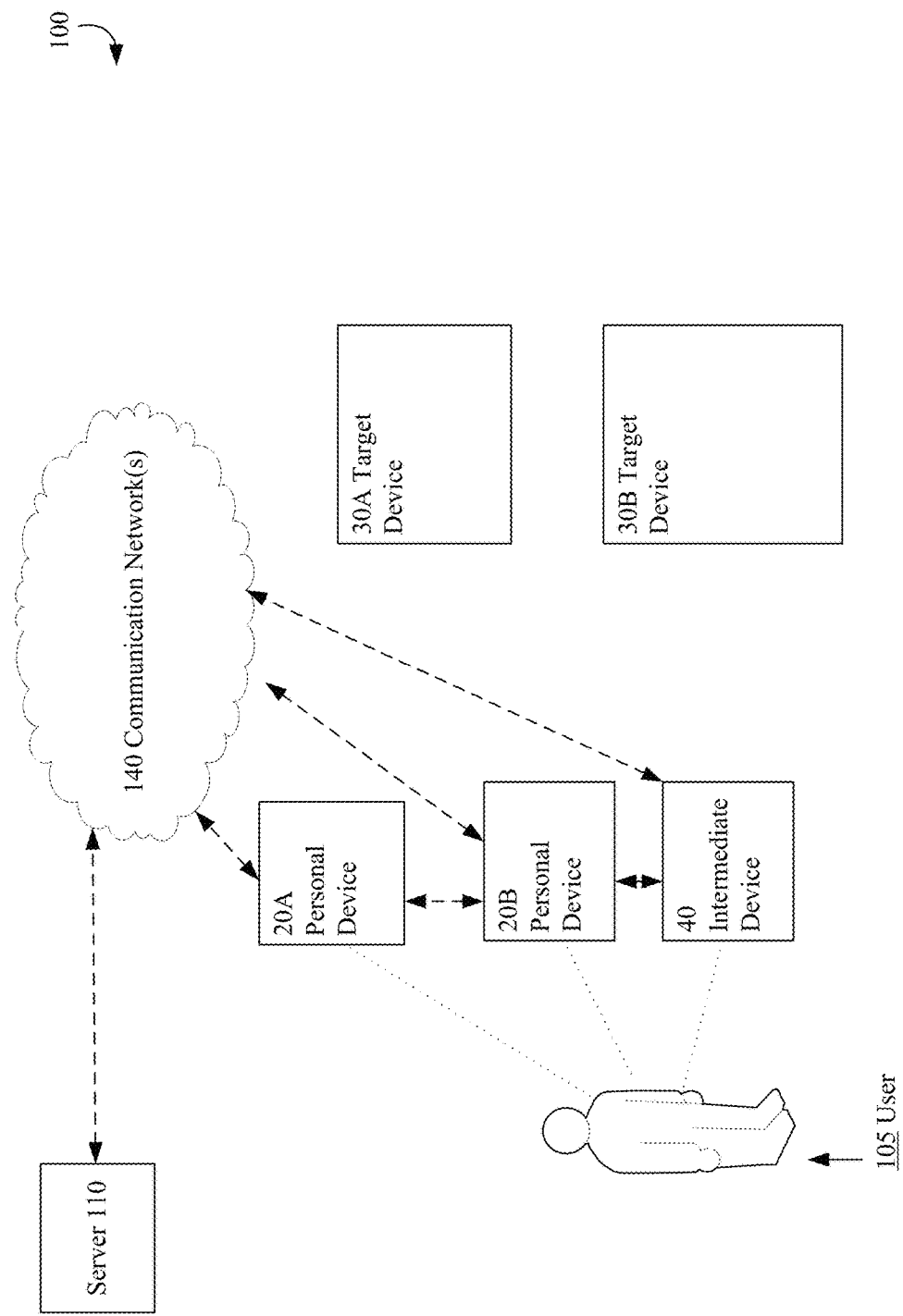

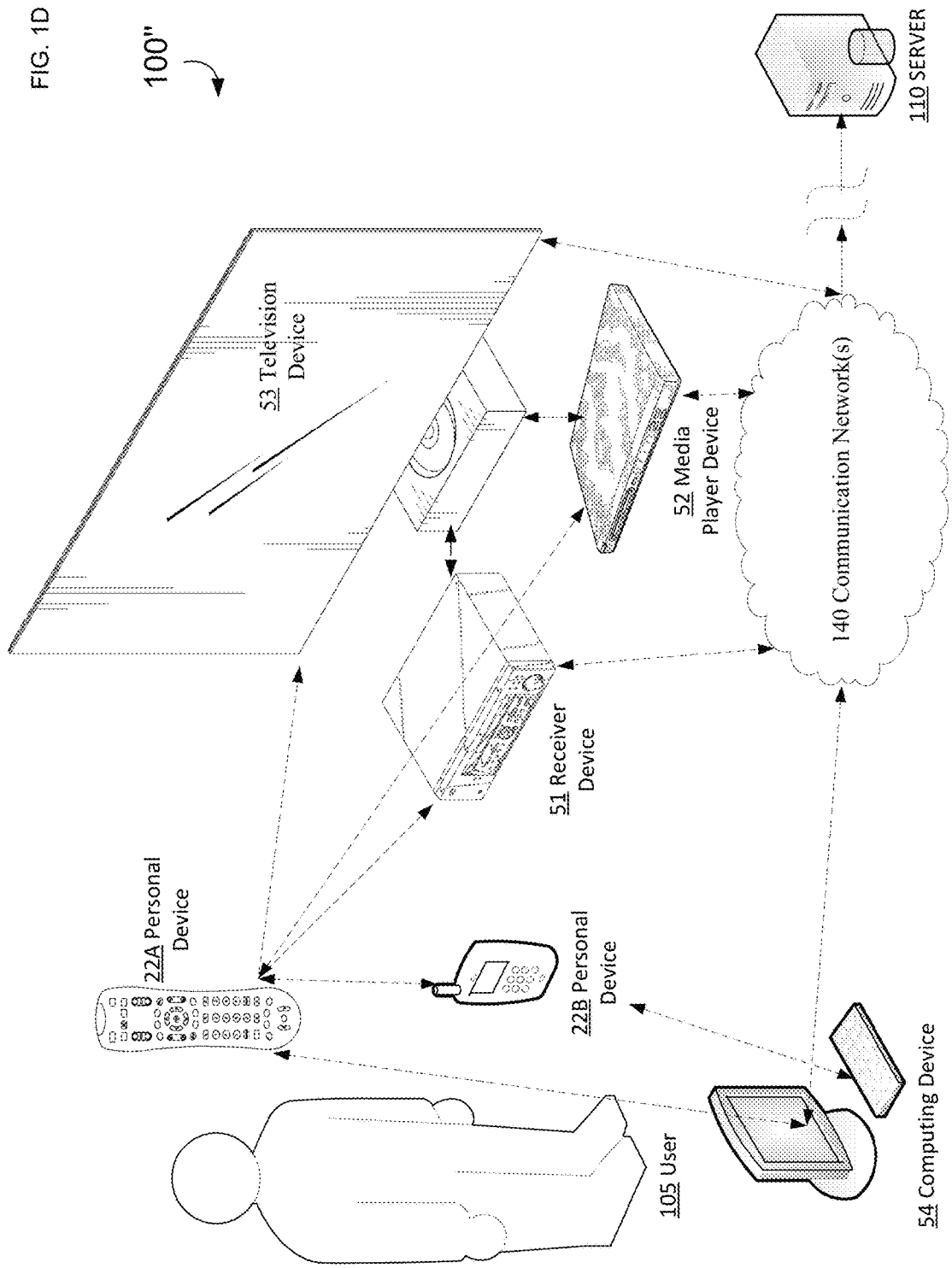

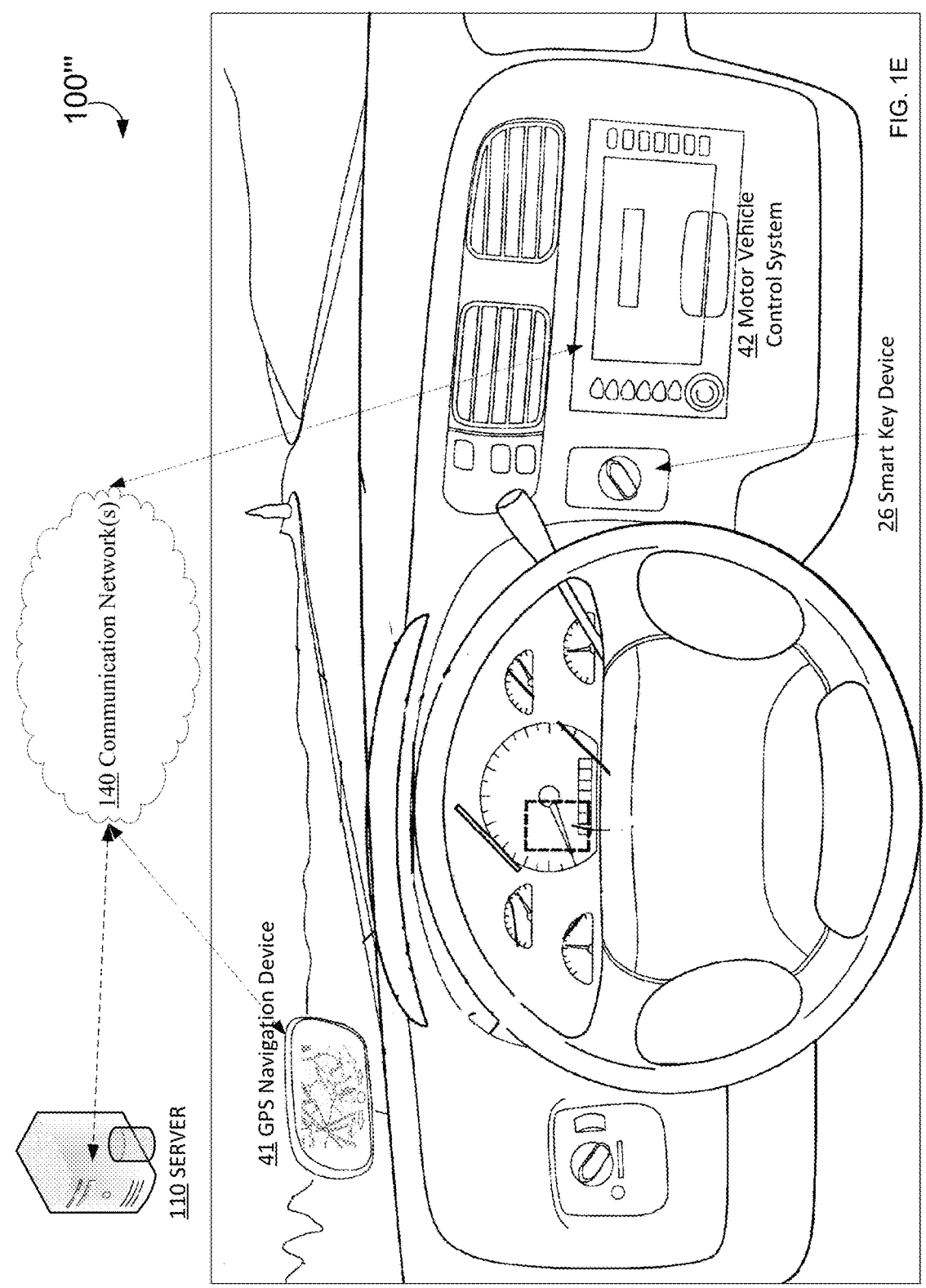

| Fig. 3A | Fig. 3B | Fig. 3C | Fig. 3D |

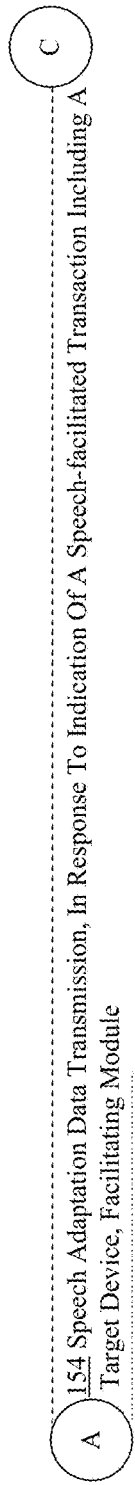

154 Speech Adaptation Data Transmission, In Response To Indication Of A Speech-facilitated Transaction Including A Target Device, Facilitating Module 308 Speech Adaptation Data Transmission, In Response To Indication Of Intention To Conduct A Speech-facilitated Transaction, Facilitating Module 318 Speech Adaptation Data Transmission, In Response To Received Indication Of Intention To Conduct A Speech-facilitated Transaction From A Particular Device, Facilitating Module

Fig. 3

| Fig. 3A | Fig. 3B | Fig. 3C | Fig. 3D |

FIG. 3B

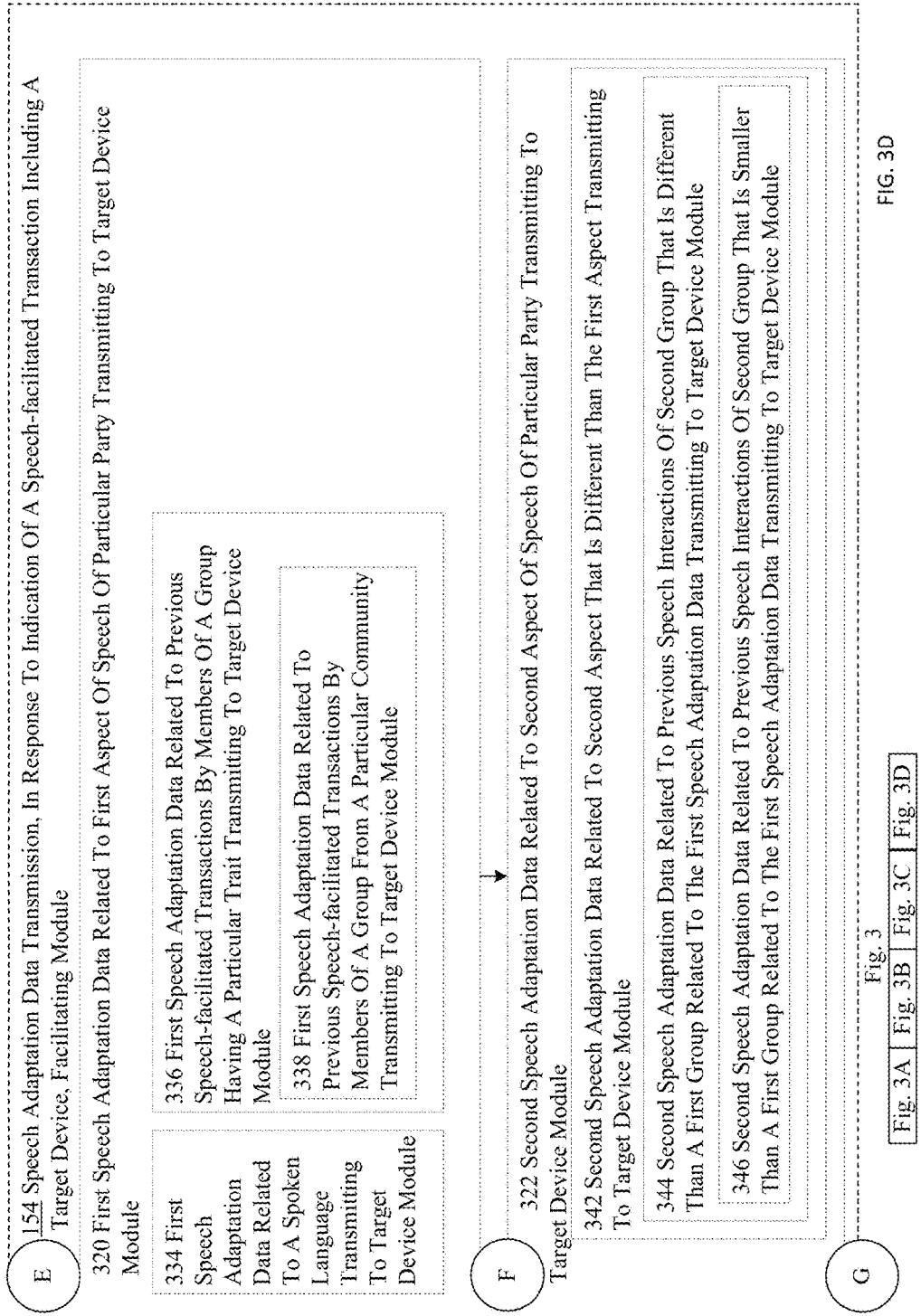

156 Speech Adaptation Data Potential Modification Determining Partly Based On Result Of Portion Of Speech-facilitated Transaction Module

| 402 Speech Adaptation Data Modification Partly Based On Result Of Speech-facilitated Transaction Module | 404 Speech Adaptation Data Determining Against Modification Partly Based On Result Of Portion Of Speech-facilitated Transaction Module | 406 Speech Adaptation Data Potential Modification Determining Partly Based On Result Of Finished Speech-facilitated Transaction Module | 408 Speech Adaptation Data Potential Modification Determining Partly Based On Result Of An Initial Portion Of The Speech-facilitated Transaction Module | 410 Speech Adaptation Data Potential Modification Determining Partly Based On A First Sentence Of The Speech Facilitated Transaction Occurring Prior To A Second Sentence Of The Speech-facilitated Transaction Module | 412 Speech Adaptation Data Potential Modification Determining Partly Based On Result Of Portion Of Speech-facilitated Transaction And Made Before The Speech-facilitated Transaction Ends Module | 414 Speech Adaptation Data Potential Modification Determining Partly Based On Result Of A Portion Of Speech-facilitated Transaction After At Least One Word Is Spoken By The Particular Party Module  416 Speech Adaptation Data Potential Modification Determining Partly Based On Result Of Portion Of Speech-facilitated Transaction And Made Prior To A Particular Word Module |

Fig. 4

| Fig. 4A | Fig. 4B | Fig. 4C | Fig. 4D | Fig. 4E | Fig. 4F | Fig. 4G | Fig. 4H | Fig. 4I |

FIG. 4A

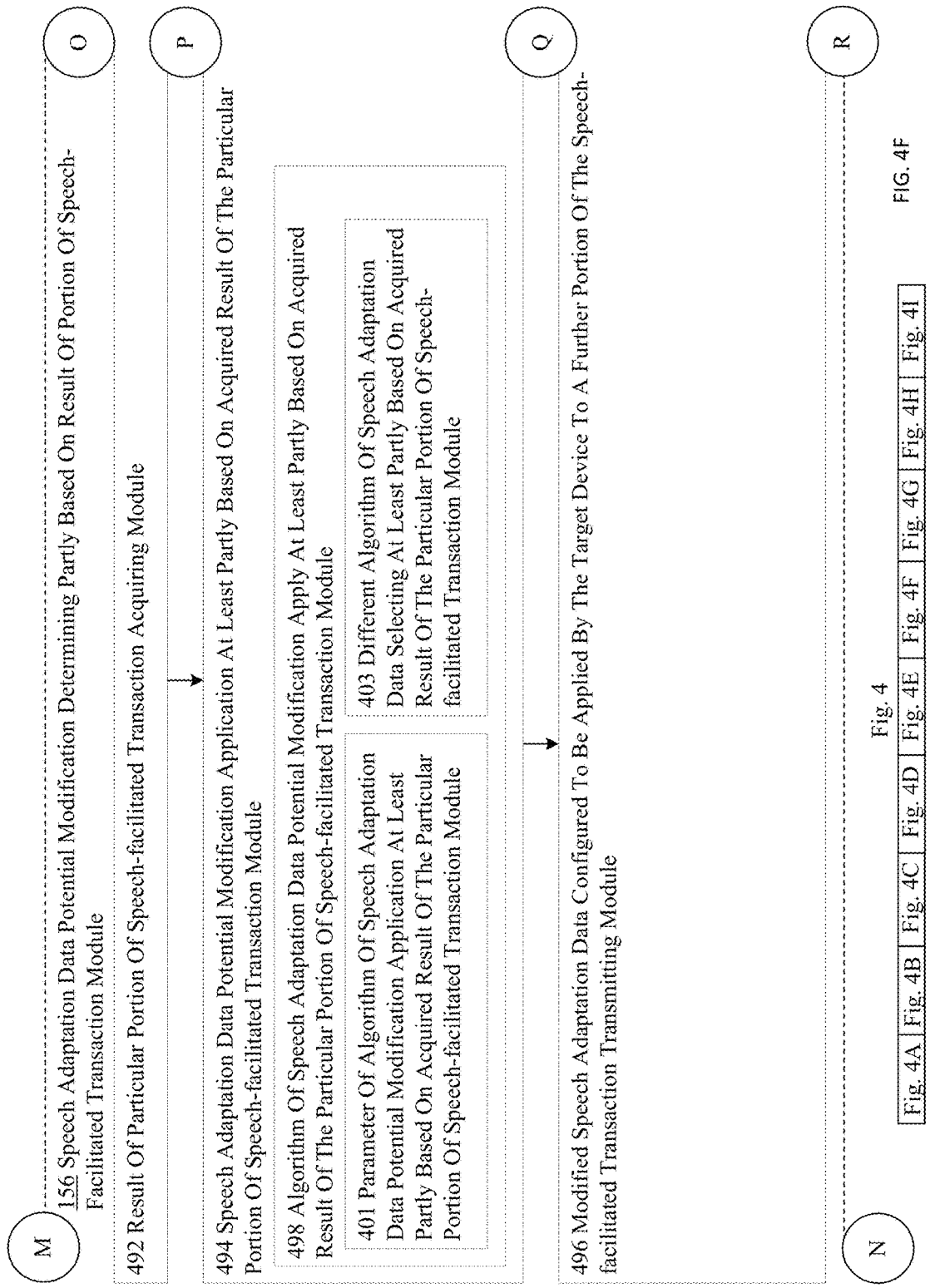

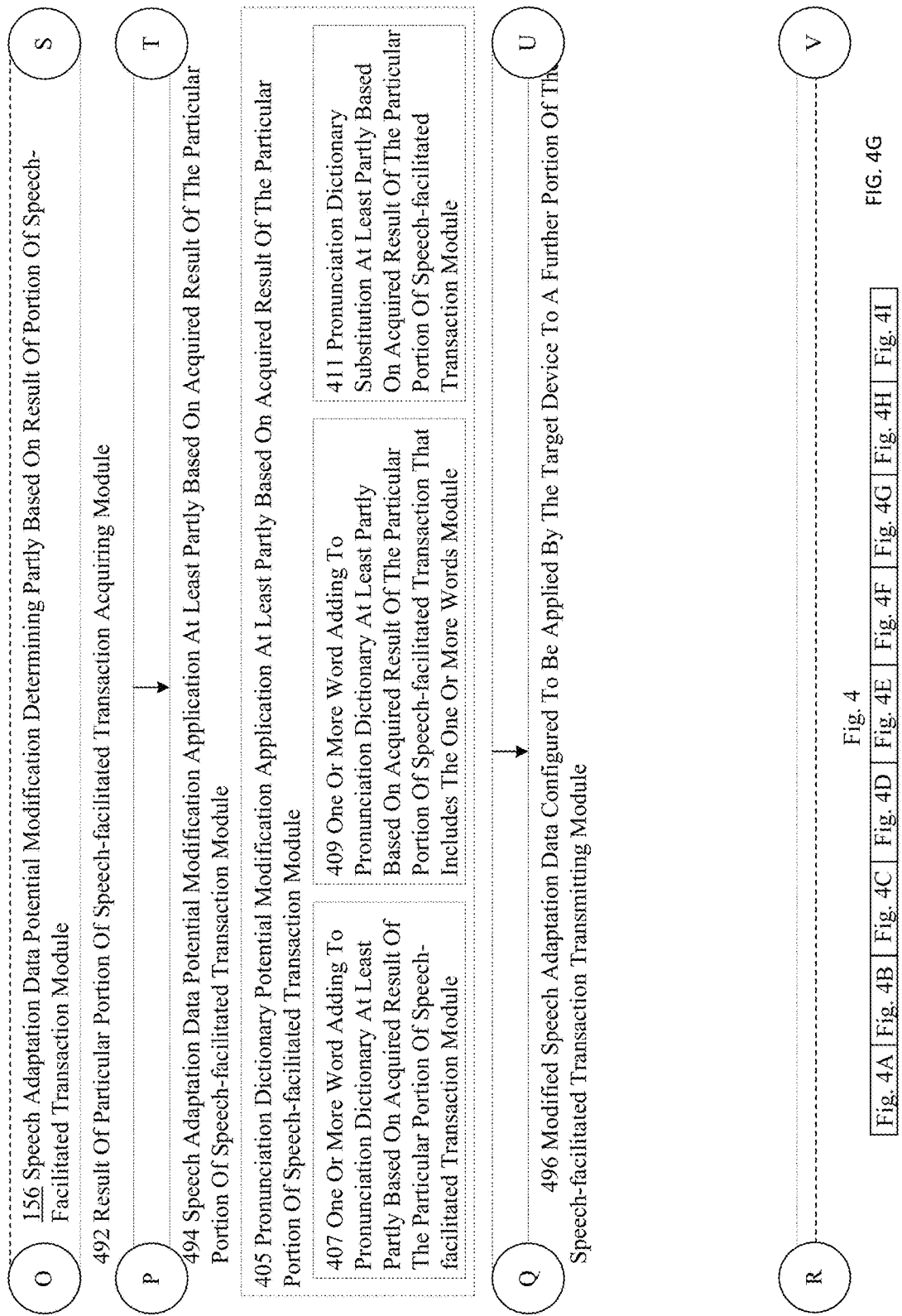

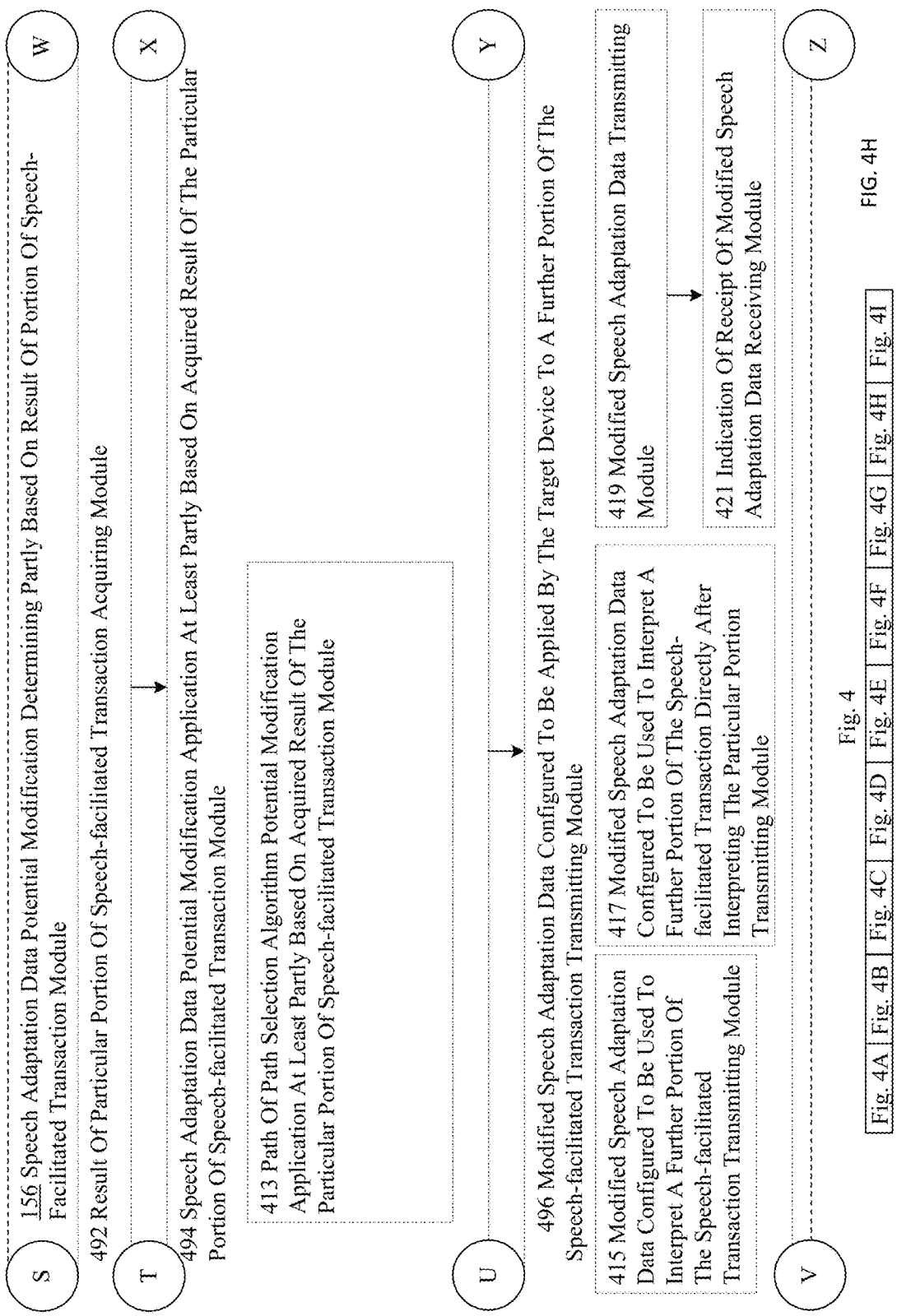

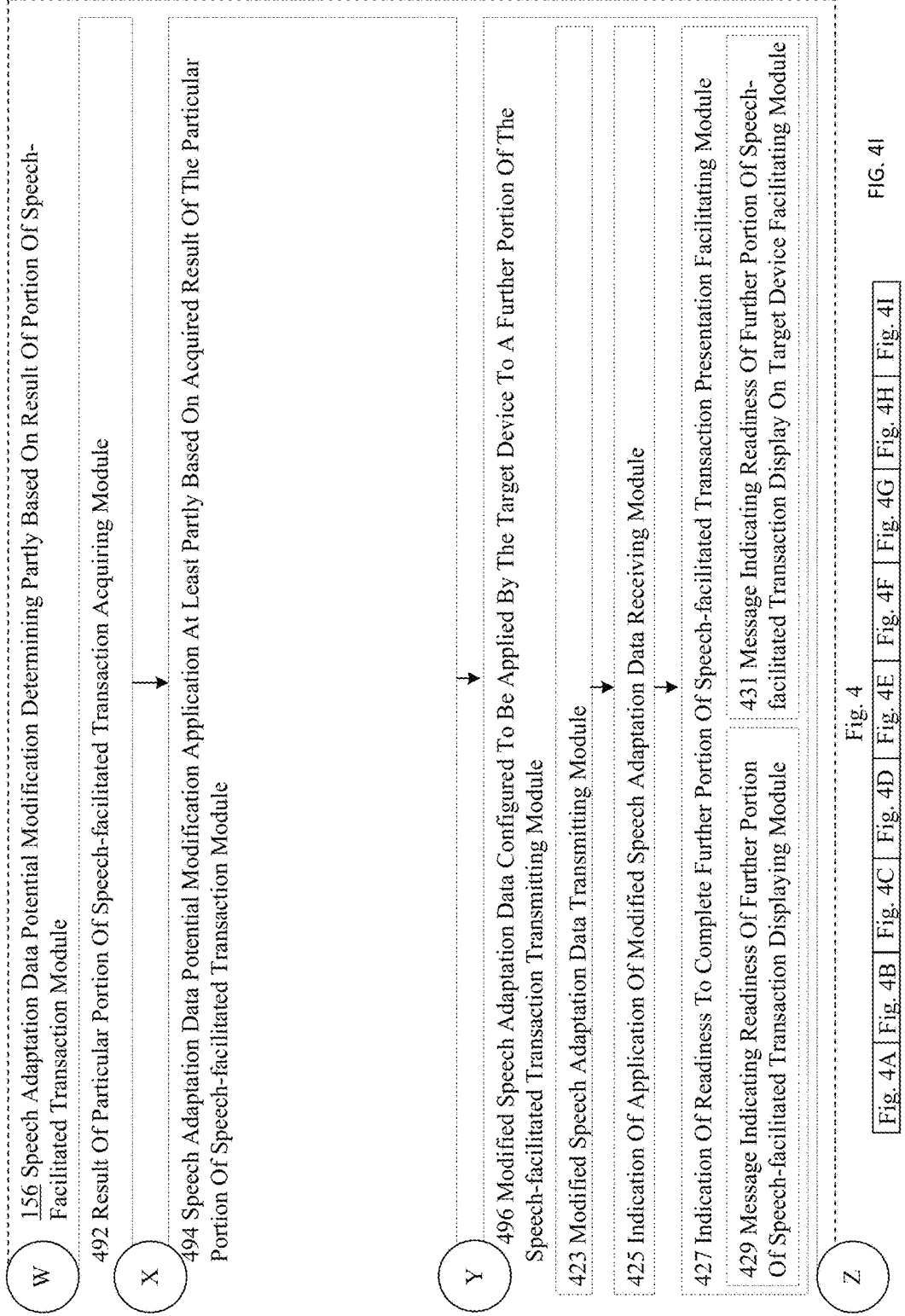

FIG. 7B

504 Facilitating Transmission Of The Adaptation Data To A Target Device, In Response To An Indicator Related To A Speech-facilitated Transaction Of A Particular Party, Wherein The Adaptation Data Is Correlated To At Least One Aspect Of Speech Of The Particular Party 708 Facilitating Transmission Of The Adaptation Data To A Target Device, In Response To An Indication That The Particular Party Intends To Conduct A Speech-facilitated Transaction, Wherein The Adaptation Data Is Correlated To At Least One Aspect Of Speech Of The Particular Party 710 Facilitating Transmission Of The Adaptation Data To A Target Device, In Response To An Indication Received From The Target Device That The Particular Party Intends To Conduct A Speech-facilitated Transaction, Wherein The Adaptation Data Is Correlated To At Least One Aspect Of Speech Of The Particular Party 716 Facilitating Transmission Of The Adaptation Data To A Target Device, In Response To A Request From The Target Device For Adaptation Data Correlated To At Least One Aspect Of Speech Of The Particular Party 718 Facilitating Transmission Of The Adaptation Data To A Target Device, In Response To An Indication Received From A Particular Device Associated With The Particular Party Device That The Particular Party Intends To Conduct A Speech-facilitated Transaction, Wherein The Adaptation Data Is Correlated To At Least One Aspect Of Speech Of The Particular Party 506 Determining Whether To Update The Adaptation Data, Said Determination At Least Partly Based On A Result Of At Least A Portion Of The Speech-facilitated Transaction

| 802 Updating The Adaptation Data, Said Determination At Least Partly Based On A Result Of At Least A Portion Of The Speech-facilitated Transaction | 804 Determining Not To Update The Adaptation Data, Said Determination At Least Partly Based On A Result Of At Least A Portion Of The Speech-facilitated Transaction | 806 Determining Whether To Update The Adaptation Data, Said Determination At Least Partly Based On A Result Of A Completed Speech-facilitated Transaction | 808 Determining Whether To Update The Adaptation Data, Said Determination At Least Partly Based On A Result Of A Beginning Portion Of The Speech-facilitated Transaction | 810 Determining Whether To Update The Adaptation Data, Wherein The Speech-facilitated Transaction Comprises A First Sentence And A Second Sentence, And Said Determination Occurs After The First Sentence And Prior To The Second Sentence | 812 Determining Whether To Update The Adaptation Data, Said Determination Made Prior To Completion Of The Speech-facilitated Transaction | 814 Determining Whether To Update The Adaptation Data, Said Determination Made After At Least One Word Is Spoken In The Speech-facilitated Transaction |
|---|---|---|---|---|---|---|
| | | | | | | 816 Determining Whether To Update The Adaptation Data, Said Determination Prior To A Particular Word Being Spoken In The Speech Facilitated Transaction |

FIG. 8A

METHODS AND SYSTEMS FOR MANAGING ADAPTATION DATA

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. § § 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/485,738, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 31 May 2012, which is currently co-pending or is an application of which a currently co-pending application is entitled to the benefit of the filing date, and which is a continuation of U.S. patent application Ser. No. 13/485,733, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 31 May 2012.

For purposes of the USPTO extra-statutory requirements, the present application constitutes a continuation-in-part of U.S. patent application Ser. No. 13/538,866, entitled SPEECH RECOGNITION ADAPTATION SYSTEMS BASED ON ADAPTATION DATA, naming Royce A. Levien, Richard T. Lord, Robert W. Lord, and Mark A. Malamud as inventors, filed 29 Jun. 2012, which is currently co-pending or is an application of which a currently co-pending application is entitled to the benefit of the filing date, and which is a continuation of U.S. patent application Ser. No. 13/538,855, entitled SPEECH RECOGNITION ADAPTATION SYSTEMS BASED ON ADAPTATION DATA, naming Royce A. Levien, Richard T. Lord, Robert W. Lord, and Mark A. Malamud as inventors, filed 29 Jun. 2012.

For purposes of the USPTO extra-statutory requirements, the present application constitutes a continuation-in-part of U.S. patent application Ser. No. 13/564,649, entitled SPEECH RECOGNITION ADAPTATION SYSTEMS BASED ON ADAPTATION DATA, naming Royce A. Levien, Richard T. Lord, Robert W. Lord, and Mark A. Malamud as inventors, filed 1 Aug. 2012, which is currently co-pending or is an application of which a currently co-pending application is entitled to the benefit of the filing date, and which is a continuation of U.S. patent application Ser. No. 13/564,647, entitled SPEECH RECOGNITION ADAPTATION SYSTEMS BASED ON ADAPTATION DATA, naming Royce A. Levien, Richard T. Lord, Robert W. Lord, and Mark A. Malamud as inventors, filed 1 Aug. 2012.

For purposes of the USPTO extra-statutory requirements, the present application constitutes a continuation-in-part of U.S. patent application Ser. No. 13/564,651, entitled SPEECH RECOGNITION ADAPTATION SYSTEMS BASED ON ADAPTATION DATA, naming Royce A. Levien, Richard T. Lord, Robert W. Lord, and Mark A. Malamud as inventors, filed 1 Aug. 2012, which is currently co-pending or is an application of which a currently co-pending application is entitled to the benefit of the filing date, and which is a continuation of U.S. patent application Ser. No. 13/564,650, entitled SPEECH RECOGNITION ADAPTATION SYSTEMS BASED ON ADAPTATION DATA, naming Royce A. Levien, Richard T. Lord, Robert W. Lord, and Mark A. Malamud as inventors, filed 1 Aug. 2012.

For purposes of the USPTO extra-statutory requirements, the present application constitutes a continuation-in-part of U.S. patent application Ser. No. 13/609,142, entitled METHODS AND SYSTEMS FOR SPEECH ADAPTATION DATA, naming Royce A. Levien, Richard T. Lord, Robert W. Lord, and Mark A. Malamud as inventors, filed 10 Sep. 2012, which is currently co-pending or is an application of which a currently co-pending application is entitled to the benefit of the filing date, and which is a continuation of U.S. patent application Ser. No. 13/609,139, entitled METHODS AND SYSTEMS FOR SPEECH ADAPTATION DATA, naming Royce A. Levien, Richard T. Lord, Robert W. Lord, and Mark A. Malamud as inventors, filed 10 Sep. 2012.

For purposes of the USPTO extra-statutory requirements, the present application constitutes a continuation-in-part of U.S. patent application Ser. No. 13/609,145, entitled METHODS AND SYSTEMS FOR SPEECH ADAPTATION DATA, naming Royce A. Levien, Richard T. Lord, Robert W. Lord, and Mark A. Malamud as inventors, filed 10 Sep. 2012, which is currently co-pending or is an application of which a currently co-pending application is entitled to the benefit of the filing date, and which is a continuation of U.S. patent application Ser. No. 13/609,143, entitled METHODS AND SYSTEMS FOR SPEECH ADAPTATION DATA, naming Royce A. Levien, Richard T. Lord, Robert W. Lord, and Mark A. Malamud as inventors, filed 10 Sep. 2012.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to adaptation data.

SUMMARY

In one or more various aspects, a method includes but is not limited to managing adaptation data, wherein the adaptation data is correlated to at least one aspect of speech of a particular party, facilitating transmission of the adaptation data to a target device, in response to an indicator related to a speech-facilitated transaction of a particular party, wherein the adaptation data is correlated to at least one aspect of speech of the particular party, and determining whether to update the adaptation data, said determination at least partly based on a result of at least a portion of the speech-facilitated transaction. In addition to the foregoing, other method aspects are described in the claims, drawings, and text forming a part of the disclosure set forth herein.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for managing adaptation data, wherein the adaptation data is correlated to at least one aspect of speech of a particular party, means for facilitating transmission of the adaptation data to a target device, in response to an indicator related to a speech-facilitated transaction of a particular party, wherein the adaptation data is correlated to at least one aspect of speech of the particular party, and means for determining whether to update the adaptation data, said determination at least partly based on a result of at least a portion of the speech-facilitated transaction. In addition to the foregoing, other system aspects are described in the claims, drawings, and text forming a part of the disclosure set forth herein.

In one or more various aspects, a system includes, but is not limited to, circuitry for managing adaptation data, wherein the adaptation data is correlated to at least one aspect of speech of a particular party, circuitry for facilitating transmission of the adaptation data to a target device, in response to an indicator related to a speech-facilitated transaction of a particular party, wherein the adaptation data is correlated to at least one aspect of speech of the particular party, and circuitry for determining whether to update the adaptation data, said determination at least partly based on a result of at least a portion of the speech-facilitated transaction. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for managing adaptation data, wherein the adaptation data is correlated to at least one aspect of speech of a particular party, one or more instructions for facilitating transmission of the adaptation data to a target device, in response to an indicator related to a speech-facilitated transaction of a particular party, wherein the adaptation data is correlated to at least one aspect of speech of the particular party, and one or more instructions for determining whether to update the adaptation data, said determination at least partly based on a result of at least a portion of the speech-facilitated transaction. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for managing adaptation data, wherein the adaptation data is correlated to at least one aspect of speech of a particular party, one or more interchained physical machines ordered for facilitating transmission of the adaptation data to a target device, in response to an indicator related to a speech-facilitated transaction of a particular party, wherein the adaptation data is correlated to at least one aspect of speech of the particular party, and one or more interchained physical machines ordered for determining whether to update the adaptation data, said determination at least partly based on a result of at least a portion of the speech-facilitated transaction.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1A shows a high-level block diagram of an exemplary environment 100, according to an embodiment.

FIG. 1D shows a high-level diagram of an exemplary environment 100", which is an example of an exemplary embodiment 100 having a personal device 120, according to an embodiment.

FIG. 1E shows a high-level diagram of an exemplary environment 100''', which is an example of an exemplary embodiment 100 having a personal device 120, according to an embodiment.

FIG. 2, including

FIG. 3, including FIGS. 3A-3D, shows a particular perspective of the speech adaptation data transmission, in response to indication of a speech-facilitated transaction including a target device, facilitating module 154 of the personal device 120 of environment 100 of FIG. 1B.

FIGS. 4A-4I, shows a particular perspective of speech adaptation data potential modification determining partly based on result of portion of speech-facilitated transaction module 156 of the personal device 120 of environment 100 of FIG. 1B.

FIG. 7B is a high-level logic flow chart of a process depicting alternate implementations of a facilitating transmission of the adaptation data 504 of FIG. 5, according to one or more embodiments.

FIG. 8A is a high-level logic flowchart of a process depicting determining whether to update the adaptation data 506 of FIG. 5, according to one or more embodiments.

DETAILED DESCRIPTION

Figure 1B:
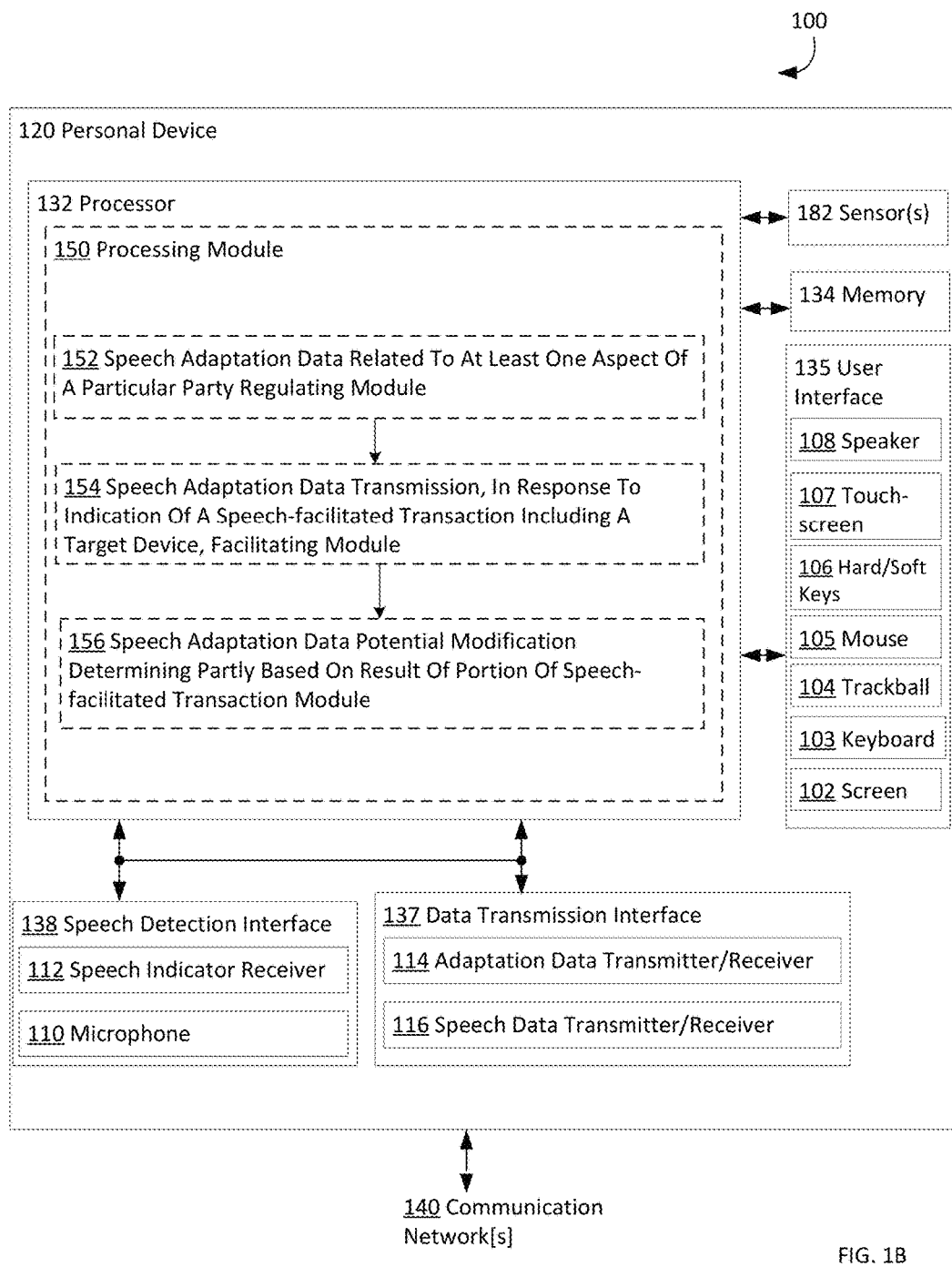
FIG. 1B shows a high-level block diagram of a personal device 120 operating in an exemplary embodiment 100, according to an embodiment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for managing adaptation data, wherein the adaptation data is correlated to at least one aspect of speech of a particular party, facilitating transmission of the adaptation data to a target device, in response to an indicator related to a speech-facilitated transaction of a particular party, wherein the adaptation data is correlated to at least one aspect of speech of the particular party, and determining whether to update the adaptation data, said determination at least partly based on a result of at least a portion of the speech-facilitated transaction.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Although user 105 is shown/described herein as a single illustrated figure, those skilled in the art will appreciate that user 105 may be representative of a human user, a robotic user (e.g., computational entity), and/or substantially any combination thereof (e.g., a user may be assisted by one or more robotic agents) unless context dictates otherwise.

Those skilled in the art will appreciate that, in general, the same may be said of "sender" and/or other entity-oriented terms as such terms are used herein unless context dictates otherwise.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any nonelectrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

The proliferation of automation in many transactions is apparent. For example, Automated Teller Machines ("ATMs") dispense money and receive deposits. Airline ticket counter machines check passengers in, dispense tickets, and allow passengers to change or upgrade flights. Train and subway ticket counter machines allow passengers to purchase a ticket to a particular destination without invoking a human interaction at all. Many groceries and pharmacies have self-service checkout machines which allow a consumer to pay for goods purchased by interacting only with a machine. Large companies now staff telephone answering systems with machines that interact with customers, and invoke a human in the transaction only if there is a problem with the machine-facilitated transaction.

Nevertheless, as such automation increases, convenience and accessibility may decrease. Self-checkout machines at grocery stores may be difficult to operate. ATMs and ticket counter machines may be mostly inaccessible to disabled persons or persons requiring special access. Where before, the interaction with a human would allow disabled persons to complete transactions with relative ease, if a disabled person is unable to push the buttons on an ATM, there is little the machine can do to facilitate the transaction to completion. While some of these public terminals allow speech operations, they are configured to the most generic forms of speech, which may be less useful in recognizing particular speakers, thereby leading to frustration for users attempting to speak to the machine. This problem may be especially challenging for the disabled, who already may face significant challenges in completing transactions with automated machines.

In addition, smartphones and tablet devices also now are configured to receive speech commands. Speech and voice controlled automobile systems now appear regularly in motor vehicles, even in economical, mass-produced vehicles. Home entertainment devices, e.g., disc players, televisions, radios, stereos, and the like, may respond to speech commands. Additionally, home security systems may respond to speech commands. In an office setting, a worker's computer may respond to speech from that worker, allowing faster, more efficient work flows. Such systems and machines may be trained to operate with particular users, either through explicit training or through repeated interactions. Nevertheless, when that system is upgraded or replaced, e.g., a new television is purchased, that training may be lost with the device. Thus, in some embodiments described herein, adaptation data for speech recognition systems may be separated from the device which recognizes the speech, and may be more closely associated with a user, e.g., through a device carried by the user, or through a network location associated with the user.

Further, in some environments, there may be more than one device that transmits and receives data within a range of interacting with a user. For example, merely sitting on a couch watching television may involve five or more devices, e.g., a television, a cable box, an audio/visual receiver, a remote control, and a smartphone device. Some of these devices may transmit or receive speech data. Some of these devices may transmit, receive, or store adaptation data, as will be described in more detail herein. Thus, in some embodiments, which will be described in more detail herein, there may be methods, systems, and devices for determining which devices in a system should perform actions that allow a user to efficiently interact with an intended device through that user's speech.

Referring now to FIG. 1, e.g., FIG. 1A, FIG. 1A illustrates an example environment 100 in which the methods, systems, circuitry, articles of manufacture, and computer program products and architecture, in accordance with various embodiments, may be implemented by one or more of personal device 20A, personal device 20B, intermediate device 40, target device 30A, and target device 30B. In some embodiments, e.g., as shown in FIG. 1B, personal device 120, which in some embodiments, may be an example of one of personal device 20A, personal device 20B, and intermediate device 40. The personal device 120, in various embodiments, may be endowed with logic that is designed for managing adaptation data, wherein the adaptation data is correlated to at least one aspect of speech of a particular party, logic that is designed for facilitating transmission of the adaptation data to a target device, in response to an indicator related to a speech-facilitated transaction of a particular party, wherein the adaptation data is correlated to at least one aspect of speech of the particular party, and logic that is designed for determining whether to update the adaptation data, said determination at least partly based on a result of at least a portion of the speech-facilitated transaction.

Referring again to the exemplary embodiment in FIG. 1A, a user 105 may engage in a speech facilitated transaction with one or more of a terminal device 30A and a terminal device 30B. In some embodiments, the speech-facilitated transaction may be directed to one of terminal device 30A or terminal device 30B. In some embodiments, the user may not specifically direct her speech toward terminal device 30A or terminal device 30B, but rather to both of them, with indifference toward which device carries out the speech-facilitated transaction. In some embodiments, one of the terminal device 30A and terminal device 30B negotiate between themselves to determine which device will carry out the speech-facilitated transaction. In some embodiments, one or more of the personal device 20A, the personal device 20B, and the intermediate device 40 may determine which of the terminal device 30A and terminal device 30B carries out the speech-facilitated transaction. In some embodiments, one or more of personal device 20A, personal device 20B, and intermediate device 40 may detect one or more of terminal device 30A and terminal device 30B, establish a connection, or negotiate with one or more of terminal devices 30A and 30B.

The dashed-line arrows shown in environment 100 of FIG. 1A are not labeled, but are intended to show the flow of data from one device to the other. Some data connections are omitted for simplicity of drawing, e.g., although there is no arrow, personal device 20A may communicate directly with terminal device 30A and terminal device 30B. The flow of data may include one or more adaptation data, speech data in any format, including raw speech from the user, adaptation result data, intended target data, target data, and the like. The dotted line arrows show an association between the user 105 and one or more of personal device 20A, personal device 20B, and intermediate device 40.

Although it is not shown in FIG. 1A, any or all of personal devices 20A, 20B, and 40 may communicate with any or all of terminal device 30A and terminal device 30B, either directly, or indirectly. In some embodiments, these devices communicate with each other via a server 110, which may be local or remote to any of the devices 20A, 20B, 30A, 30B, and 40. In some embodiments, these devices communicate with each other via one or more communication networks 140, which may be local or remote to any of the devices 20A, 20B, 30A, 30B, and 40. Although server 110 and communication network 40 are pictured in each of the embodiments in FIGS. 1A and 1C-1E, server 110 and communication network 140 are not required, and are shown merely for purposes of illustration.

Referring again to FIG. 1A, FIG. 1A shows personal device 20A, personal device 20B, intermediate device 40, terminal device 30A, terminal device 30B, and server 110. The number of devices is shown merely for illustrative purposes. In some embodiments, however, there may be a different number of personal devices, intermediate devices, terminal devices, servers, and communication networks. In some embodiments, one or more of the personal devices, intermediate devices, terminal devices, servers, and communication networks may be omitted entirely.

Referring again to FIG. 1A, personal device 20A and 20B are shown as associated with user 105. This association may be attenuated, e.g., they may merely be in the same physical proximity. In other embodiments, the association may be one of ownership, mutual contract, information storing, previous usage, or other factors. The examples described further herein will provide a non-exhaustive list of examples of relationships between user 105 and a personal device 120 (e.g., personal device 20A or personal device 20B). In some embodiments, personal device 120 (e.g., personal device 20A or personal device 20B) may be any size and have any specification. Personal device 120 (e.g., personal device 20A or personal device 20B) may be a custom device of any shape or size, configured to transmit, receive, and store data. Personal device 120 (e.g., personal device 20A or personal device 20B) may include, but is not limited to, a smartphone device, a tablet device, a personal computer device, a laptop device, a keychain device, a key, a personal digital assistant device, a modified memory stick, a universal remote control, or any other piece of electronics. In addition, personal device 120 (e.g., personal device 20A or personal device 20B) may be a modified object that is worn, e.g., eyeglasses, a wallet, a credit card, a watch, a chain, or an article of clothing. Anything that is configured to store, transmit, and receive data may be a personal device 120 (e.g., personal device 20A or personal device 20B), and personal device 120 (e.g., personal device 20A or personal device 20B) is not limited in size to devices that are capable of being carried by a user. Additionally, personal device 120 (e.g., personal device 20A or personal device 20B) may not be in direct proximity to the user, e.g., personal device 120 (e.g., personal device 20A or personal device 20B) may be a computer sitting on a desk in a user's home or office.

Although terminal devices 30A and 30B (hereinafter interchangeably collectively or individually referred to as "terminal device 30*") are described as "terminal device," this is merely for simplicity of illustration, terminal device 30* could be any device that is configured to receive speech. For example, terminal device 30* may be a terminal, a computer, a navigation system, a phone, a piece of home electronics (e.g., a DVD player, Blu-Ray player, media player, game system, television, receiver, alarm clock, and the like). Terminal device 30* may, in some embodiments, be a home security system, a safe lock, a door lock, a kitchen appliance configured to receive speech, and the like. In some embodiments, terminal device 30* may be a motorized vehicle, e.g., a car, boat, airplane, motorcycle, golf cart, wheelchair, and the like. In some embodiments, terminal device 30* may be a piece of portable electronics, e.g., a laptop computer, a netbook computer, a tablet device, a smartphone, a cellular phone, a radio, a portable navigation system, or any other piece of electronics capable of receiving speech. Terminal device 30* may be a part of an enterprise solution, e.g., a common workstation in an office, a copier, a scanner, a personal workstation in a cubicle, an office directory, an interactive screen, and a telephone. These examples and lists are not meant to be exhaustive, but merely to illustrate a few examples of the terminal device. Some of these examples are shown in more detail with respect to FIGS. 1C, 1D, and 1E.

In some embodiments, target device 30A and/or target device 30B receives adaptation data from the personal device 120 (e.g., personal device 20A or personal device 20B), in a process that will be described in more detail herein. In some embodiments, the adaptation data is transmitted over one or more communication network(s) 40. In various embodiments, the communication network 40 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 40 may be wired, wireless, or a combination of wired and wireless networks. It is noted that "communication network" here refers to one or more communication networks, which may or may not interact with each other.

In some embodiments, the adaptation data does not come directly from the personal device 120 (e.g., personal device 20A or personal device 20B). In some embodiments, personal device 120 (e.g., personal device 20A or personal device 20B) merely facilitates communication of the adaptation data, e.g., by providing one or more of an address, credentials, instructions, authorization, and recommendations. For example, in some embodiments, personal device 120 (e.g., personal device 20A or personal device 20B) provides a location at server 10 at which adaptation data may be received. In some embodiments, personal device 120 (e.g., personal device 20A or personal device 20B) retrieves adaptation data from server 10 upon a request from the terminal device 30, and then relays or facilitates in the relaying of the adaptation data to terminal device 30.

In some embodiments, personal device 120 (e.g., personal device 20A or personal device 20B) broadcasts the adaptation data regardless of whether a terminal device 30 is listening, e.g., at predetermined, regular, or otherwise-defined intervals. In other embodiments, personal device 120 (e.g., personal device 20A or personal device 20B) listens for a request from a terminal device 30, and transmits or broadcasts adaptation data in response to that request. In some embodiments, user 5 determines when personal device 120 (e.g., personal device 20A or personal device 20B) broadcasts adaptation data. In still other embodiments, a third party (not shown) triggers the transmission of adaptation data to the terminal device 30, in which the transmission is facilitated by the personal device 120 (e.g., personal device 20A or personal device 20B).

FIG. 1B shows a more detailed description of a personal device 120 in an exemplary environment 100. Personal device 120 may be an example of personal device 20A or 20B of FIG. 1A, intermediate device 40 of FIG. 1A, first personal device 21A of FIG. 1C, second personal device 21B of FIG. 1D, one of the modules of device 31 of FIG. 1C, personal device 22A of FIG. 1D, personal device 22B of FIG. 1D, any of devices 51, 52, 53, and 54 of FIG. 1D, smart key device 26 of FIG. 1E, GPS navigation device 41 of FIG. 1E, and the like. The foregoing is not intended to be exhaustive of the possible devices that correspond to personal device 120 of FIG. 1B, but are merely exemplary of the types of devices that may have a structure as outlined in FIG. 1B.

Referring again to FIG. 1B, in various embodiments, the personal device 120 may comprise, among other elements, a processor 132, a memory 134, a user interface 135, a speech detection interface 138, and a data transmission interface 137. Each of these elements may be absent in various embodiments of personal device 120, e.g., some personal devices 120 may not have a speech detection interface 138, or a memory 134, or a user interface 135.

Processor 132 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 132 may be a server. In some embodiments, processor 132 may be a distributed-core processor. Although processor 132 is as a single processor that is part of a single personal device 120, processor 132 may be multiple processors distributed over one or many computing devices 30, which may or may not be configured to operate together. Processor 132 is illustrated as being configured to execute computer readable instructions in order to execute one or more operations described above, and as illustrated in FIGS. 5, 6A-6B, 7A-7D, and 8A-8I. In some embodiments, processor 132 is designed to be configured to operate as processing module 150, which may include one or more of speech adaptation data related to at least one aspect of a particular party regulating module 152, speech adaptation data transmission, in response to indication of a speech-facilitated transaction including a target device, facilitating module 154, and speech adaptation data potential modification determining partly based on result of portion of speech-facilitated transaction module 156.

Referring again to FIG. 1B, as set forth above, personal device 120 may include a memory 134. In some embodiments, memory 134 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 134 may be located at a single network site. In some embodiments, memory 134 may be located at multiple network sites, including sites that are distant from each other.

Referring again to FIG. 1B, as set forth above, personal device 120 may include a user interface 135. The user interface may be implemented in hardware or software, or both, and may include various input and output devices to allow an operator of personal device 120 to interact with personal device 120. For example, user interface 135 may include, but is not limited to, an audio display, e.g., a speaker 108, a video display, e.g., a screen 102, a microphone, a camera, a keyboard, e.g., keyboard 103, a trackball, e.g., trackball 104, a mouse, e.g., mouse 105, one or more soft keys, e.g., hard/soft keys 106, a touch input, e.g., touchscreen 107, e.g., which may also be a video display screen, a joystick, a game controller, a touchpad, a handset, or any other device that allows interaction between a device and a user.

Referring again to FIG. 1B, as set forth above, personal device 120 may include a speech detection interface 138. Speech detection interface 138 may be configured to receive and/or process speech as input, or to observe and/or record speech of a speech-facilitated transaction Although not present in some embodiments, in some embodiments, a speech detection interface 138 may include a speech indicator receiver 112, which may be a sensor of any type, or a communication port that receives a signal, or a sensor that detects a button press, or any other module that can detect a change of state of any kind in the environment 100, whether internal or external to the device. The speech detection interface 138 may, in some embodiments, include a microphone 110, which may or may not communicate with speech indicator receiver 112. In some embodiments, microphone 110 may detect speech, either selectively or always-on, and may be controlled by one or more of speech indicator receiver 112 and processor 132.

Referring again to FIG. 1B, as set forth above, personal device 120 may include a data transmission interface 137. Data transmission interface 137 may, in some embodiments, handle the transmission and reception of data by the device. For example, in some embodiments, data transmission interface 137 may include an adaptation data transmitter/receiver 114, which handles the reception and transmission of adaptation data over any type of network or internal form of communication, e.g., internal bus, and the like. Data transmission interface 137 may, in some embodiments, include speech data transmitter/receiver 116, which may handle the reception and transmission of speech data, including raw speech, over any form of moving data.

Referring again to FIG. 1B, as set forth above, personal device 120 may have one or more sensors 182. These sensors include, but are not limited to, a Global Positioning System (GPS) sensor, a still camera, a video camera, an altimeter, an air quality sensor, a barometer, an accelerometer, a charge-coupled device, a radio, a thermometer, a pedometer, a heart monitor, a moisture sensor, a humidity sensor, a microphone, a seismometer, and a magnetic field sensor. Sensors 182 may interface with sensor interface 180. Although FIG. 1B illustrates sensors 182 as part of personal device 120, in some embodiments, sensors 182 may be separated from personal device 120, and communicate via one or more communication networks, e.g., communication networks 140.

Figure 1C:
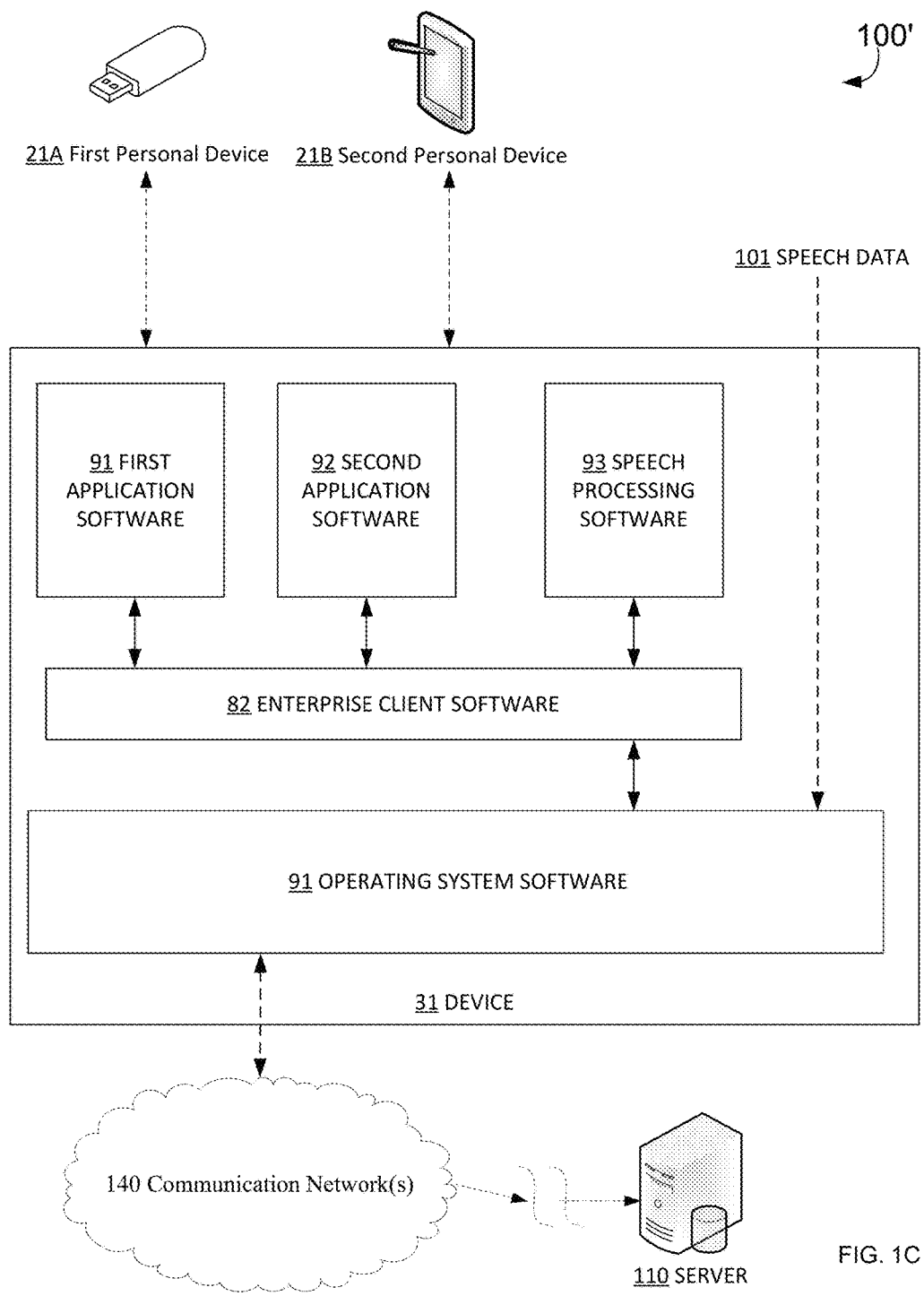
FIG. 1C shows a high-level diagram of an exemplary environment 100', which is an example of an exemplary embodiment 100 having a personal device 120, according to an embodiment.

Referring now to FIG. 1C, FIG. 1C shows an example embodiment of an exemplary environment 100', which is a non-limiting example of an environment 100. As shown in FIG. 1C, environment 100' may include a user (not shown), which user may have one or more of a first personal device 21A and a second personal device 21B. First personal device 21A may be, for example, a USB drive, and second personal device 21B may be, for example, a cellular telephone device, although both personal device 21A and personal device 21B may be any form of personal device 120 as previously described. One or more of first personal device 21A and second personal device 21B may interact with device 31, which may be any type of computing device, e.g., laptop computer, desktop computer, server, netbook, tablet device, smartphone, and the like. Device 31 may have an operating system software 81 loaded thereon. Operating system software 81 may include, but is not limited to, Microsoft Windows, Google Android, Apple iOS, Apple Mountain Lion, UNIX, Linux, Chrome OS, Symbian, and the like.

In addition, in some embodiments, device 31 may include an enterprise client software 82 onboard. For example, some systems, e.g., in an office environment, may have a client software, e.g., Citrix, or the like, loaded on their systems to integrate the user experience for their workers. In some embodiments, this module may play a role in determining the role of the interpretation of speech data (e.g., speech data 101) and the application of adaptation data. In some embodiments, device 31 also may include one or more of first application software 91 and second application software 92. First and second application software 91 and 92 may be any type of application, e.g., game, spreadsheet, word processor, web browser, chat client, picture viewer, picture manipulator, webcam application, and the like. In some embodiments, these modules may play a role in determining the role of the interpretation of speech data and the application of adaptation data. For example, the complexity of the application may play a role in determining how much of the speech processing occurs at the application level. In some embodiments, device 31 may communicate with one or more communication networks 140 and one or more servers 110.

Referring now to FIG. 1D, FIG. 1D shows an example embodiment of an exemplary environment 100", which is a non-limiting example of an environment 100. As shown in FIG. 1D, environment 100" may include a user 105, which user may have one or more of a personal device 22A and a personal device 22B. Personal device 22A may be, for example, a universal remote control, and personal device 22B may be, for example, a cellular telephone device, although both personal device 22A and personal device 22B may be any form of personal device 120 as previously described. In some embodiments, one or both of personal device 22A, personal device 22B, and computing device 54 may transmit, store, and/or receive adaptation data. In some embodiments, one of personal device 22A, personal device 22B, and computing device 54 may determine to which of the devices shown in FIG. 1D the user 105 is directing her speech. In other embodiments, one or more of receiver device 51, media player device 52, and television device 53 may transmit one or more of speech data and adaptation data back and forth, and one or more of receiver device 51, media player device 52, and television device 53 may determine which device should apply the adaptation data, and which device should process the speech data, out of devices 22A, 22B, 51, 52, 53, and 54.

Referring now to FIG. 1E, FIG. 1E shows an example embodiment of an exemplary environment 100''', which is a non-limiting example of an environment 100. As shown in FIG. 1E, environment 100''' may include a user (not shown) driving an automobile (interior only shown), wherein the automobile is equipped with a motor vehicle control system 42, which may control the non-driving features of the automobile, e.g., music, climate, temperature, fuel management, seat position, media playing, lights, and the like. The automobile also may have a smart key device 26, which, in some embodiments, may store, receive, and/or transmit adaptation data, either wirelessly or through the system of the automobile. In some embodiments, environment 100''' may also include a GPS navigation device 41, which may be an example of intermediate device 40, which also may be a personal device 120. In some embodiments, GPS navigation device 41 may serve as a terminal device, receiving speech data and adaptation data in order to process a user's request. In other embodiments, GPS navigation device 41 may serve as a personal device 120, storing adaptation data derived from navigation commands of the user, and transmitting the adaptation data to a target device, e.g., motor vehicle control system 42, when needed. Intermediate devices 40, e.g., as shown in FIG. 1A, and GPS navigation device 41, which may be an example of intermediate device 40, may be a personal device 120 for a first transaction and a terminal device in a second transaction. In some embodiments, GPS navigation device 41 may change its role based on an analysis of data received by GPS navigation device 41.

Referring again to FIG. 1E, in some embodiments, GPS navigation device 41, motor vehicle control system 42, smart key device 26, and the user's personal device (not shown) may communicate with one or more communication networks 140 and one or more servers 110. As in all shown exemplary embodiments, however, these elements are optional and some embodiments may exclude them.

Figure 2A:
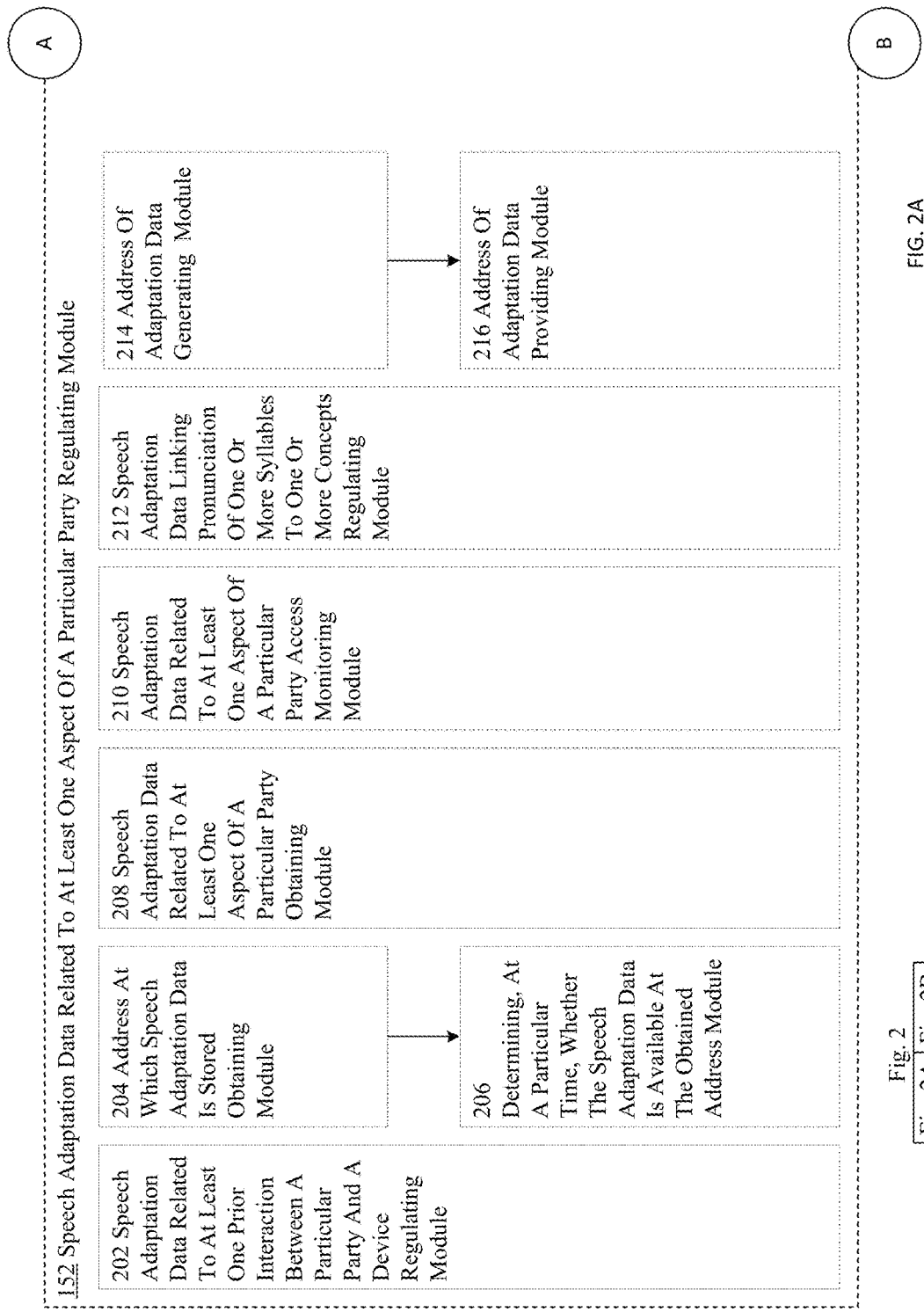
FIGS. 2A-2B, shows a particular perspective of the speech adaptation data related to at least one aspect of a particular party regulating module 152 of the personal device 120 of environment 100 of FIG. 1B.

Referring now to FIG. 2, FIG. 2 illustrates an exemplary implementation of the speech adaptation data related to at least one aspect of a particular party regulating module 152. As illustrated in FIG. 2, the speech adaptation data related to at least one aspect of a particular party regulating module 152 may include one or more sub-logic modules in various alternative implementations and embodiments. For example, as shown in FIG. 2, e.g., FIG. 2A, in some embodiments, module 152 may include one or more of speech adaptation data related to at least one prior interaction between a particular party and a device regulating module 202, address at which speech adaptation data is stored obtaining module 204, determining, at a particular time, whether the speech adaptation data is available at the obtained address module 206, speech adaptation data related to at least one aspect of a particular party obtaining module 208, speech adaptation data related to at least one aspect of a particular party access monitoring module 210, speech adaptation data linking pronunciation of one or more syllables to one or more concepts regulating module 212, address of adaptation data generating module 214, and address of adaptation data providing module 216.

Figure 2B:
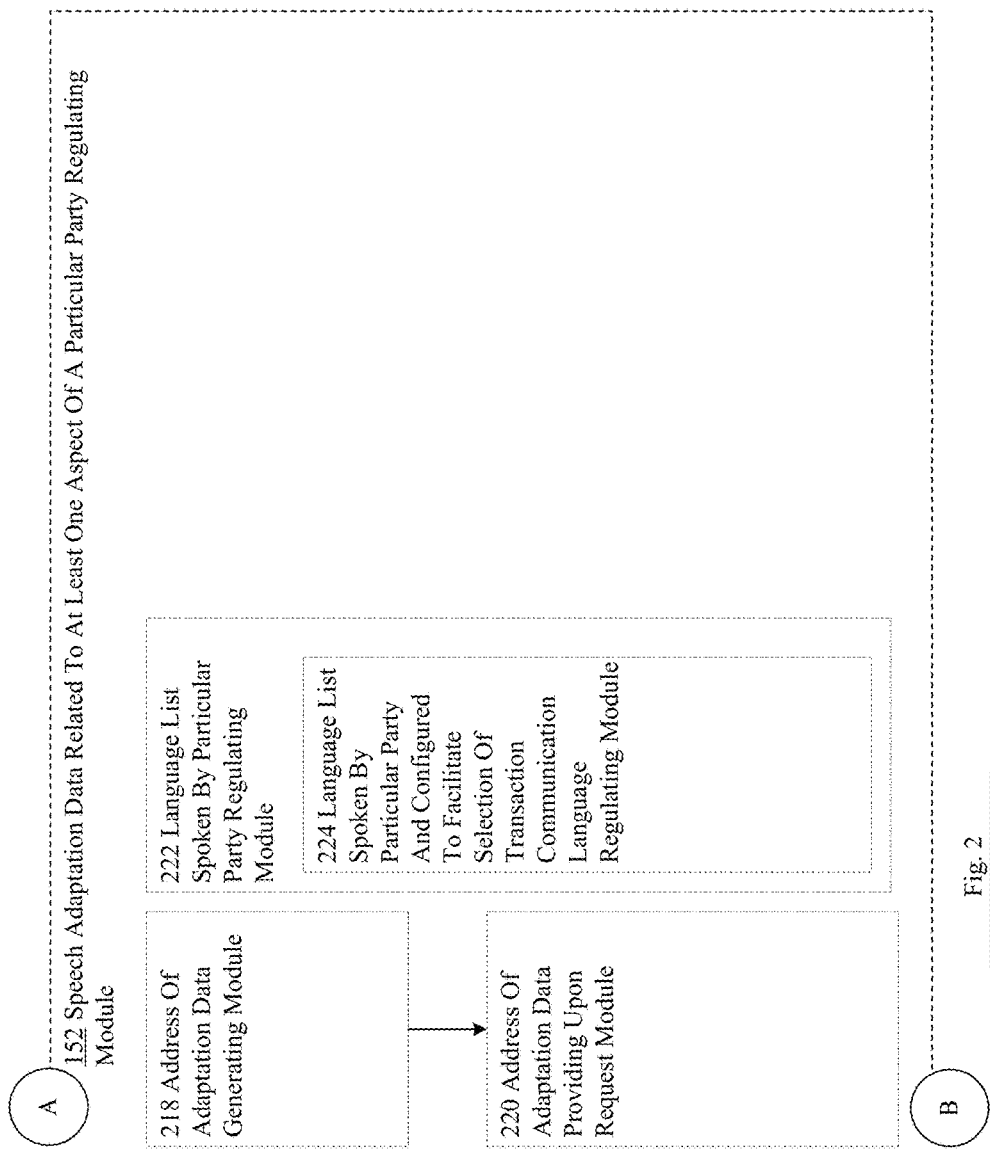

Referring again to FIG. 2, e.g., FIG. 2B, in some embodiments, module 152 may include one or more of address of adaptation data generating module 218 and address of adaptation data providing upon request module 220.

Figures 3, 3A:
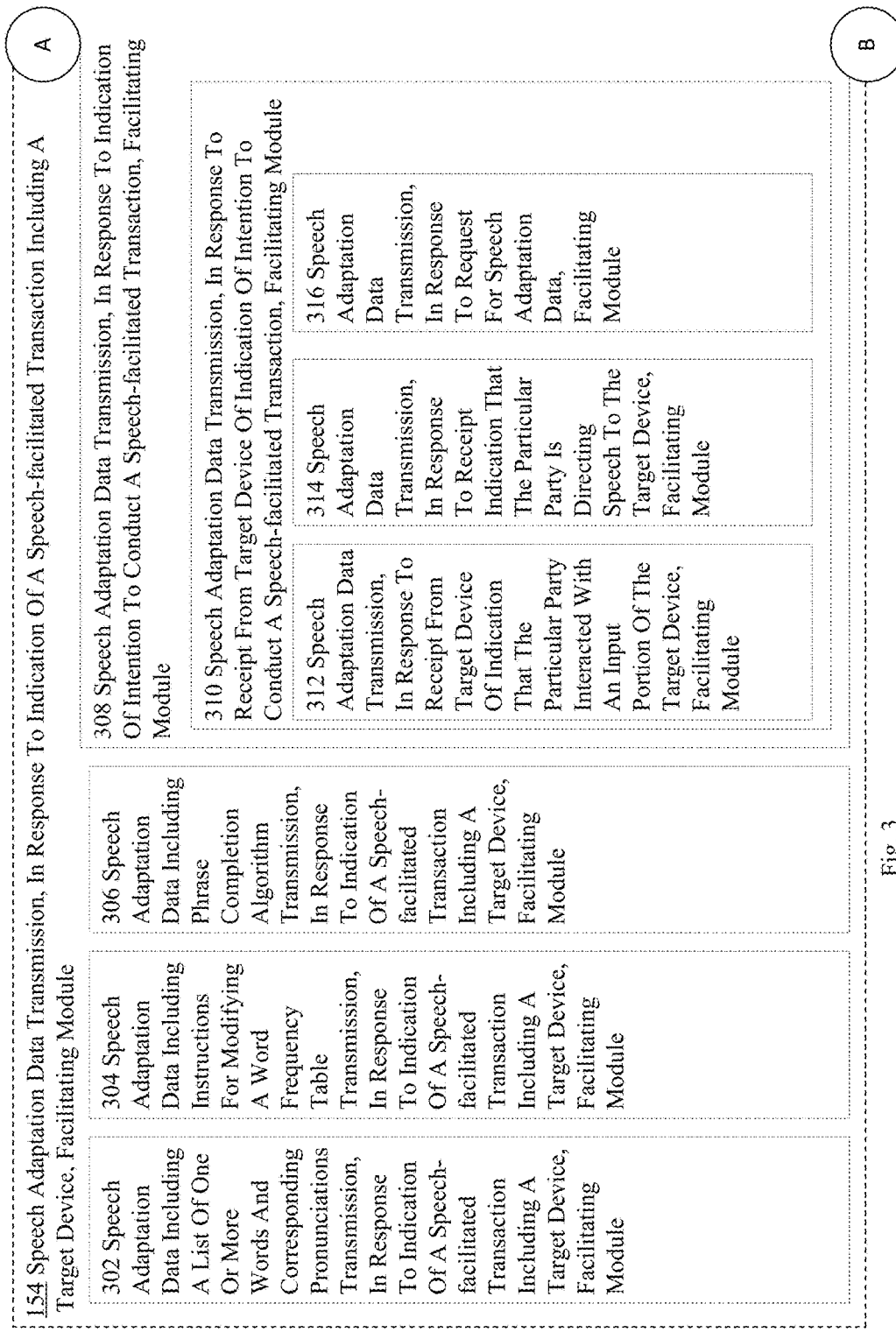

Referring now to FIG. 3, FIG. 3 illustrates an exemplary implementation of speech adaptation data transmission, in response to indication of a speech-facilitated transaction including a target device, facilitating module 154. As illustrated in FIG. 3, the speech adaptation data transmission, in response to indication of a speech-facilitated transaction including a target device, facilitating module 154 may include one or more sub-logic modules in various alternative implementations and embodiments. For example, as shown in FIG. 3 (e.g., FIG. 3A), in some embodiments, module 154 may include one or more of speech adaptation data including a list of one or more words and corresponding pronunciations transmission, in response to indication of a speech-facilitated transaction including a target device, facilitating module 302, speech adaptation data including instructions for modifying a word frequency table transmission, in response to indication of a speech-facilitated transaction including a target device, facilitating module 304, speech adaptation data including phrase completion algorithm transmission, in response to indication of a speech-facilitated transaction including a target device, facilitating module 306, and speech adaptation data transmission, in response to indication of intention to conduct a speech-facilitated transaction, facilitating module 308. In some embodiments, module 308 may include speech adaptation data transmission, in response to receipt from target device of indication of intention to conduct a speech-facilitated transaction, facilitating module 310. In some embodiments, module 310 may include one or more of speech adaptation data transmission, in response to receipt from target device of indication that the particular party interacted with an input portion of the target device, facilitating module 312, speech adaptation data transmission, in response to receipt indication that the particular party is directing speech to the target device, facilitating module 314, and speech adaptation data transmission, in response to request for speech adaptation data, facilitating module 316.

Referring again to FIG. 3, e.g., FIG. 3B, module 154 may include module 308, as described above. In some embodiments, module 308 may include speech adaptation data transmission, in response to received indication of intention to conduct a speech-facilitated transaction from a particular device, facilitating module 318.

Figure 3C:
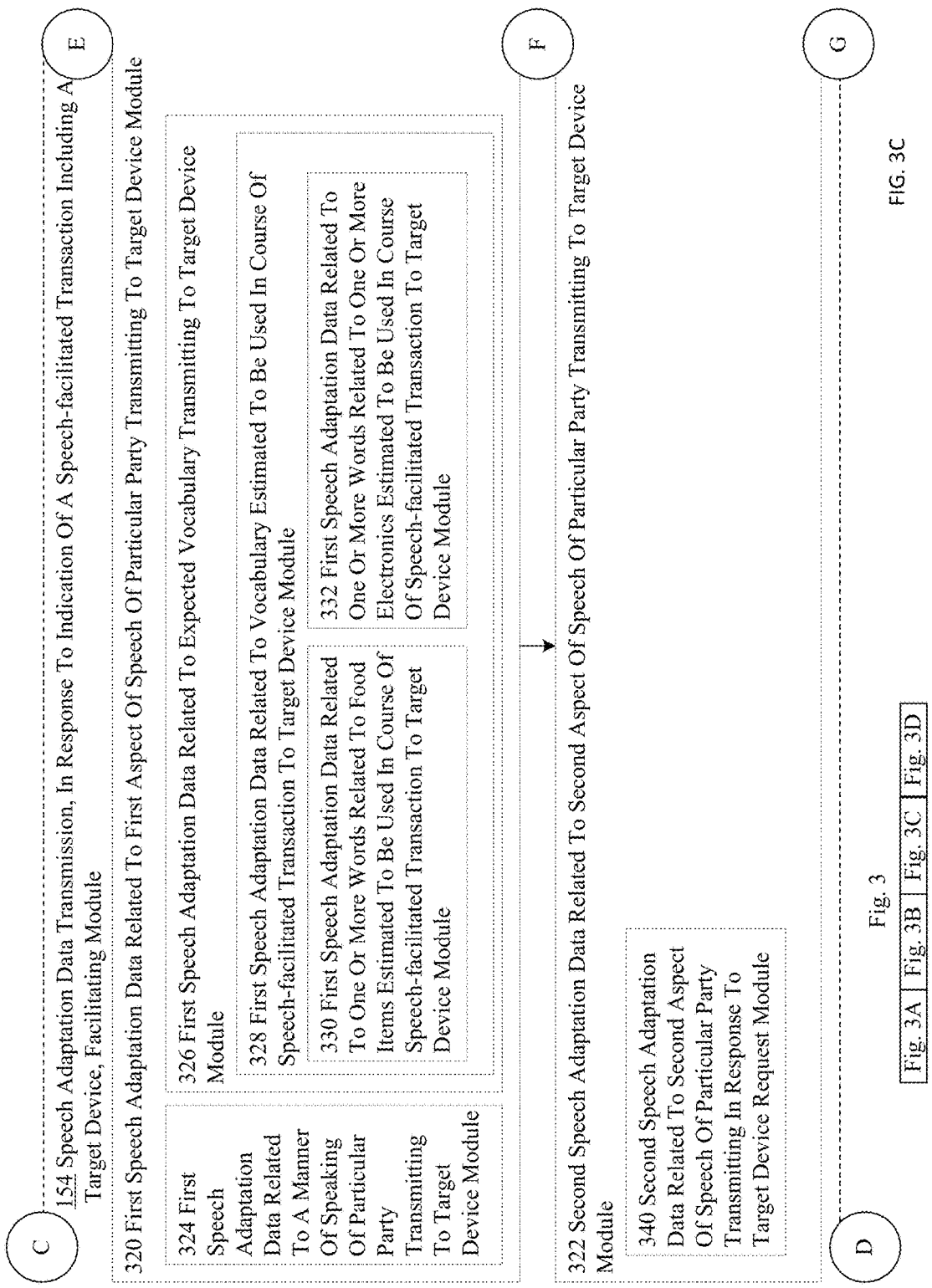

Referring again to FIG. 3, e.g., FIG. 3C, module 154 may include one or more of first speech adaptation data related to first aspect of speech of particular party transmitting to target device module 320 and second speech adaptation data related to second aspect of speech of particular party transmitting to target device module 322. In some embodiments, module 320 may include one or more of first speech adaptation data related to a manner of speaking of particular party transmitting to target device module 324 and first speech adaptation data related to expected vocabulary transmitting to target device module 326. In some embodiments, module 326 may include first speech adaptation data related to vocabulary estimated to be used in course of speech-facilitated transaction to target device module 328. In some embodiments, module 328 may include one or more of first speech adaptation data related to one or more words related to food items estimated to be used in course of speech-facilitated transaction to target device module 330 and first speech adaptation data related to one or more words related to one or more electronics estimated to be used in course of speech-facilitated transaction to target device module 332. In some embodiments, module 322 may include second speech adaptation data related to second aspect of speech of particular party transmitting in response to target device request module 340.

Referring again to FIG. 3, e.g., FIG. 3D, module 154 may include one or more of module 320 and module 322, as described above. In some embodiments, module 320 may include one or more of first speech adaptation data related to a spoken language transmitting to target device module 334 and first speech adaptation data related to previous speech-facilitated transactions by members of a group having a particular trait transmitting to target device module 336. In some embodiments, module 336 may include first speech adaptation data related to previous speech-facilitated transactions by members of a group from a particular community transmitting to target device module 338. In some embodiments, module 322 may include one or more of second speech adaptation data related to second aspect that is different than the first aspect transmitting to target device module 342. In some embodiments, module 342 may include second speech adaptation data related to previous speech interactions of second group that is different than a first group related to the first speech adaptation data transmitting to target device module 344. In some embodiments, module 344 may include second speech adaptation data related to previous speech interactions of second group that is smaller than a first group related to the first speech adaptation data transmitting to target device module 346.

Figures 4, 4B:
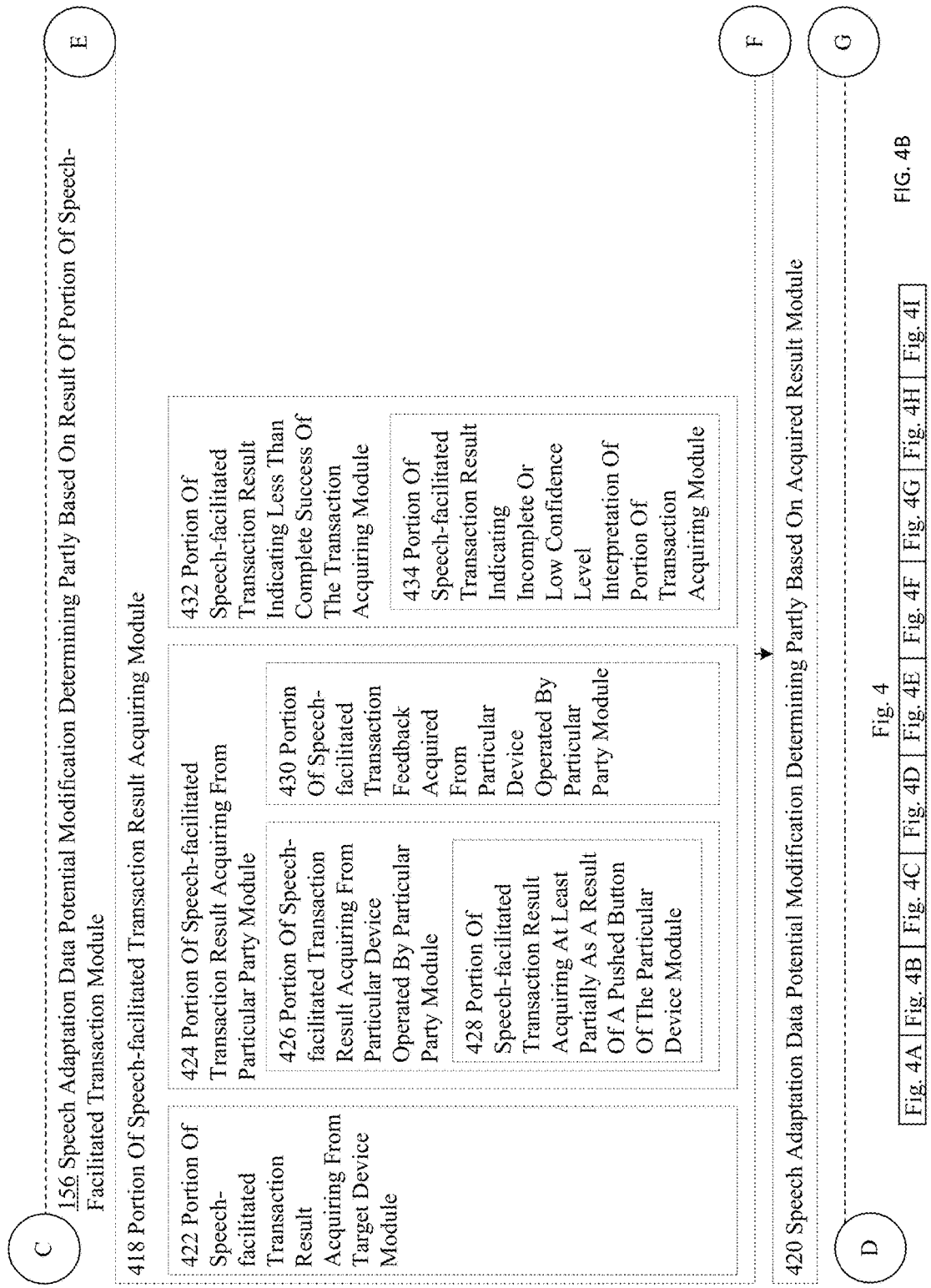

Referring now to FIG. 4, FIG. 4 illustrates an exemplary implementation of the speech adaptation data potential modification determining partly based on result of portion of speech-facilitated transaction module 156. As illustrated in FIG. 4, the speech adaptation data potential modification determining partly based on result of portion of speech-facilitated transaction module 156 may include one or more sub-logic modules in various alternative implementations and embodiments. For example, as shown in FIG. 4, e.g., FIG. 4A, in some embodiments, module 156 may include one or more of speech adaptation data modification partly based on result of portion of speech-facilitated transaction module 402, speech adaptation data determining against modification partly based on result of portion of speech-facilitated transaction module 404, speech adaptation data potential modification determining partly based on result of finished speech-facilitated transaction module 406, speech adaptation data potential modification determining partly based on result of an initial portion of the speech-facilitated transaction module 408, speech adaptation data potential modification determining partly based on a first sentence of the speech facilitated transaction occurring prior to a second sentence of the speech-facilitated transaction module 410, speech adaptation data potential modification determining partly based on result of portion of speech-facilitated transaction and made before the speech-facilitated transaction ends module 412, and speech adaptation data potential modification determining partly based on result of a portion of speech-facilitated transaction after at least one word is spoken by the particular party module 414. In some embodiments, module 414 may include speech adaptation data potential modification determining partly based on result of portion of speech-facilitated transaction and made prior to a particular word module 416.

Referring again to FIG. 4, e.g., FIG. 4B, module 156 may include one or more of portion of speech-facilitated transaction result acquiring module 418 and speech adaptation data potential modification determining partly based on acquired result module 420. In some embodiments, module 418 may include one or more of portion of speech-facilitated transaction result acquiring from target device module 422, portion of speech-facilitated transaction result acquiring from particular party module 424, and portion of speech-facilitated transaction result indicating less than complete success of the transaction acquiring module 432 (e.g., which, in some embodiments, may include portion of speech-facilitated transaction result indicating incomplete or low confidence level interpretation of portion of transaction acquiring module 434. In some embodiments, module 424 may include one or more of portion of speech-facilitated transaction result acquiring from particular device operated by particular party module 426 (e.g., which, in some embodiments, may include portion of speech-facilitated transaction result acquiring at least partially as a result of a pushed button of the particular device module 428) and portion of speech-facilitated transaction feedback acquired from particular device operated by particular party module 430.

Figure 4C:
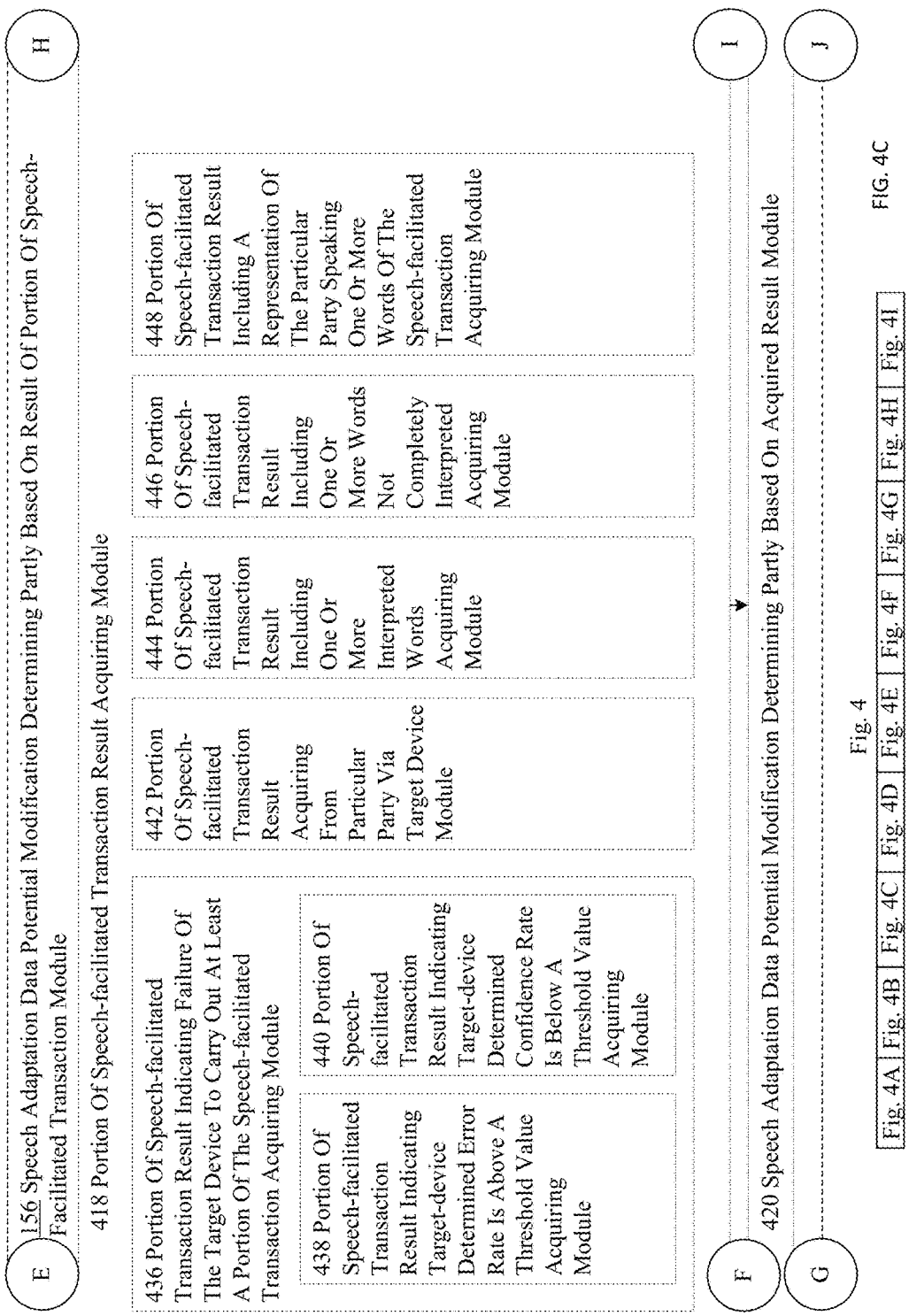

Referring again to FIG. 4, e.g., FIG. 4C, module 156 may include one or more of module 418 and module 420, as previously described. In some embodiments, module 418 may include one or more of portion of speech-facilitated transaction result indicating failure of the target device to carry out at least a portion of the speech-facilitated transaction acquiring module 436, portion of speech-facilitated transaction result acquiring from particular party via target device module 442, portion of speech-facilitated transaction result including one or more interpreted words acquiring module 444, portion of speech-facilitated transaction result including one or more words not completely interpreted acquiring module 446, and portion of speech-facilitated transaction result including a representation of the particular party speaking one or more words of the speech-facilitated transaction acquiring module 448. In some embodiments, module 436 may include one or more of portion of speech-facilitated transaction result indicating target-device determined error rate is above a threshold value acquiring module 438 and portion of speech-facilitated transaction result indicating target-device determined confidence rate is below a threshold value acquiring module 440.

Figure 4D:
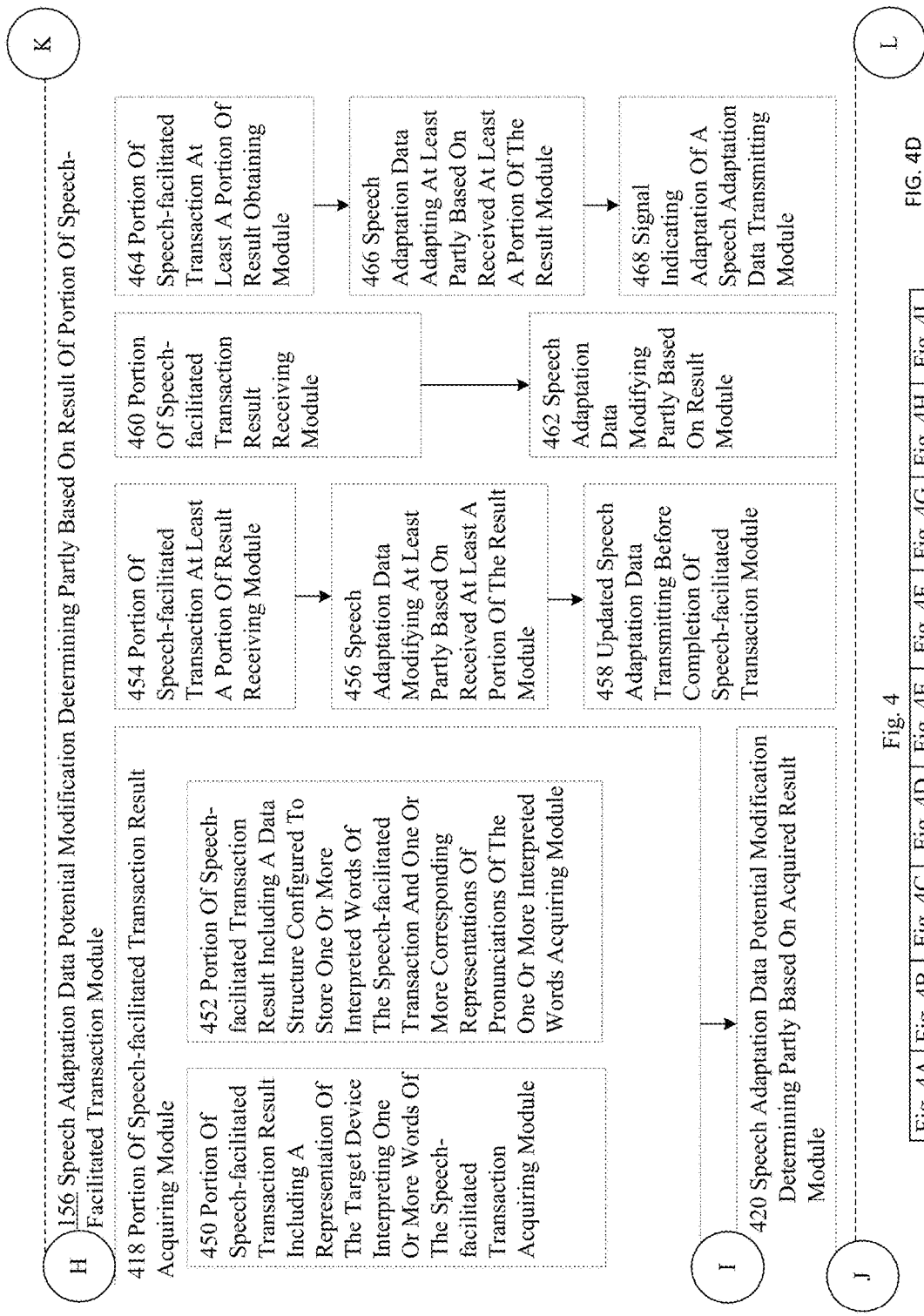
Figure 4:
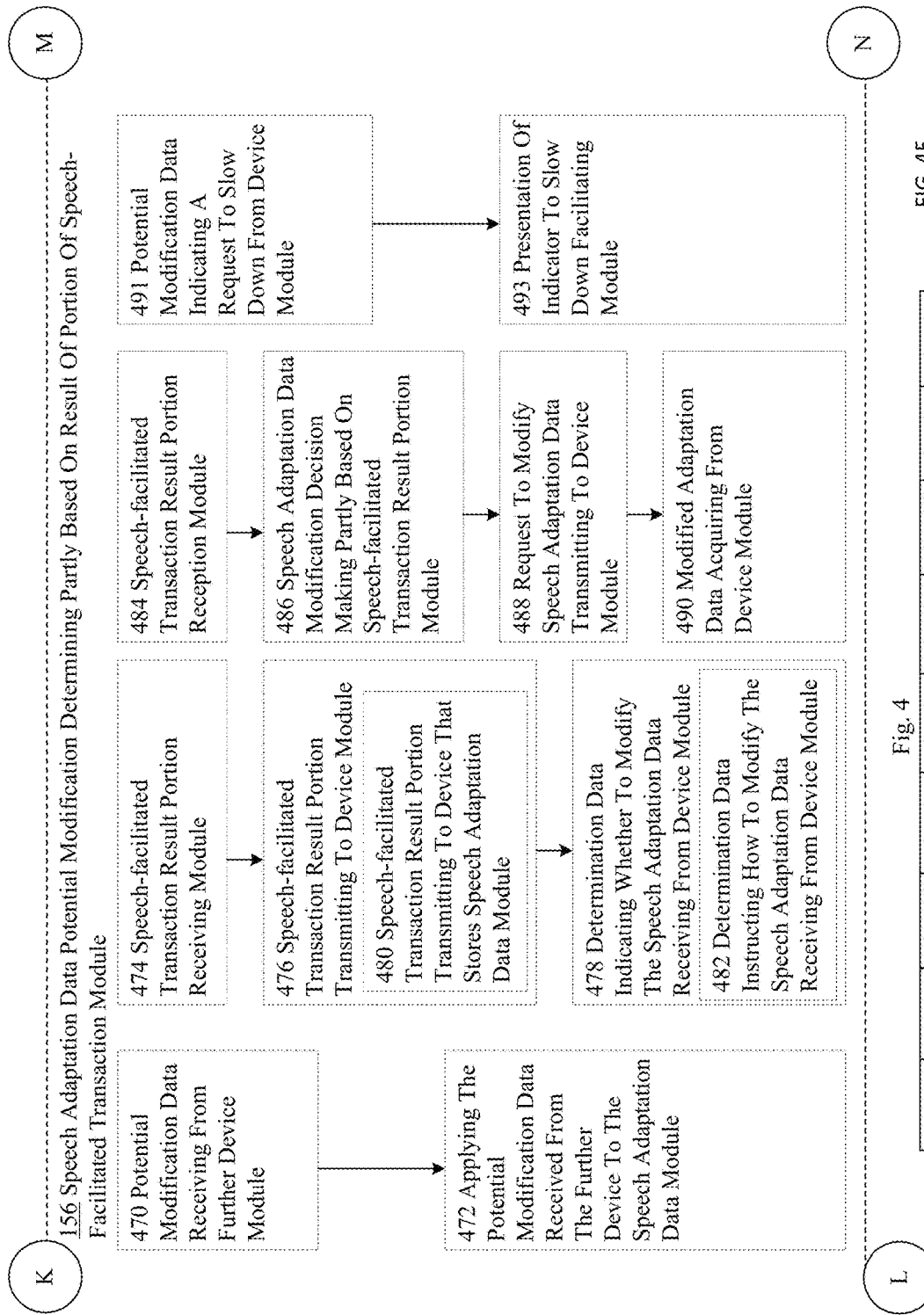
FIG. 4, including

Referring again to FIG. 4, e.g., FIG. 4D, module 156 may include one or more of module 418 and module 420, as previously described. In some embodiments, module 418 may include one or more of portion of speech-facilitated transaction result including a representation of the target device interpreting one or more words of the speech-facilitated transaction acquiring module 450 and portion of speech-facilitated transaction result including a data structure configured to store one or more interpreted words of the speech-facilitated transaction and one or more corresponding representations of pronunciations of the one or more interpreted words acquiring module 452. In some embodiments, module 156 may include one or more of portion of speech-facilitated transaction at least a portion of result receiving module 454, speech adaptation data modifying at least partly based on received at least a portion of the result module 456, updated speech adaptation data transmitting before completion of speech-facilitated transaction module 458, portion of speech-facilitated transaction result receiving module 460, speech adaptation data modifying partly based on result module 462, portion of speech-facilitated transaction at least a portion of result obtaining module 464, speech adaptation data adapting at least partly based on received at least a portion of the result module 466, and signal indicating adaptation of a speech adaptation data transmitting module 468.

Referring again to FIG. 4, e.g., FIG. 4E, module 156 may include one or more of potential modification data receiving from further device module 470, applying the potential modification data received from the further device to the speech adaptation data module 472, speech-facilitated transaction result portion receiving module 474, speech-facilitated transaction result portion transmitting to device module 476 (e.g., which, in some embodiments, may include speech-facilitated transaction result portion transmitting to device that stores speech adaptation data module 480), determination data indicating whether to modify the speech adaptation data receiving from device module 478 (e.g., which, in some embodiments, may include determination data instructing how to modify the speech adaptation data receiving from device module 482), speech-facilitated transaction result portion reception module 484, speech adaptation data modification decision making partly based on speech-facilitated transaction result portion module 486, request to modify speech adaptation data transmitting to device module 488, and modified adaptation data acquiring from device module 490.

Referring again to FIG. 4, e.g., FIG. 4F, module 156 may include one or more of result of particular portion of speech-facilitated transaction acquiring module 492, speech adaptation data potential modification application at least partly based on acquired result of the particular portion of speech-facilitated transaction module 494, and modified speech adaptation data configured to be applied by the target device to a further portion of the speech-facilitated transaction transmitting module 496. In some embodiments, module 494 may include algorithm of speech adaptation data potential modification apply at least partly based on acquired result of the particular portion of speech-facilitated transaction module 498. In some embodiments, module 498 may include one or more of parameter of algorithm of speech adaptation data potential modification application at least partly based on acquired result of the particular portion of speech-facilitated transaction module 401 and different algorithm of speech adaptation data selecting at least partly based on acquired result of the particular portion of speech-facilitated transaction module 403.

Referring again to FIG. 4, e.g., FIG. 4G, module 156 may include one or more of module 492, module 494, and module 496, as previously described. In some embodiments, module 494 may include pronunciation dictionary potential modification application at least partly based on acquired result of the particular portion of speech-facilitated transaction module 405. In some embodiments, module 405 may include one or more of one or more word adding to pronunciation dictionary at least partly based on acquired result of the particular portion of speech-facilitated transaction module 407, one or more word adding to pronunciation dictionary at least partly based on acquired result of the particular portion of speech-facilitated transaction that includes the one or more words module 409, and pronunciation dictionary substitution at least partly based on acquired result of the particular portion of speech-facilitated transaction module 411.

Referring again to FIG. 4, e.g., FIG. 4H, module 156 may include one or more of module 492, module 494, and module 496, as previously described. In some embodiments, module 494 may include path of path selection algorithm potential modification application at least partly based on acquired result of the particular portion of speech-facilitated transaction module 413. In some embodiments, module 496 may include one or more of modified speech adaptation data configured to be used to interpret a further portion of the speech-facilitated transaction transmitting module 415, modified speech adaptation data configured to be used to interpret a further portion of the speech-facilitated transaction directly after interpreting the particular portion transmitting module 417, modified speech adaptation data transmitting module 419, and indication of receipt of modified speech adaptation data receiving module 421.

Referring again to FIG. 4, e.g., FIG. 4I, module 156 may include one or more of module 492, module 494, and module 496, as previously described. In some embodiments, module 496 may include one or more of modified speech adaptation data transmitting module 423, indication of application of modified speech adaptation data receiving module 425, and indication of readiness to complete further portion of speech-facilitated transaction presentation facilitating module 427. In some embodiments, module 427 may include one or more of message indicating readiness of further portion of speech-facilitated transaction displaying module 429 and message indicating readiness of further portion of speech-facilitated transaction display on target device facilitating module 431.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
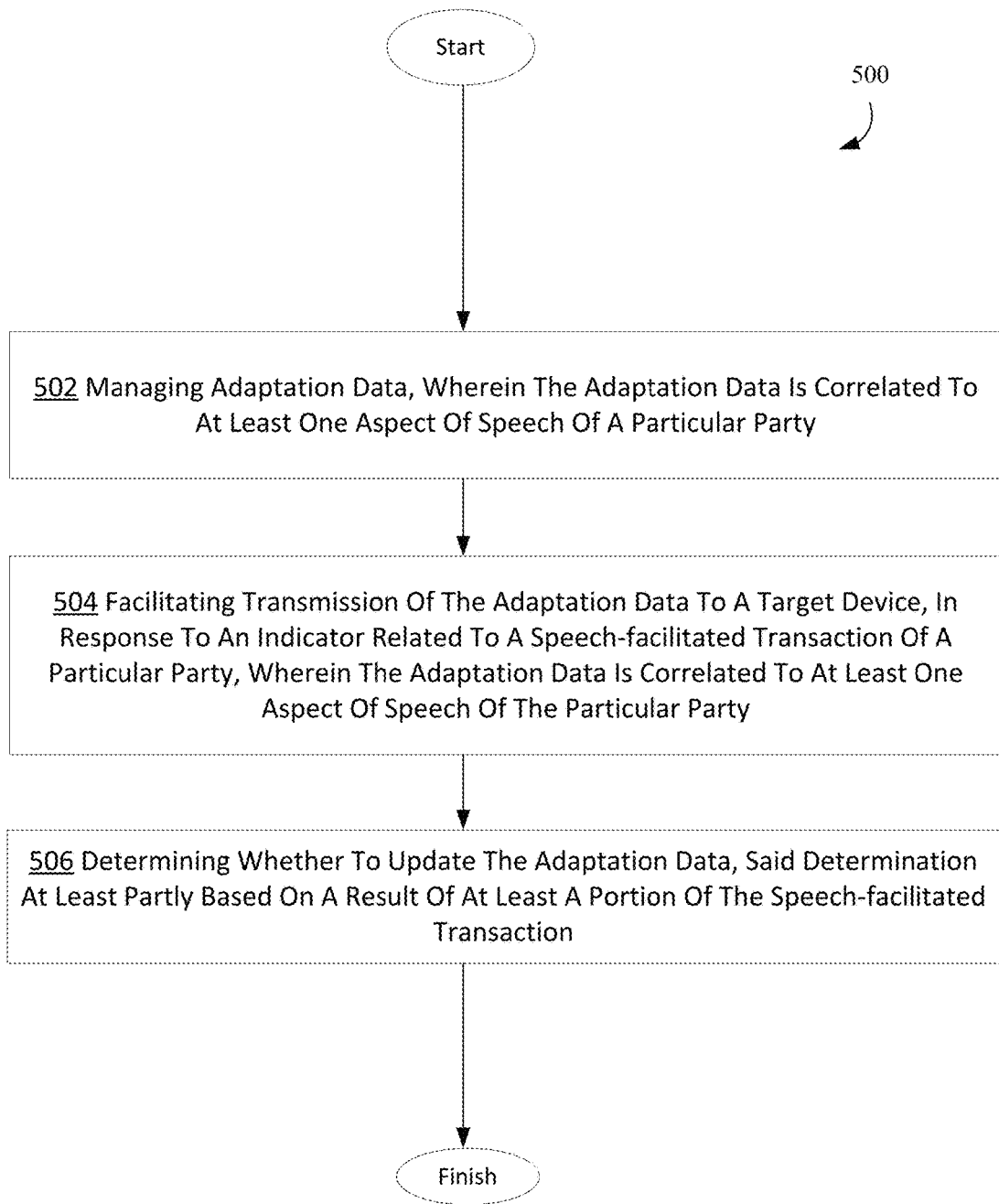
FIG. 5 is a high-level logic flowchart of a process, e.g., operational flow 500, according to an embodiment.

Further, in FIGS. 2-4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIGS. 5-8 as well as the other operations to be described herein may be performed by at least one of a machine, an article of manufacture, or a composition of matter.

Referring now to FIG. 5, FIG. 5 shows operation 500, which may include operation 502 depicting managing adaptation data, wherein the adaptation data is correlated to at least one aspect of speech of a particular party. For example, FIG. 1, e.g., FIG. 1B, shows speech adaptation data related to at least one aspect of a particular party regulating module 152 managing (e.g., storing, tracking, monitoring, authorizing, changing the permissions of, providing access, allocating storage for, retrieving, receiving, processing, altering, comparing, or otherwise performing one or more operations on adaptation data), wherein the adaptation data (e.g., a phrase completion algorithm used to assist in interpreting spoken words based on context) is correlated to at least one aspect of speech of a particular party (e.g., the user previously conducted a speech-facilitated transaction with a different automated teller machine device terminal, and the groupings of words spoken by the user assisted in forming the contextual rules used by at least a portion of the phrase completion algorithm).

Referring again to FIG. 5, operation 500 may include operation 504 depicting facilitating transmission of the adaptation data to a target device, in response to an indicator related to a speech-facilitated transaction of a particular party, wherein the adaptation data is correlated to at least one aspect of speech of the particular party. For example, FIG. 1, e.g., FIG. 1B, shows speech adaptation data transmission, in response to indication of a speech-facilitated transaction including a target device, facilitating module 154 facilitating transmission (e.g., transmitting, or taking one or more steps that will assist in the transmission of, regardless of the starting or ending point) of the adaptation data (e.g., a phrase completion algorithm used to assist in interpreting spoken words based on context) to a target device, in response to an indicator (e.g., a user either stands in front of an automated teller machine device terminal, or inserts her card, or pushes a button, or speaks a start phrase that is displayed on the screen of the automated teller machine device terminal) of a speech-facilitated transaction (e.g., withdrawing two hundred dollars from the automated teller machine device terminal by commanding the automated teller machine device using speech commands for at least part of the transaction) of a particular party (e.g., the user of the automated teller machine device), wherein the adaptation data is correlated to at least one aspect of speech of the particular party (e.g., the user previously conducted a speech-facilitated transaction with a different automated teller machine device terminal, and the groupings of words spoken by the user assisted in forming the contextual rules used by at least a portion of the phrase completion algorithm).

Referring again to FIG. 5, operation 500 may include operation 506 depicting determining whether to update the adaptation data, said determination at least partly based on a result of at least a portion of the speech-facilitated transaction. For example. FIG. 1, e.g., FIG. 1B, shows speech adaptation data potential modification determining partly based on result of portion of speech-facilitated transaction module 156 determining whether to update (e.g., change, modify, change a timestamp of, change a parameter of, delete, supplement, alter, transmit to a different location, change an address of, refresh, or other operation) the adaptation data (e.g., the phrase completion algorithm used to assist in interpreting spoken words based on context), said determination at least partly based on a result (e.g., a representation, either numeric or otherwise, provided by a machine inference, explicit user input, or other source, with or without human intervention) of at least a portion of the speech-facilitated transaction (e.g., withdrawing two hundred dollars from the automated teller machine device terminal by commanding the automated teller machine device using speech commands for at least part of the transaction).

Figure 6A:
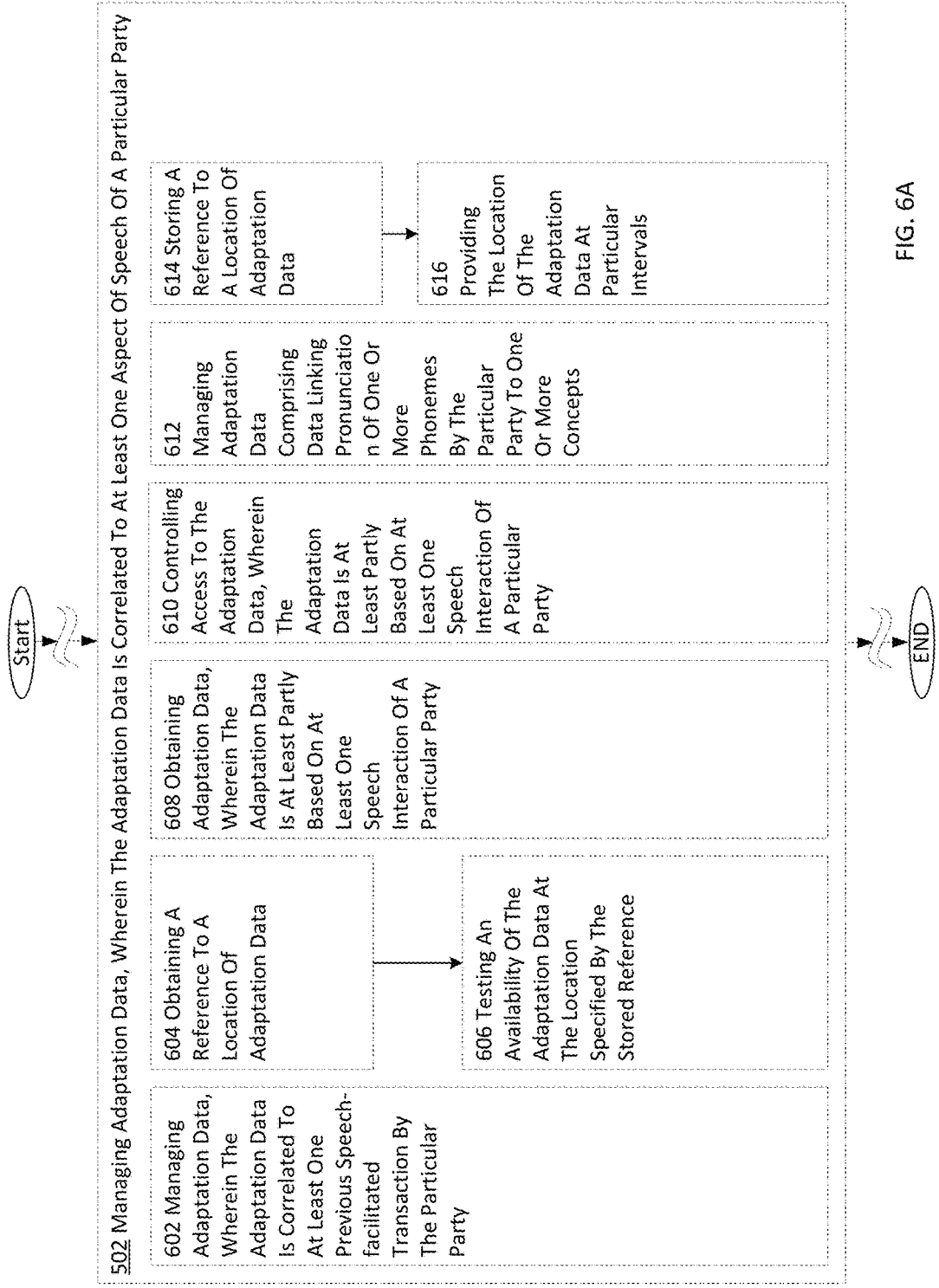
FIG. 6A is a high-level logic flow chart of a process depicting alternate implementations of a managing adaptation data operation 502 of FIG. 5, according to one or more embodiments.
Figure 6B:
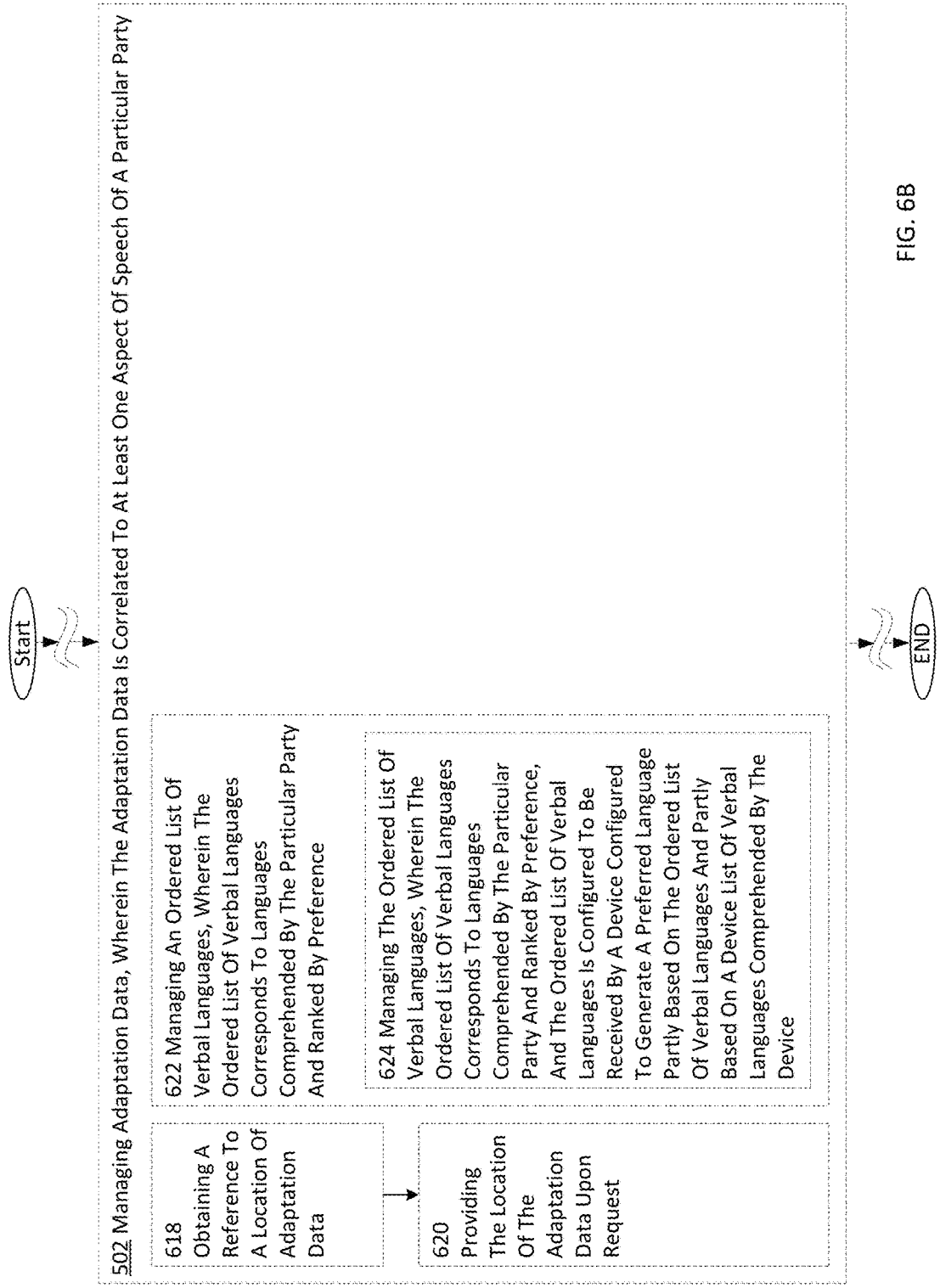
FIG. 6B is a high-level logic flow chart of a process depicting alternate implementations of a managing adaptation data operation 502 of FIG. 5, according to one or more embodiments.

FIGS. 6A-6B depict various implementations of operation 502, according to embodiments. Referring now to FIG. 6A, operation 502 may include operation 602 depicting managing adaptation data, wherein the adaptation data is correlated to at least one previous speech-facilitated transaction by the particular party. For example, FIG. 2, e.g., FIG. 2A, shows speech adaptation data related to at least one prior interaction between a particular party and a device regulating module 202 managing adaptation data (e.g., an ungrammatical utterance deletion algorithm), wherein the adaptation data is correlated to at least one previous speech-facilitated transaction by the particular party (e.g., the user's ungrammatical utterances in a previous transaction are recorded and analyzed, and stored in the adaptation data so that they can be removed more efficiently in future speech-facilitated transactions).

Referring again to FIG. 6A, operation 502 may include operation 604 depicting obtaining a reference to a location of adaptation data. For example, FIG. 2, e.g., FIG. 2A, shows address at which speech adaptation data is stored obtaining module 204 obtaining (e.g., receiving, acquiring, generating, retrieving, creating, or otherwise getting) a reference to a location (e.g., an Internet Protocol "IP") address of a computer that stores adaptation data) of adaptation data (e.g., a partial pattern tree model).

Referring again to FIG. 6A, operation 502 may include operation 606 depicting testing an availability of the adaptation data at the location specified by the stored reference. For example, FIG. 2, e.g., FIG. 2A, shows determining, at a particular time, whether the speech adaptation data is available at the obtained address module 206 testing an availability of the adaptation data (e.g., determining whether a network connection is available to retrieve the adaptation data, or checking the file integrity of the adaptation data) at the location (e.g., at the device specified by the IP address) specified by the stored reference (the IP address).

Referring again to FIG. 6A, operation 502 may include operation 608 depicting obtaining adaptation data, wherein the adaptation data is at least partly based on at least one speech interaction of a particular party. For example, FIG. 2, e.g., FIG. 2A, shows speech adaptation data related to at least one aspect of a particular party obtaining module 208 obtaining adaptation data (e.g., a regional dialect application algorithm), wherein the adaptation data is at least partly based on at least one speech interaction of a particular party (e.g., a user runs a program on a home computer that records the user's speech and trains the system, which learns the regional dialect of the user through the training program, and generates or modifies the regional dialect application algorithm).

Referring again to FIG. 6A, operation 502 may include operation 610 depicting controlling access to the adaptation data, wherein the adaptation data is at least partly based on at least one speech interaction of a particular party. For example, FIG. 2, e.g., FIG. 2A, shows speech adaptation data related to at least one aspect of a particular party access monitoring module 210 controlling access (e.g., maintaining a permissions list, or determining one or more users/programs/devices/etc that are permitted to read, modify, update, and/or delete) to the adaptation data (e.g., a stochastic state transition network), wherein the adaptation data is at least partly based on at least one speech interaction of a particular party (e.g., a user giving speech commands to a speech-enabled Blu-ray player).

Referring again to FIG. 6A, operation 502 may include operation 612 depicting managing adaptation data comprising data linking pronunciation of one or more phonemes by the particular party to one or more concepts. For example, FIG. 2, e.g., FIG. 2A, shows speech adaptation data linking pronunciation of one or more syllables to one or more concepts regulating module 212 managing adaptation data comprising data linking pronunciation of one or more phonemes (e.g., phonemes comprising the word "twenty" by the particular party to one or more concepts (e.g., the concept of having twenty of something, e.g., withdrawing twenty dollars, if the device being communicated with is an automated teller machine device).

Referring again to FIG. 6A, operation 502 may include operation 614 depicting obtaining a reference to a location of adaptation data. For example, FIG. 2, e.g., FIG. 2A, shows address of adaptation data generating module 214 obtaining (e.g., retrieving from memory) a reference to a location (e.g., a location within a cloud service, e.g., Amazon's cloud services) of adaptation data (e.g., a phrase completion algorithm).

Referring again to FIG. 6A, operation 502 may include operation 616 depicting providing the location of the adaptation data at particular intervals. For example, FIG. 2, e.g., FIG. 2A, shows address of adaptation data providing module 216 providing (e.g., broadcasting generally or transmitting to a specific device or devices) the location of the adaptation data (e.g., the phrase completion algorithm) at particular intervals (e.g., once a minute).

Referring now to FIG. 6B, operation 502 may include operation 618 depicting obtaining a reference to a location of adaptation data. For example, FIG. 2, e.g., FIG. 2B, shows address of adaptation data generating module 218 obtaining (e.g., receiving, from a remote source, e.g., a remote server) a reference to a location (e.g., a web address, or a location on a networked drive) of adaptation data (e.g., a basic pronunciation adjustment algorithm).

Referring again to FIG. 6B, operation 502 may include operation 620 depicting providing the location of the adaptation data upon request. For example, FIG. 2, e.g., FIG. 2B, shows address of adaptation data providing upon request module 220 providing the location (e.g., a directory and filename on a networked drive) of the adaptation data (e.g., the basic pronunciation adjustment algorithm) upon request (e.g., upon receipt of a request, e.g., from a user of the device, or from a signal received from another device, e.g., a target device, e.g., a speech-enabled digital video disc ("DVD") player).

Referring again to FIG. 6B, operation 502 may include operation 622 depicting managing an ordered list of verbal languages, wherein the ordered list of verbal languages corresponds to languages comprehended by the particular party and ranked by preference. For example, FIG. 2, e.g., FIG. 2B, shows language list spoken by particular party regulating module 222 managing an ordered list of verbal languages (e.g., "English, French, Spanish, Italian, German"), wherein the ordered list of verbal languages corresponds to languages comprehended by the particular party (e.g., the user might have English as a first language, be fluent in French, understand some Spanish, and be able to catch a few words of Italian and German) and ranked by preference (e.g., the user would rather speak English, then French, and then the other languages.

Referring again to FIG. 6B, operation 502 may include operation 624 depicting managing the ordered list of verbal languages, wherein the ordered list of verbal languages corresponds to languages comprehended by the particular party and ranked by preference, and the ordered list of verbal languages is configured to be received by a device configured to generate a preferred language partly based on the ordered list of verbal languages and partly based on a device list of verbal languages comprehended by the device. For example, FIG. 2, e.g., FIG. 2B, shows language list spoken by particular party and configured to facilitate selection of transaction communication language regulating module 224 managing the ordered list of verbal languages (e.g., English, Spanish, and French), wherein the ordered list of verbal languages corresponds to languages comprehended by the particular party and ranked by preference, and the ordered list of verbal languages is configured to be received by a device (e.g., an automated ticket dispensing device in an airport in Spain) configured to generate a preferred language (e.g., Spanish) partly based on the ordered list of verbal languages (e.g., English, Spanish, and French) and partly based on a device list of verbal languages comprehended by the device ((e.g., Spanish, Basque, Italian, and French), so Spanish is selected as common to both lists and with a higher "rank" than French).

Figure 7A:
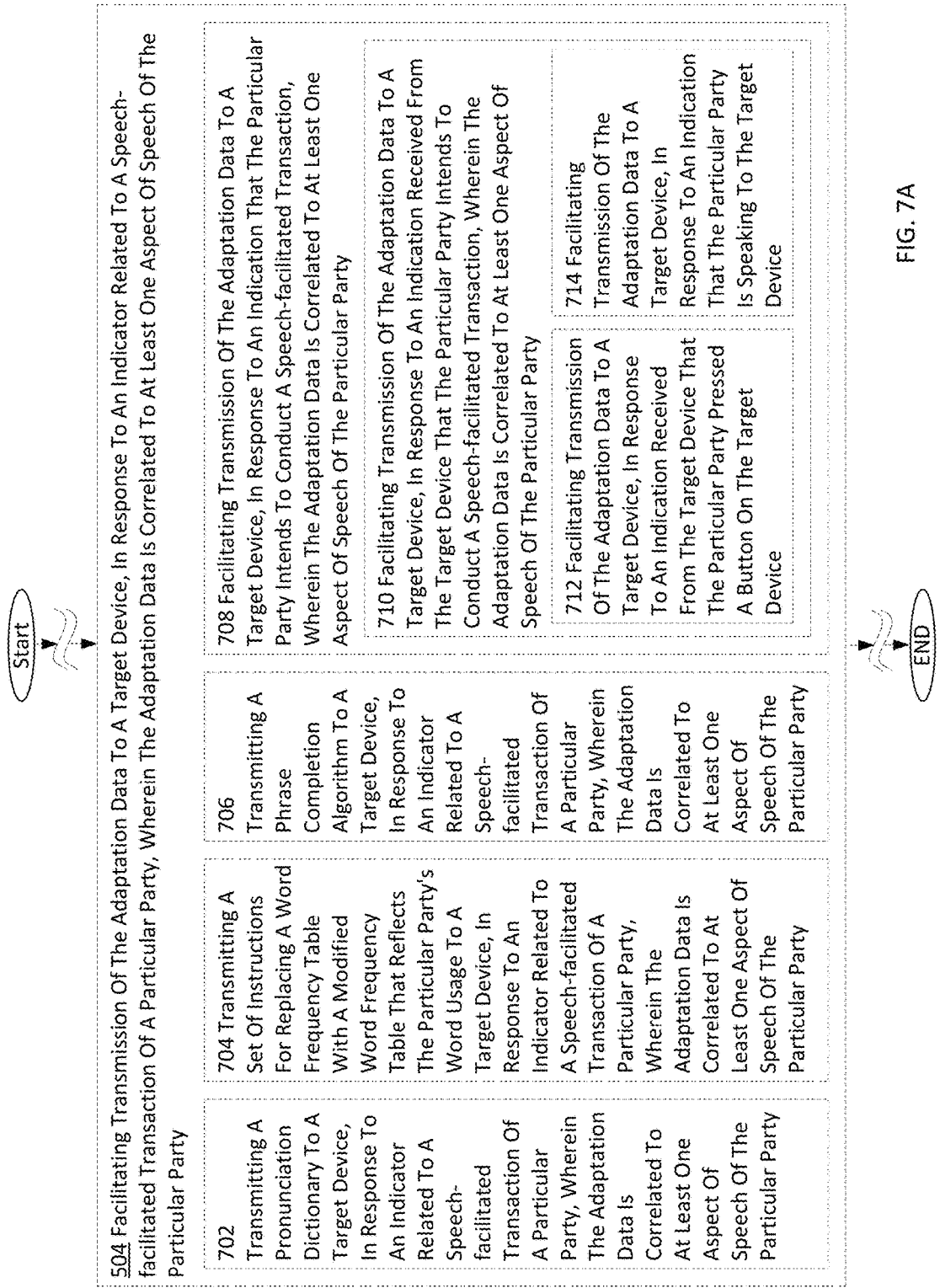
FIG. 7A is a high-level logic flow chart of a process depicting alternate implementations of a facilitating transmission of the adaptation data 504 of FIG. 5, according to one or more embodiments.

FIGS. 7A-7B depict various implementations of operation 504, according to embodiments. Referring now to FIG. 7A, operation 504 may include operation 702 depicting transmitting a pronunciation dictionary to a target device, in response to an indicator related to a speech-facilitated transaction of a particular party, wherein the adaptation data is correlated to at least one aspect of speech of the particular party. For example, FIG. 3, e.g., FIG. 3A, shows speech adaptation data including a list of one or more words and corresponding pronunciations transmission, in response to indication of a speech-facilitated transaction including a target device, facilitating module 302 transmitting a pronunciation dictionary to a target device (e.g., a motor vehicle control system), in response to an indicator related to a speech-facilitated transaction of a particular party (e.g., the user depresses a button on the steering wheel indicating that the user wants to give a speech command), wherein the adaptation data (e.g., an utterance ignoring algorithm) is correlated to at least one aspect of speech of the particular party (e.g., is correlated to prior pronunciations of words spoken by the user).

Referring again to FIG. 7A, operation 504 may include operation 704 depicting transmitting a set of instructions for replacing a word frequency table with a modified word frequency table that reflects the particular party's word usage to a target device, in response to an indicator related to a speech-facilitated transaction of a particular party, wherein the adaptation data is correlated to at least one aspect of speech of the particular party. For example, FIG. 3, e.g., FIG. 3A, shows speech adaptation data including instructions for modifying a word frequency table transmission, in response to indication of a speech-facilitated transaction including a target device, facilitating module 304 transmitting a set of instructions for replacing a word frequency table with a modified word frequency table that reflects the particular party's word usage (e.g., with specific band names, e.g., "U2" higher in the word table based on the songs the user selects) to a target device (e.g., to a speech-enabled personal media player), in response to an indicator related to a speech-facilitated transaction (e.g., the user beginning to speak) of a particular party (e.g., the user of the speech-enabled personal media player), wherein the adaptation data (e.g., the modified word frequency table) is correlated to at least one aspect of speech of the particular party (e.g., how many times or how often the user speaks one or more words).

Referring again to FIG. 7A, operation 504 may include operation 706 depicting transmitting a phrase completion algorithm to a target device, in response to an indicator related to a speech-facilitated transaction of a particular party, wherein the adaptation data is correlated to at least one aspect of speech of the particular party. For example, FIG. 3, e.g., FIG. 3A, shows speech adaptation data including phrase completion algorithm transmission, in response to indication of a speech-facilitated transaction including a target device, facilitating module 306 transmitting a phrase completion algorithm to a target device (e.g., a speech-enabled automated teller machine device), in response to an indicator related to a speech-facilitated transaction (e.g., the speech-enabled automated teller machine device detects that one or more particular words are being spoken by the user) of a particular party (e.g., a user waiting in line to use the speech-enabled automated teller machine device), wherein the adaptation data is correlated to at least one aspect of speech of the particular party (e.g., a specific way that the user pronounces the word "fifty").

Referring again to FIG. 7A, operation 504 may include operation 708 depicting facilitating transmission of the adaptation data to a target device, in response to an indication that the particular party intends to conduct a speech-facilitated transaction, wherein the adaptation data is correlated to at least one aspect of speech of the particular party. For example, FIG. 3, e.g., FIG. 3A, shows speech adaptation data transmission, in response to indication of intention to conduct a speech-facilitated transaction, facilitating module 308 facilitating transmission of the adaptation data (e.g., a noise level dependent filtration algorithm) to a target device (e.g., an automated drive-thru window), in response to an indication that the particular party (e.g., the user in her car) intends to conduct a speech-facilitated transaction (e.g., the user drives her car into a particular position detected by the system as being close enough to the automated drive-thru window to place an order), wherein the adaptation data is correlated to at least one aspect of speech of the particular party (e.g., correlated to previous speech of the user at other automated drive thru windows).

Referring again to FIG. 7A, operation 708 may include operation 710 depicting facilitating transmission of the adaptation data to a target device, in response to an indication received from the target device that the particular party intends to conduct a speech-facilitated transaction, wherein the adaptation data is correlated to at least one aspect of speech of the particular party. For example, FIG. 3, e.g., FIG. 3A, shows speech adaptation data transmission, in response to receipt from target device of indication of intention to conduct a speech-facilitated transaction, facilitating module 310 facilitating transmission of the adaptation data (e.g., an emotion-based pronunciation adjustment algorithm) to a target device (e.g., a home security system), in response to an indication received from the target device (e.g., a base station of a home security system) that the particular party intends to conduct a speech-facilitated transaction (e.g., the particular party begins speaking (e.g., it can be determined later, or by another unit, whether the user is actually speaking to the target device, but, in an embodiment such as this one, the target device interprets the speech as the particular party intending to initiate a speech-facilitated transaction), wherein the adaptation data is correlated to at least one aspect of speech of the particular party (e.g., speech patterns of the user that were detected over a period of time).

Referring again to FIG. 7A, operation 710 may include operation 712 depicting facilitating transmission of the adaptation data to a target device, in response to an indication received from the target device that the particular party pressed a button on the target device. For example, FIG. 3, e.g., FIG. 3A, shows speech adaptation data transmission, in response to receipt from target device of indication that the particular party interacted with an input portion of the target device, facilitating module 312 facilitating transmission of the adaptation data (e.g., a syllable pronunciation database) to a target device (e.g., an automated teller machine device), in response to an indication received from the target device that the particular party pressed a button on the target device (e.g., a touchscreen button on a display of the automated teller machine device that says "begin").

Referring again to FIG. 7A, operation 710 may include operation 714 depicting facilitating transmission of the adaptation data to a target device, in response to an indication that the particular party is speaking to the target device. For example, FIG. 3, e.g., FIG. 3A, shows speech adaptation data transmission, in response to receipt indication that the particular party is directing speech to the target device, facilitating module 314 facilitating transmission of the adaptation data (e.g., an accent-based pronunciation modification algorithm) to a target device (e.g., a speech-enabled laptop computer), in response to an indication that the particular party is speaking to the target device (e.g., in response to receiving a signal indicating that the microphone of the laptop has recorded sounds that have been identified as speech).

Referring now to FIG. 7B, operation 710 may include operation 716 depicting facilitating transmission of the adaptation data to a target device, in response to a request from the target device for adaptation data correlated to at least one aspect of speech of the particular party. For example, FIG. 3, e.g., FIG. 3A, shows speech adaptation data transmission, in response to request for speech adaptation data, facilitating module 316 facilitating transmission of the adaptation data (e.g., a sentence diagramming path selection algorithm) to a target device (e.g., a speech-enabled television set), in response to a request from the target device for adaptation data correlated to at least one aspect of speech of the particular party (e.g., adaptation data derived from speech commands given to previous televisions owned by the user).

Referring again to FIG. 7B, operation 708 may include operation 718 depicting facilitating transmission of the adaptation data to a target device, in response to an indication received from a particular device associated with the particular party that the particular party intends to conduct a speech-facilitated transaction, wherein the adaptation data is correlated to at least one aspect of speech of the particular party. For example, FIG. 3, e.g., FIG. 3B, shows speech adaptation data transmission, in response to received indication of intention to conduct a speech-facilitated transaction from a particular device, facilitating module 318 facilitating transmission of the adaptation data (e.g., an uncommon word pronunciation guide) to a target device (e.g., a speech-enabled microwave oven), in response to an indication received from a particular device (e.g., a key ring with a chip and memory configured to send, receive, and store adaptation data) associated with the particular party (e.g., carried by the particular party) that the particular party intends to conduct a speech-facilitated transaction (e.g., commanding the microwave oven to defrost for five minutes), wherein the adaptation data is correlated to at least one aspect of speech of the particular party (e.g., previous speech interactions of the particular party).

Figure 7C:
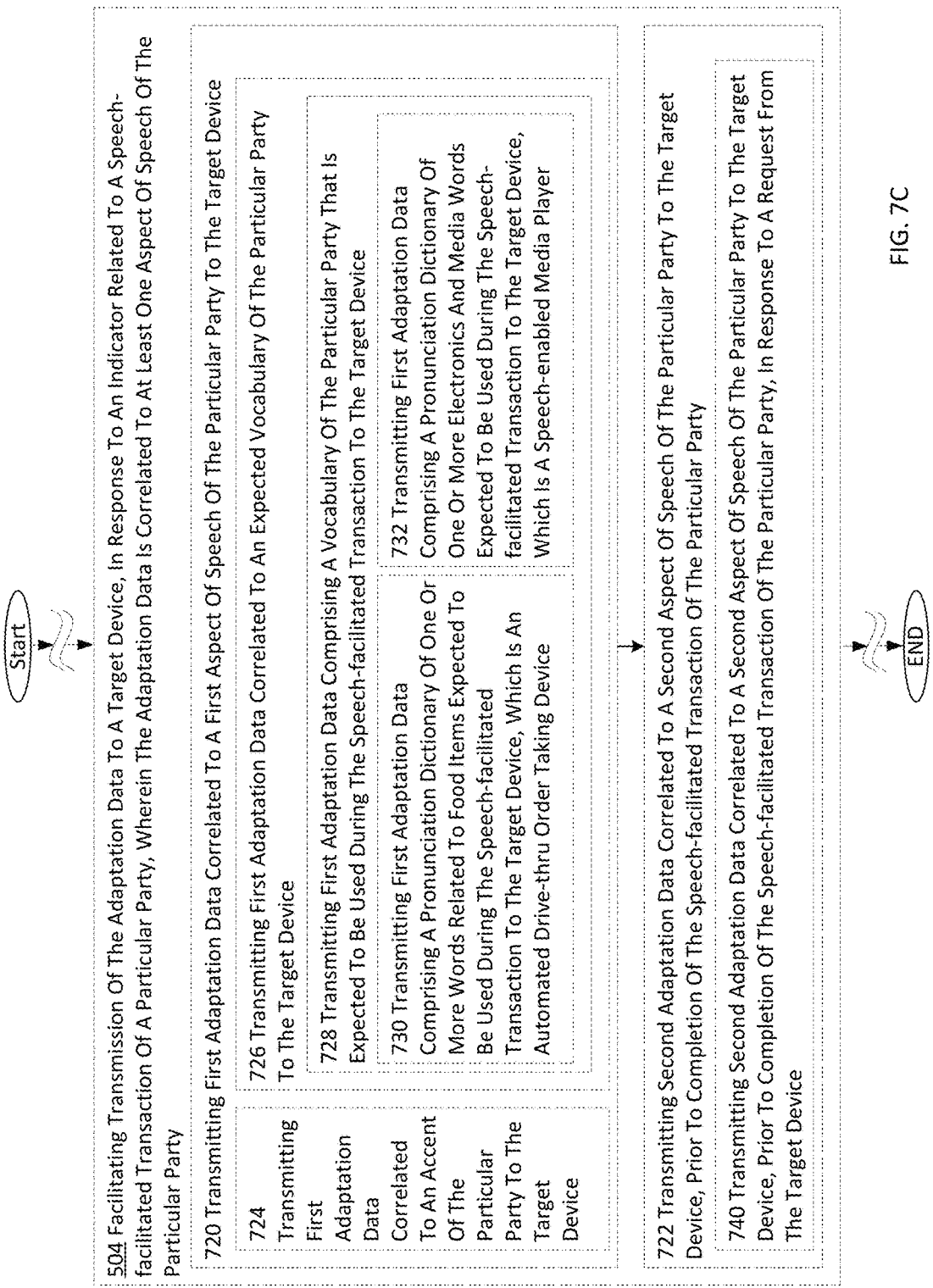
FIG. 7C is a high-level logic flow chart of a process depicting alternate implementations of a facilitating transmission of the adaptation data 504 of FIG. 5, according to one or more embodiments.

Referring now to FIG. 7C, operation 504 may include operation 720 depicting transmitting first adaptation data correlated to a first aspect of speech of the particular party to the target device. For example, FIG. 3, e.g., FIG. 3C, shows first speech adaptation data related to first aspect of speech of particular party transmitting to target device module 320 transmitting first adaptation data (e.g., accent-based pronunciation modification algorithm) correlated to a first aspect of speech of the particular party (e.g., an accent based on where the particular party is from) to the target device (e.g., a speech-enabled audio/visual receiver).

Referring again to FIG. 7C, operation 504 may include operation 722 depicting transmitting second adaptation data correlated to a second aspect of speech of the particular party to the target device, prior to completion of the speech-facilitated transaction of the particular party. For example, FIG. 3, e.g., FIG. 3C, shows second speech adaptation data related to second aspect of speech of particular party transmitting to target device module 322 transmitting second adaptation data (e.g., a different accent-based pronunciation modification algorithm) correlated to a second aspect of speech of the particular party (e.g., based on the user's previous pronunciation of a set of words such as "volume," "source," "play," and "fast-forward"), prior to completion of the speech-facilitated transaction of the particular party (e.g., before the speech-facilitated transaction ends). In an example, if the audio/visual receiver is having trouble interpreting the speech based on the first adaptation data, which may be accent-based, then the receiver may request additional adaptation data, which may be prior pronunciation-based.

Referring again to FIG. 7C, operation 720 may include operation 724 depicting transmitting first adaptation data correlated to an accent of the particular party to the target device. For example, FIG. 3, e.g., FIG. 3C, shows first speech adaptation data related to a manner of speaking of particular party transmitting to target device module 324 transmitting first adaptation data correlated to an accent of the particular party to the target device (e.g., a motor vehicle assistance/dialing system, e.g., OnStar).

Referring again to FIG. 7C, operation 720 may include operation 726 depicting transmitting first adaptation data correlated to an expected vocabulary of the particular party to the target device. For example, FIG. 3, e.g., FIG. 3C, shows first speech adaptation data related to expected vocabulary transmitting to target device module 326 transmitting first adaptation data correlated to an expected vocabulary (e.g., pronunciation guidelines of words that might be used in the transaction, e.g., "money," "checking," and "savings") of the particular party to the target device (e.g., an automated teller machine device).

Referring again to FIG. 7C, operation 726 may include operation 728 depicting transmitting first adaptation data comprising a vocabulary of the particular party that is expected to be used during the speech-facilitated transaction to the target device. For example, FIG. 3, e.g., FIG. 3C, shows first speech adaptation data related to vocabulary estimated to be used in course of speech-facilitated transaction to target device module 328 transmitting first adaptation data comprising a vocabulary of the particular party (e.g., a pronunciation of street names, city names, and proper names of places) that is expected to be used during the speech-facilitated transaction (e.g., navigating to a place) to the target device (e.g., a personal navigation system mounted on a car windshield).

Referring again to FIG. 7C, operation 728 may include operation 730 depicting transmitting first adaptation data comprising a pronunciation dictionary of one or more words related to food items expected to be used during the speech-facilitated transaction to the target device, which is an automated drive-thru order taking device. For example, FIG. 3, e.g., FIG. 3C, shows first speech adaptation data related to one or more words related to food items estimated to be used in course of speech-facilitated transaction to target device module 330 transmitting first adaptation data comprising a pronunciation dictionary of one or more words related to food items (e.g., "hamburger," "bacon," "quarter-pounder") expected to be used during the speech-facilitated transaction (e.g., ordering dinner at a fast food restaurant) to the target device, which is an automated drive-thru order taking device.

Referring again to FIG. 7C, operation 728 may include operation 732 depicting transmitting first adaptation data comprising a pronunciation dictionary of one or more electronics and media words expected to be used during the speech-facilitated transaction to the target device, which is a speech-enabled media player. For example, FIG. 3, e.g., FIG. 3C, shows first speech adaptation data related to one or more words related to one or more electronics estimated to be used in course of speech-facilitated transaction to target device module 332 transmitting first adaptation data comprising a pronunciation dictionary of one or more electronics and media words (e.g., "play," "stop," "eject," and "play the movie 'Inception'") expected to be used during the speech-facilitated transaction (e.g., interacting with a media player) to the target device, which is a speech-enabled media player.

Figure 7D:
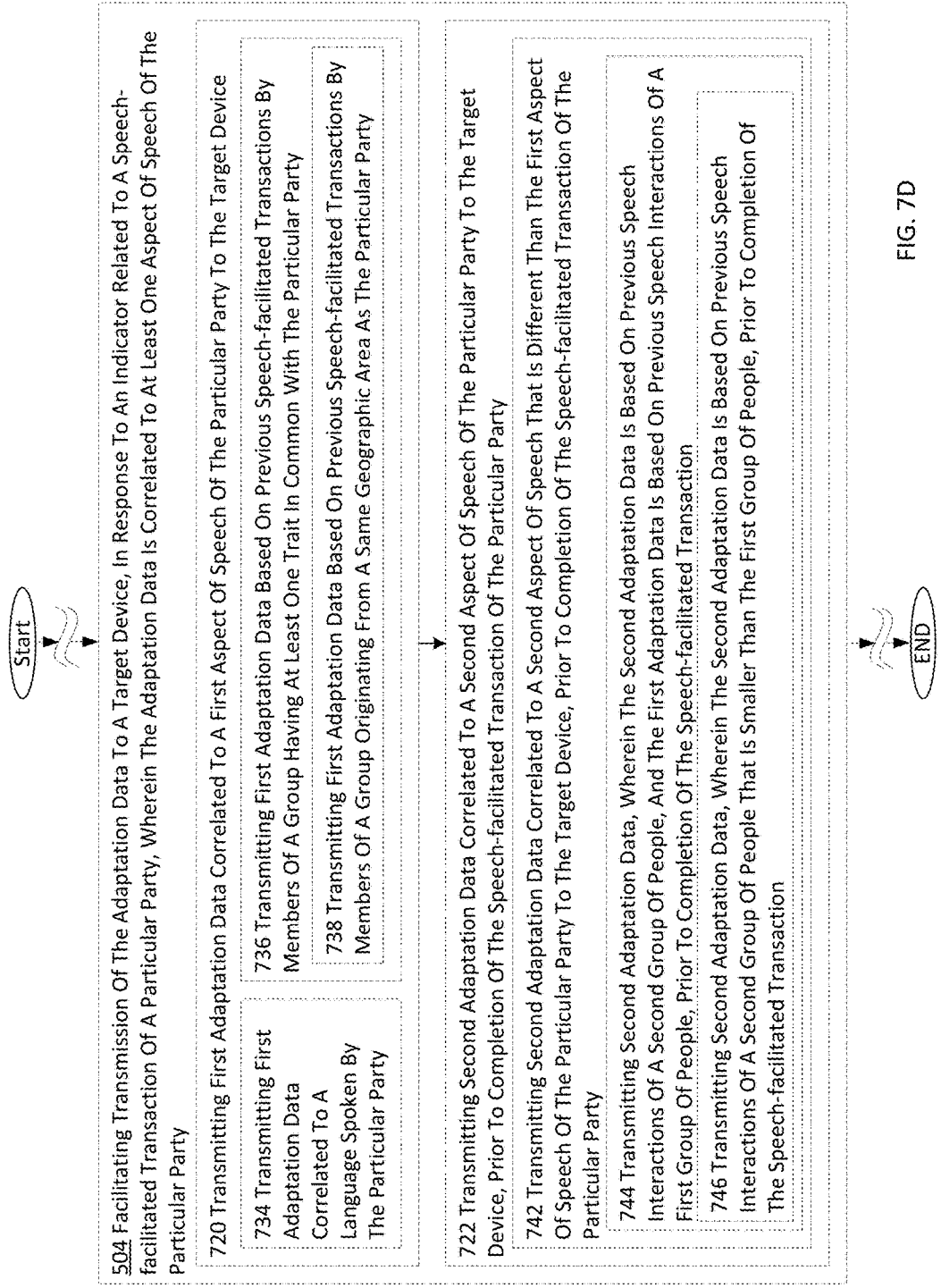
FIG. 7D is a high-level logic flow chart of a process depicting alternate implementations of a facilitating transmission of the adaptation data 504 of FIG. 5, according to one or more embodiments.

Referring now to FIG. 7D, operation 720 may include operation 734 depicting transmitting first adaptation data correlated to a language spoken by the particular party. For example, FIG. 3, e.g., FIG. 3D, shows first speech adaptation data related to a spoken language transmitting to target device module 334 transmitting first adaptation data correlated to a language (e.g., the first adaptation data takes French spoken by the user and converts it into the English equivalent that the device will understand) spoken by the particular party (e.g., the user is a French speaker).

Referring again to FIG. 7D, operation 720 may include operation 736 depicting transmitting first adaptation data based on previous speech-facilitated transactions by members of a group having at least one trait in common with the particular party. For example, FIG. 3, e.g., FIG. 3D, shows first speech adaptation data related to previous speech-facilitated transactions by members of a group having a particular trait transmitting to target device module 336 transmitting first adaptation data (e.g., a phoneme pronunciation database) based on previous speech-facilitated transactions by members of a group (e.g., people of Irish descent) having at least one trait (e.g., common descendants) in common with the particular party.

Referring again to FIG. 7D, operation 736 may include operation 738 depicting transmitting first adaptation data based on previous speech-facilitated transactions by members of a group originating from a same geographic area as the particular party. For example, FIG. 3, e.g., FIG. 3D, shows first speech adaptation data related to previous speech-facilitated transactions by members of a group from a particular community transmitting to target device module 338 transmitting first adaptation data (e.g., a basic pronunciation adjustment algorithm) based on previous speech-facilitated transactions by members of a group originating from a same geographic area (e.g., "the southern United States") as the particular party.

Referring back to FIG. 7C, operation 722 may include operation 740 depicting transmitting second adaptation data correlated to a second aspect of speech of the particular party to the target device, prior to completion of the speech-facilitated transaction of the particular party, in response to a request from the target device. For example, FIG. 3, e.g., FIG. 3C, shows second speech adaptation data related to second aspect of speech of particular party transmitting in response to target device request module 340 transmitting second adaptation data (e.g., a regional dialect application algorithm) correlated to a second aspect of speech of the particular party (e.g., a specific accent of the user based on the user's prior speech interactions) to the target device (e.g., an automated ticket dispensing device), prior to completion of the speech-facilitated transaction of the particular party, in response to a request from the target device (e.g., the target device could not quickly interpret the speech using only the first adaptation data, so the target device requested second adaptation data.

Referring again to FIG. 7D, operation 722 may include operation 742 depicting transmitting second adaptation data correlated to a second aspect of speech that is different than the first aspect of speech of the particular party to the target device, prior to completion of the speech-facilitated transaction of the particular party. For example, FIG. 3, e.g., FIG. 3C, shows second speech adaptation data related to second aspect that is different than the first aspect transmitting to target device module 342 transmitting second adaptation data (e.g., a part-of-speech labeling algorithm) correlated to a second aspect of speech (e.g., observed speech patterns from prior speech interactions) that is different than the first aspect of speech of the particular party (e.g., accents of a group of people that the particular party is part of) to the target device (e.g., the motor vehicle control system), prior to completion of the speech-facilitated transaction of the particular party.

Referring again to FIG. 7D, operation 742 may include operation 744 depicting transmitting second adaptation data, wherein the second adaptation data is based on previous speech interactions of a second group of people, and the first adaptation data is based on previous speech interactions of a first group of people, prior to completion of the speech-facilitated transaction. For example, FIG. 3, e.g., FIG. 3C, shows second speech adaptation data related to previous speech interactions of second group that is different than a first group related to the first speech adaptation data transmitting to target device module 344 transmitting second adaptation data (e.g., a second pronunciation adjustment algorithm, wherein the first adaptation data was a first, different pronunciation adjustment algorithm), wherein the second adaptation data is based on previous speech interactions of a second group of people (e.g., a people of particular ethnic background), and the first adaptation data is based on previous speech interactions of a first group of people (e.g., a group of people raised in a particular city), prior to completion of the speech-facilitated transaction.

Referring again to FIG. 7D, operation 744 may include operation 746 depicting transmitting second adaptation data, wherein the second adaptation data is based on previous speech interactions of a second group of people that is smaller than the first group of people, prior to completion of the speech-facilitated transaction. For example, FIG. 3, e.g., FIG. 3C, shows second speech adaptation data related to previous speech interactions of second group that is smaller than a first group related to the first speech adaptation data transmitting to target device module 346 transmitting second adaptation data (e.g., a second pronunciation adjustment algorithm designed to modify the first pronunciation adjustment algorithm), wherein the second adaptation data is based on previous speech interactions of a second group of people (e.g., people directly related to the particular party for which previous speech interactions were detected and analyzed) that is smaller than the first group of people (e.g., people who were raised in a particular city), prior to completion of the speech-facilitated transaction.

Figure 8B:
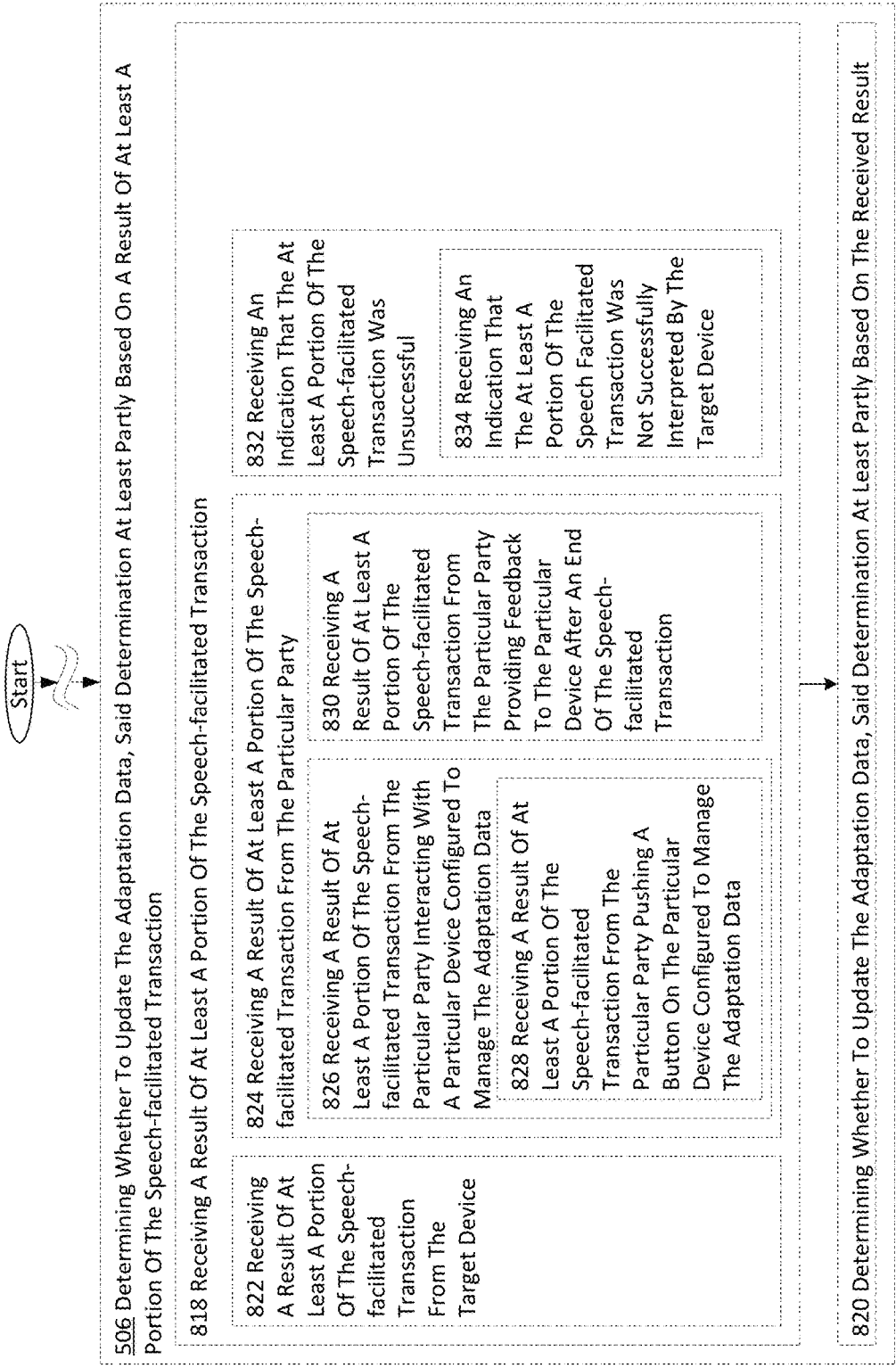
FIG. 8B is a high-level logic flowchart of a process depicting determining whether to update the adaptation data 506 of FIG. 5, according to one or more embodiments.

FIGS. 8A-8G depict various implementations of operation 506, according to embodiments. Referring now to FIG. 8A, operation 506 may include operation 802 depicting updating the adaptation data, said updating at least partly based on a result of at least a portion of the speech-facilitated transaction. For example, FIG. 4, e.g., FIG. 4A, shows speech adaptation data modification partly based on result of portion of speech-facilitated transaction module 402 updating (e.g., modifying at least a part of, even if it is as little as changing the stored "last date used" in the adaptation data) the adaptation data (e.g., a sentence diagramming path selection algorithm), said updating at least partly based on a result (e.g., how quickly the target device was able to process the speech using the sentence diagramming path selection algorithm) of at least a portion of the speech-facilitated transaction (e.g., giving a speech command to an automated teller machine device).

Referring again to FIG. 8A, operation 506 may include operation 804 depicting determining not to update the adaptation data, said determination at least partly based on a result of at least a portion of the speech-facilitated transaction. For example, FIG. 4, e.g., FIG. 4A, shows speech adaptation data determining against modification partly based on result of portion of speech-facilitated transaction module 404 determining not to update the adaptation data (e.g., an uncommon word pronunciation guide), said determination at least partly based on a result (e.g., a user feedback indicating the user was "very pleased" with the transaction) of at least a portion of the speech-facilitated transaction (e.g., the user ordering a drink from an automated drink-dispensing machine device).

Referring again to FIG. 8A, operation 506 may include operation 806 depicting determining whether to update the adaptation data, said determination at least partly based on a result of a completed speech-facilitated transaction. For example, FIG. 4, e.g., FIG. 4A, shows speech adaptation data potential modification determining partly based on result of finished speech-facilitated transaction module 406 determining whether to update the adaptation data (e.g., a non-lexical vocable removal algorithm), said determination at least partly based on a result of a completed speech-facilitated transaction (e.g., the results of the completed transaction of interacting with a motor vehicle control system are transmitted to a remote server, and at a later date, the transaction is analyzed to determine how successful the algorithm was at removing non-lexical vocables).

Referring again to FIG. 8A, operation 506 may include operation 808 depicting determining whether to update the adaptation data, said determination at least partly based on a result of a beginning portion of the speech-facilitated transaction. For example, FIG. 4, e.g., FIG. 4A, shows speech adaptation data potential modification determining partly based on result of an initial portion of the speech-facilitated transaction module 408 determining whether to update the adaptation data (e.g., a speech disfluency detection algorithm), said determination at least partly based on a result of a beginning portion (e.g., a first two sentences of a transaction) of the speech-facilitated transaction (e.g., withdrawing money from a speech-enabled automated teller machine device).

Referring again to FIG. 8A, operation 506 may include operation 810 depicting determining whether to update the adaptation data, wherein the speech-facilitated transaction comprises a first sentence and a second sentence, and said determination occurs after the first sentence and prior to the second sentence. For example, FIG. 4, e.g., FIG. 4A, shows speech adaptation data potential modification determining partly based on a first sentence of the speech facilitated transaction occurring prior to a second sentence of the speech-facilitated transaction module 410 determining whether to update the adaptation data (e.g., a context-based repaired utterance processing matrix), wherein the speech-facilitated transaction (e.g., commanding the motor vehicle control system) comprises a first sentence (e.g., "play Norah Jones") and a second sentence (e.g., "increase volume to twenty-five"), and said determination occurs after the first sentence and prior to the second sentence.

Referring again to FIG. 8A, operation 506 may include operation 812 depicting determining whether to update the adaptation data, said determination made prior to completion of the speech-facilitated transaction. For example, FIG. 4, e.g., FIG. 4A, shows speech adaptation data potential modification determining partly based on result of portion of speech-facilitated transaction and made before the speech-facilitated transaction ends module 412 determining whether to update the adaptation data (e.g., a discourse marker detecting module), said determination made prior to completion of the speech-facilitated transaction (e.g., before a user completes his order at the automated drive-thru window).

Referring again to FIG. 8A, operation 506 may include operation 814 depicting determining whether to update the adaptation data, said determination made after at least one word is spoken in the speech-facilitated transaction. For example, FIG. 4, e.g., FIG. 4A, shows speech adaptation data potential modification determining partly based on result of a portion of speech-facilitated transaction after at least one word is spoken by the particular party module 414 determining whether to update the adaptation data (e.g., a part-of-speech labeling algorithm), said determination made after at least one word is spoken in the speech-facilitated transaction (e.g., dictating a memorandum to a computer configured to receive speech as input).

Referring again to FIG. 8A, operation 814 may include operation 816 depicting determining whether to update the adaptation data, said determination occurring prior to a particular word being spoken in the speech facilitated transaction. For example, FIG. 4, e.g., FIG. 4A, shows speech adaptation data potential modification determining partly based on result of portion of speech-facilitated transaction and made prior to a particular word module 416 determining whether to update the adaptation data (e.g., a partial pattern tree model), said determination occurring prior to a particular word being spoken in the speech-facilitated transaction (e.g., prior to the word "goodbye" in a transaction that will be ended with the word "goodbye").

Referring now to FIG. 8B, operation 506 may include operation 818 depicting receiving a result of at least a portion of the speech-facilitated transaction. For example, FIG. 4, e.g., FIG. 4B, shows portion of speech-facilitated transaction result acquiring module 418 receiving a result (e.g., an indication of whether interpretation of the portion of the transaction was successful, or how successful, or an estimate of how likely the device determines that the transaction was successful) of at least a portion (e.g., a first sentence spoken by the user and interpreted by the automated ticket dispensing device) of the speech-facilitated transaction (e.g., printing a plane ticket at the airport using a speech-enabled automated ticket dispensing device).

Referring again to FIG. 8B, operation 506 may include operation 820 depicting determining whether to update the adaptation data, said determination at least partly based on the received result. For example, FIG. 4, e.g., FIG. 4B, shows speech adaptation data potential modification determining partly based on acquired result module 420 determining whether to update the adaptation data (e.g., a latent dialogue act matrix), said determination at least partly based on the received result (e.g., the amount by which the latent dialogue act matrix will be modified is based on the received indication of how successful the portion of the transaction was).

Referring again to FIG. 8B, operation 818 may include operation 822 depicting receiving a result of at least a portion of the speech-facilitated transaction from the target device. For example, FIG. 4, e.g., FIG. 4B, shows portion of speech-facilitated transaction result acquiring from target device module 422 receiving a result (e.g., an estimate that the speech took seventy-two percent (72%) longer to complete than an average portion of the speech-facilitated transaction) of at least a portion of the speech-facilitated transaction (e.g., giving a command to a portable navigation system) from the target device (e.g., the portable navigation system sends the estimate).

Referring again to FIG. 8B, operation 818 may include operation 824 depicting receiving a result of at least a portion of the speech-facilitated transaction from the particular party. For example, FIG. 4, e.g., FIG. 4B, shows portion of speech-facilitated transaction result acquiring from particular party module 424 receiving a result (e.g., the transaction interpretation was graded "poor") of at least a portion of the speech-facilitated transaction (e.g., ordering a fountain soda from an automated drink preparing machine device) from the particular party (e.g., the user indicates that the transaction interpretation was "poor").

Referring again to FIG. 8B, operation 824 may include operation 826 depicting receiving a result of at least a portion of the speech-facilitated transaction from the particular party interacting with a particular device configured to manage the adaptation data. For example, FIG. 4, e.g., FIG. 4B, shows portion of speech-facilitated transaction result acquiring from particular device operated by particular party module 426 receiving a result of at least a portion of the speech-facilitated transaction (e.g., commanding a motor vehicle control system to lower the rear windows and open the sunroof) from the particular party interacting with a particular device (e.g., a smart key inserted into the car and configured to store, transmit, and receive adaptation data, and correlated to that particular driver) configured to manage the adaptation data (e.g., a word and/or syllable dependency parser).

Referring again to FIG. 8B, operation 826 may include operation 828 depicting receiving a result of at least a portion of the speech-facilitated transaction from the particular party pushing a button on the particular device configured to manage the adaptation data. For example, FIG. 4, e.g., FIG. 4B, shows portion of speech-facilitated transaction result acquiring at least partially as a result of a pushed button of the particular device module 428 receiving a result (e.g., an indicator that the speech-facilitated transaction is failing) of at least a portion of the speech-facilitated transaction from the particular party (e.g., the user) pushing a button (e.g., a button that says "press here if the device you are communicating with is having trouble processing your speech") on the particular device (e.g., the user's smartphone) configured to manage the adaptation data (e.g., the smartphone manages the user's adaptation data, e.g., an ungrammatical utterance deletion algorithm).

Referring again to FIG. 8B, operation 826 may include operation 830 depicting receiving a result of at least a portion of the speech-facilitated transaction from the particular party providing feedback to the particular device after an end of the speech-facilitated transaction. For example, FIG. 4, e.g., FIG. 4B, shows portion of speech-facilitated transaction feedback acquired from particular device operated by particular party module 430 receiving a result (e.g., a survey result in which the speech-facilitated transaction was rated 1 out of 5) of at least a portion of the speech-facilitated transaction (e.g. buying a train ticket at the train terminal) from the particular party (e.g., the user buying the ticket) providing feedback to the particular device (e.g., filling out a survey displayed on a screen of a cellular smartphone) after an end of the speech-facilitated transaction (e.g., the survey is sent to the cellular smartphone and taken by the user after the speech-facilitated transaction has concluded).

Referring again to FIG. 8B, operation 818 may include operation 832 depicting receiving an indication that the at least a portion of the speech-facilitated transaction was unsuccessful. For example, FIG. 4, e.g., FIG. 4B, shows portion of speech-facilitated transaction result indicating less than complete success of the transaction acquiring module 432 receiving an indication that the at least a portion of the speech-facilitated transaction was unsuccessful (e.g., receiving an indication that the first three sentences spoken by the user in the transaction were unable to be resolved into commands that the device understands).

Referring again to FIG. 8B, operation 832 may include operation 834 depicting receiving an indication that the at least a portion of the speech facilitated transaction was not successfully interpreted by the target device. For example, FIG. 4, e.g., FIG. 4B, shows portion of speech-facilitated transaction result indicating incomplete or low confidence level interpretation of portion of transaction acquiring module 434 receiving an indication that at the at least a portion of the speech-facilitated transaction (e.g., giving a command to decrease the ambient temperature in a house control system) was not successfully interpreted (e.g., the command failed) by the target device (e.g., an automated teller machine device).

Figure 8C:
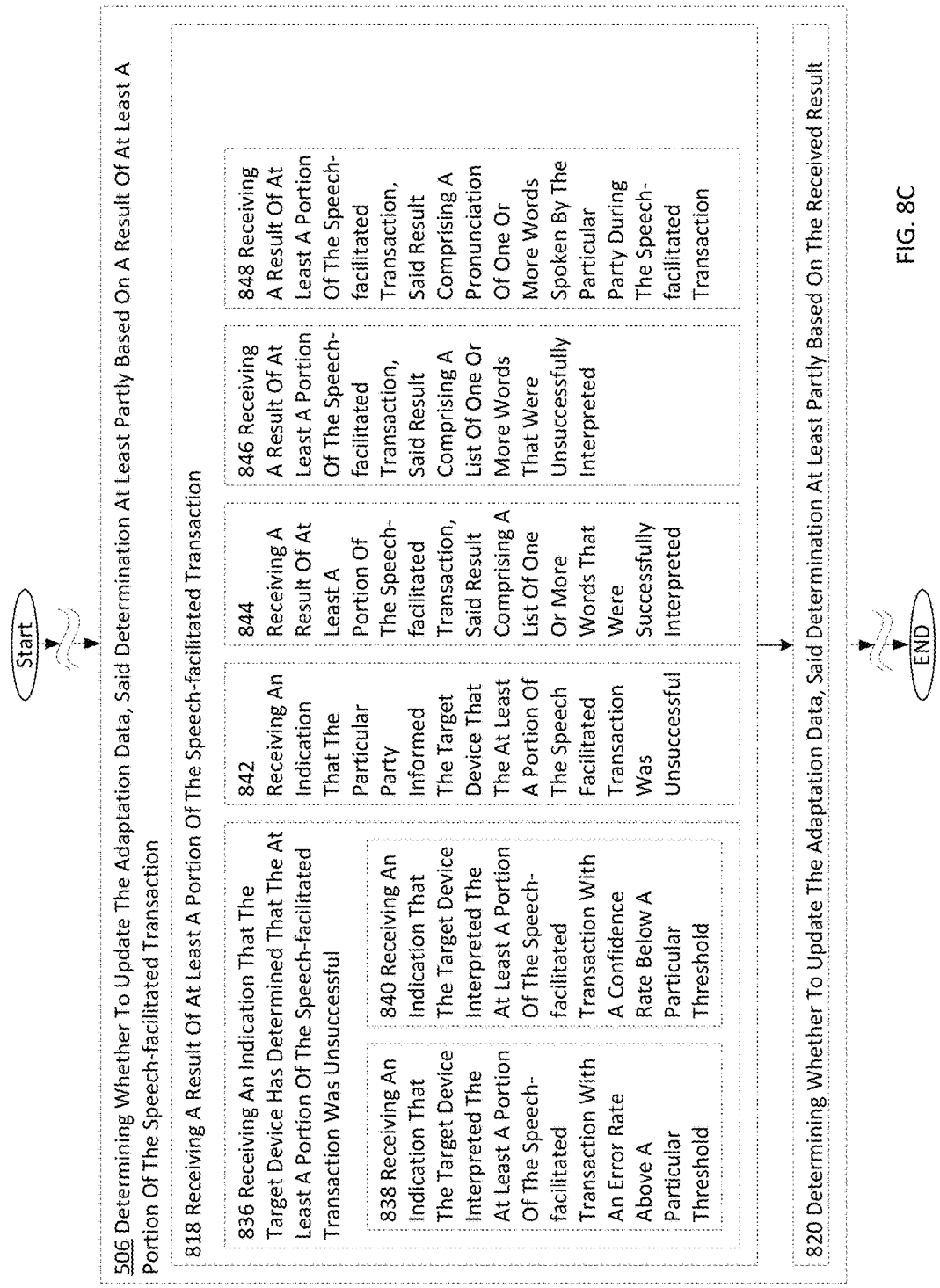
FIG. 8C is a high-level logic flowchart of a process depicting determining whether to update the adaptation data 506 of FIG. 5, according to one or more embodiments.

Referring now to FIG. 8C, operation 818 may include operation 836 depicting receiving an indication that the target device has determined that the at least a portion of the speech-facilitated transaction was unsuccessful. For example, FIG. 4, e.g., FIG. 4C, shows portion of speech-facilitated transaction result indicating failure of the target device to carry out at least a portion of the speech-facilitated transaction acquiring module 436 receiving an indication that the target device (e.g., the automated ticket dispensing device) has determined that the at least a portion of the speech-facilitated transaction (e.g., the first part of the transaction, in which the user is attempting to identify the city they want to travel to) was unsuccessful (e.g., the device was unable to pinpoint the city that was spoken by the user).

Referring again to FIG. 8C, operation 836 may include operation 838 depicting receiving an indication that the target device interpreted the at least a portion of the speech-facilitated transaction with an error rate above a particular threshold. For example, FIG. 4, e.g., FIG. 4C, shows portion of speech-facilitated transaction result indicating target-device determined error rate is above a threshold value acquiring module 436 receiving an indication that the target device (e.g., a speech-enabled copier device operating on an office enterprise network) interpreted the at least a portion of the speech-facilitated transaction (e.g., a command to change from "black and white" to "color") with an error rate above a particular threshold (e.g., it took four tries for the user's command to be understood).

Referring again to FIG. 8C, operation 836 may include operation 840 depicting receiving an indication that the target device interpreted the at least a portion of the speech-facilitated transaction with a confidence rate below a particular threshold. For example, FIG. 4, e.g., FIG. 4C, shows portion of speech-facilitated transaction result indicating target-device determined confidence rate is below a threshold value acquiring module 440 receiving an indication that the target device (e.g., a personal navigation system) interpreted the at least a portion of the speech-facilitated transaction (e.g., the name of the restaurant that the user is trying to find) with a confidence rate below a particular threshold (e.g., the confidence that the device identified the proper place is below twenty-five percent).

Referring again to FIG. 8C, operation 818 may include operation 842 depicting receiving an indication that the particular party informed the target device that the at least a portion of the speech facilitated transaction was unsuccessful. For example, FIG. 4, e.g., FIG. 4C, shows portion of speech-facilitated transaction result acquiring from particular party via target device module 442 receiving an indication that the particular party informed the target device (e.g., a speech-enabled automated teller machine device) that the at least a portion of the speech-facilitated transaction (e.g., the portion where the amount of money to be withdrawn is selected) was unsuccessful (e.g., the user presses a button indicating that none of the displayed amounts on the screen were the amount that the user stated).

Referring again to FIG. 8C, operation 818 may include operation 844 depicting receiving a result of at least a portion of the speech-facilitated transaction, said result comprising a list of one or more words that were successfully interpreted. For example, FIG. 4, e.g., FIG. 4C, shows portion of speech-facilitated transaction result including one or more interpreted words acquiring module 444 receiving a result (e.g., a list of one or more of the words that were part of the transaction and successfully interpreted of at least a portion of the speech-facilitated transaction (e.g., a portion of an order at an automated drive-thru window).

Referring again to FIG. 8C, operation 818 may include operation 846 depicting receiving a result of at least a portion of the speech-facilitated transaction, said result comprising a list of one or more words that were unsuccessfully interpreted. For example, FIG. 4, e.g., FIG. 4C, shows portion of speech-facilitated transaction result including one or more words not completely interpreted acquiring module 446 receiving a result (e.g., a data structure containing one or more unsuccessfully interpreted words such as "prima facie") of at least a portion (e.g., one paragraph of) of the speech-facilitated transaction (e.g., a user dictating a legal memorandum using speech to a speech-enabled computer device operating on a home network).

Referring again to FIG. 8C, operation 818 may include operation 848 depicting receiving a result of at least a portion of the speech-facilitated transaction, said result comprising a pronunciation of one or more words spoken by the particular party during the speech-facilitated transaction. For example, FIG. 4, e.g., FIG. 4C, shows portion of speech-facilitated transaction result including a representation of the particular party speaking one or more words of the speech-facilitated transaction acquiring module 448 receiving a result (e.g., a Waveform Audio File ("WAV") file of the user's pronunciation of one or more words that the device either could not interpret or that took more than one attempt to interpret) of at least a portion of the speech-facilitated transaction (e.g., giving a command to a home theater system) comprising a pronunciation of one or more words spoken by the particular party (e.g., the words "play the movie 'Inception'") during the speech-facilitated transaction (e.g., the transaction including several steps to set the home theater settings, e.g., turning the sound to surround sound, decreasing the brightness and contrast, and tuning the video input to the Blu-ray player).

Figure 8D:
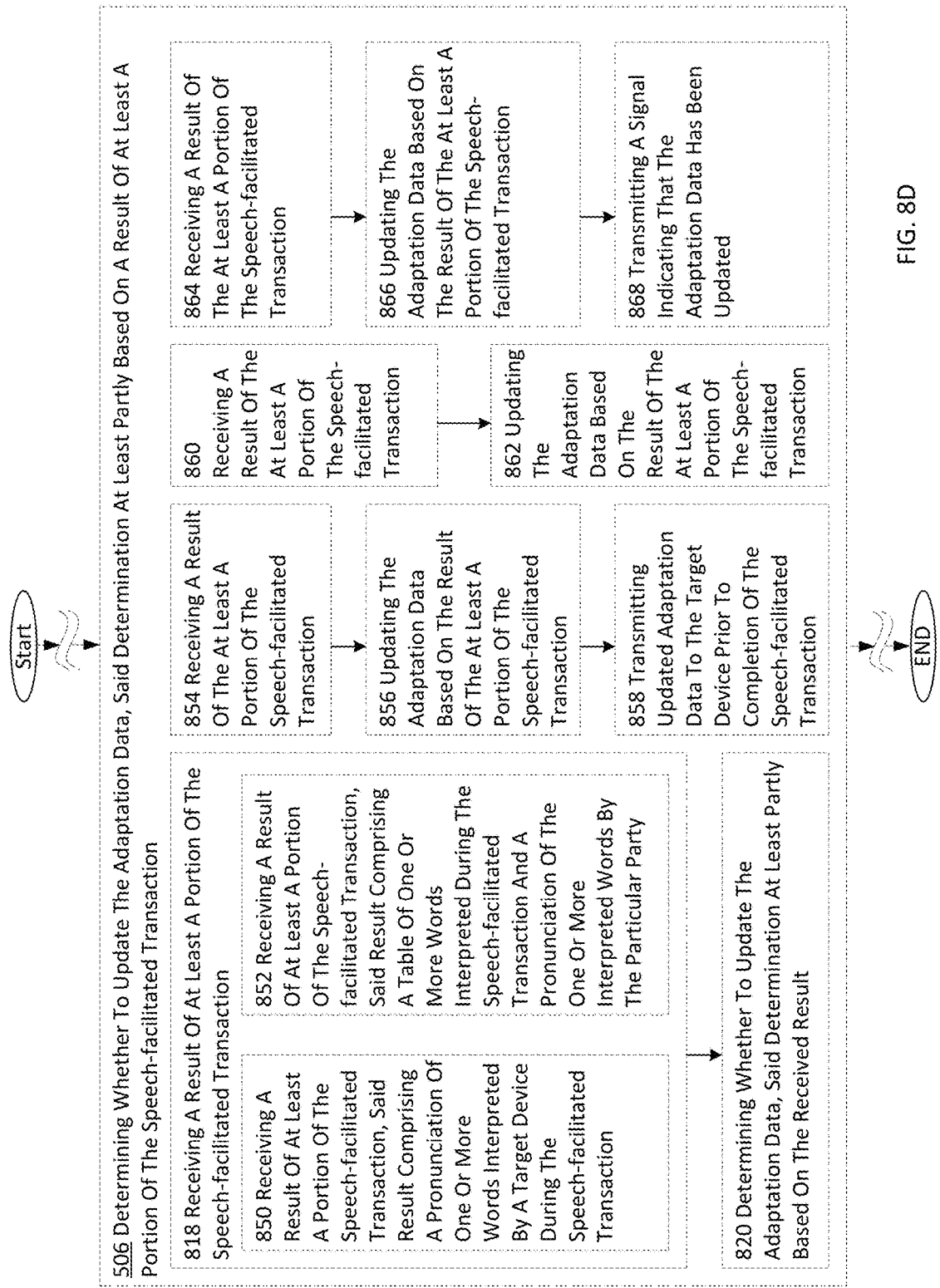
FIG. 8D is a high-level logic flowchart of a process depicting determining whether to update the adaptation data 506 of FIG. 5, according to one or more embodiments.

Referring now to FIG. 8D, operation 818 may include operation 850 depicting receiving a result of at least a portion of the speech-facilitated transaction, said result comprising a pronunciation of one or more words interpreted by a target device during the speech-facilitated transaction. For example, FIG. 4, e.g., FIG. 4D, shows portion of speech-facilitated transaction result including a representation of the target device interpreting one or more words of the speech-facilitated transaction acquiring module 450 receiving a result of at least a portion of the speech-facilitated transaction (e.g., giving a voice command to a speech-enabled television), said result comprising a pronunciation of one or more words (e.g., "power off") interpreted by a target device during the speech-facilitated transaction.

Referring again to FIG. 8D, operation 818 may include operation 852 depicting receiving a result of at least a portion of the speech-facilitated transaction, said result comprising a table of one or more words interpreted during the speech-facilitated transaction and a pronunciation of the one or more interpreted words by the particular party. For example, FIG. 4, e.g., FIG. 4D, shows portion of speech-facilitated transaction result including a data structure configured to store one or more interpreted words of the speech-facilitated transaction and one or more corresponding representations of pronunciations of the one or more interpreted words acquiring module 452 receiving a result of at least a portion of the speech-facilitated transaction, said result comprising a table of one or more words interpreted during the speech-facilitated transaction and a pronunciation of the one or more interpreted words by the particular party (e.g., the user).

Referring again to FIG. 8D, operation 506 may include operation 854 depicting receiving a result of the at least a portion of the speech-facilitated transaction. For example, FIG. 4, e.g., FIG. 4D, shows portion of speech-facilitated transaction at least a portion of result receiving module 454 receiving a result (e.g., an indication of success of the interpretation of the speech) of the at least a portion of the speech-facilitated transaction (e.g., giving a command through a microphone (e.g., in a headset) to a video game being played on a speech-enabled video game system).

Referring again to FIG. 8D, operation 506 may include operation 856 depicting updating the adaptation data based on the result of the at least a portion of the speech-facilitated transaction. For example, FIG. 4, e.g., FIG. 4D, shows speech adaptation data modifying at least partly based on received at least a portion of the result module 456 updating the adaptation data (e.g., a stochastic state transition network) based on the result of the at least a portion of the speech-facilitated transaction (e.g., giving a command through a microphone (e.g., in a headset) to a video game being played on a speech-enabled video game system).

Referring again to FIG. 8D, operation 506 may include operation 858 depicting transmitting updated adaptation data to the target device prior to completion of the speech-facilitated transaction. For example, FIG. 4, e.g., FIG. 4D, shows updated speech adaptation data transmitting before completion of speech-facilitated transaction module 458 transmitting updated adaptation data (e.g., a stochastic state transition network with at least one updated or changed state transition path) to the target device prior to completion of the speech-facilitated transaction (e.g., prior to the user giving the last command in a string of commands for that game).

Referring again to FIG. 8D, operation 506 may include operation 860 depicting receiving a result of the at least a portion of the speech-facilitated transaction. For example, FIG. 4, e.g., FIG. 4D, shows portion of speech-facilitated transaction result receiving module 456 receiving a result (e.g., an indication of whether the interpretation of the speech was successful) of the at least a portion of the speech-facilitated transaction (e.g., a portion of a user placing an order for a double cheeseburger, french fries, and an iced tea with an automated drive-thru window).

Referring again to FIG. 8D, operation 506 may include operation 862 depicting updating the adaptation data based on the result of the at least a portion of the speech-facilitated transaction. For example, FIG. 4, e.g., FIG. 4D, shows speech adaptation data modifying partly based on result module 458 updating the adaptation data (e.g., changing a pronunciation of one or more words in a pronunciation dictionary, e.g., the word "double") based on the result of the at least a portion of the speech-facilitated transaction (e.g., the first portion of the placing the order, where the user orders a "double cheeseburger").

Referring again to FIG. 8D, operation 506 may include operation 864 depicting receiving a result of the at least a portion of the speech-facilitated transaction. For example, FIG. 4, e.g., FIG. 4D, shows portion of speech-facilitated transaction at least a portion of result obtaining module 464 receiving a result (e.g., an indication of the target device's inference regarding whether the interpretation was successful) of the at least a portion of the speech-facilitated transaction (e.g., a user giving a command to an automated teller machine device).

Referring again to FIG. 8D, operation 506 may include operation 866 depicting updating the adaptation data based on the result of the at least a portion of the speech-facilitated transaction. For example, FIG. 4, e.g., FIG. 4D, shows speech adaptation data adapting at least partly based on received at least a portion of the result module 466 updating the adaptation data (e.g., a phoneme pronunciation database) based on the result (e.g., the inference made by the automated teller machine device regarding whether the interpretation was successful) of the at least a portion of the speech-facilitated transaction (e.g., the user giving a personal identification number ("PIN") to the automated teller machine device).

Referring again to FIG. 8D, operation 506 may include operation 868 depicting transmitting a signal indicating that the adaptation data has been updated. For example, FIG. 4, e.g., FIG. 4E, shows signal indicating adaptation of a speech adaptation data transmitting module 468 transmitting a signal indicating that the adaptation data (e.g., an utterance ignoring algorithm) has been updated (e.g., an additional utterance to ignore has been added to the algorithm).

Figure 8E:
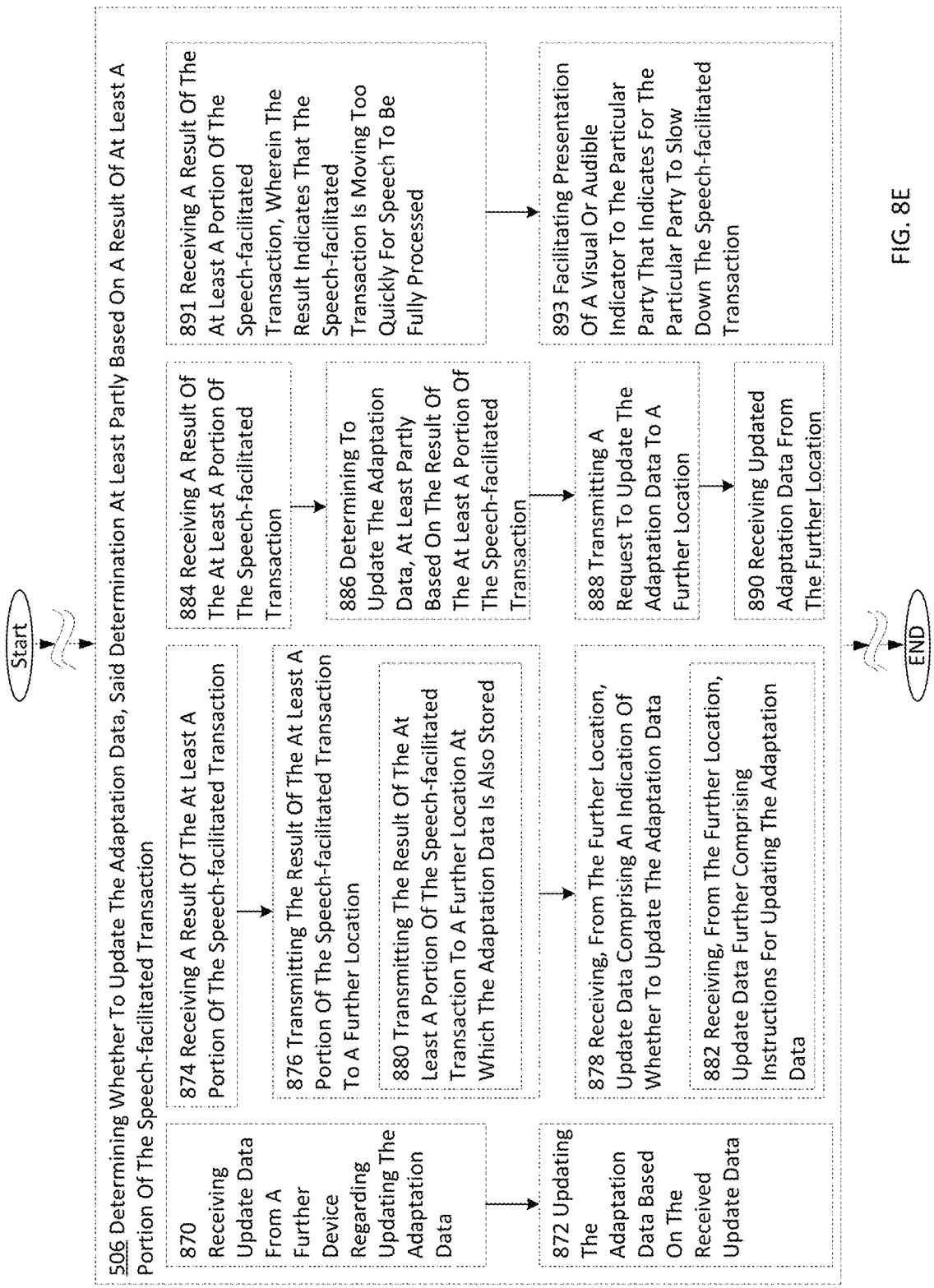
FIG. 8E is a high-level logic flowchart of a process depicting determining whether to update the adaptation data 506 of FIG. 5, according to one or more embodiments.

Referring now to FIG. 8E, operation 506 may include operation 870 depicting receiving update data from a further device regarding updating the adaptation data. For example, FIG. 4, e.g., FIG. 4E, shows potential modification data receiving from further device module 470 receiving update data (e.g., data indicating how to modify a pronunciation dictionary) from a further device (e.g., a remote server) regarding updating the adaptation data (e.g., regarding modifying a pronunciation of a word in the pronunciation dictionary).

Referring again to FIG. 8E, operation 506 may include operation 872 depicting updating the adaptation data based on the received update data. For example, FIG. 4, e.g., FIG. 4D, shows applying the potential modification data received from the further device to the speech adaptation data module 472 updating the adaptation data (e.g., modifying the pronunciation dictionary) based on the received update data (e.g., the data indicating how to modify a pronunciation dictionary).

Referring again to FIG. 8E, operation 506 may include operation 874 depicting receiving a result of the at least a portion of the speech-facilitated transaction. For example, FIG. 4, e.g., FIG. 4E, shows speech-facilitated transaction result portion receiving module 474 receiving a result of the at least a portion (e.g., one command given to a home theater system) of the speech-facilitated transaction (e.g., giving a series of commands to a home theater system).

Referring again to FIG. 8E, operation 506 may include operation 876 depicting transmitting the result of the at least a portion of the speech-facilitated transaction to a further location. For example, FIG. 4, e.g., FIG. 4E, shows speech-facilitated transaction result portion transmitting to device module 476 transmitting the result (e.g., the indication of whether the interpretation of the speech-facilitated transaction was successful) of the at least a portion of the speech-facilitated transaction (e.g., the one command given to the home theater system) to a further location (e.g., to a computer in the home that is networked to one or more of the devices of the home theater system).

Referring again to FIG. 8E, operation 506 may include operation 878 depicting receiving, from the further location, update data comprising an indication of whether to update the adaptation data. For example, FIG. 4, e.g., FIG. 4E, shows determination data indicating whether to modify the speech adaptation data receiving from device module 478 receiving, from the further location (e.g., the computer in the home networked to the one or more devices), update data comprising an indication of whether to update (e.g., whether to modify) the adaptation data (e.g., the phrase completion algorithm).

Referring again to FIG. 8E, operation 876 may include operation 880 depicting transmitting the result of the at least a portion of the speech-facilitated transaction to a further location at which the adaptation data is also stored. For example, FIG. 4, e.g., FIG. 4E, shows speech-facilitated transaction result portion transmitting to device that stores speech adaptation data module 480 transmitting the result (e.g., a numerical score indicating how efficiently the speech of the one command given to the home theater system was processed) of the at least a portion of the speech-facilitated transaction (e.g., the one command given to the home theater system) to a further location at which the adaptation data is also stored (e.g., a remote cloud server).

Referring again to FIG. 8E, operation 878 may include operation 882 depicting receiving, from the further location, update data further comprising instructions for updating the adaptation data. For example, FIG. 4, e.g., FIG. 4E, shows determination data instructing how to modify the speech adaptation data receiving from device module 482 receiving, from the further location (e.g., a dedicated computer for processing potential changes to adaptation data in an enterprise network setting), update data (e.g., instructions for modifying a phoneme database) comprising instructions for updating the adaptation data (e.g., the phoneme database).

Referring again to FIG. 8E, operation 506 may include operation 884 depicting receiving a result of the at least a portion of the speech-facilitated transaction. For example, FIG. 4, e.g., FIG. 4E, shows speech-facilitated transaction result portion reception module 484 receiving a result (e.g., a separate program operating on a computer and determining an effectiveness of the processing of speech done by the computer) of the at least a portion of the speech-facilitated transaction (e.g., carrying out a set of commands to customize an internet browser on a speech-enabled computer).

Referring again to FIG. 8E, operation 506 may include operation 886 depicting determining to update the adaptation data, at least partly based on the result of the at least a portion of the speech-facilitated transaction. For example, FIG. 4, e.g., FIG. 4E, shows speech adaptation data modification decision making partly based on speech-facilitated transaction result portion module 486 determining to update the adaptation data (e.g., a sentence diagramming path selection algorithm), at least partly based on the result of the at least a portion of the speech-facilitated transaction (e.g., the first command in the transaction to customize the browser, e.g., to load a customized home or start page).

Referring again to FIG. 8E, operation 506 may include operation 888 depicting transmitting a request to update the adaptation data to a further location. For example, FIG. 4, e.g., FIG. 4E, shows request to modify speech adaptation data transmitting to device module 488 transmitting a request to update the adaptation data (e.g., the sentence diagramming path selection algorithm) to a further location (e.g., to a remote server operated by the developer of the operating system on which the browser is running).

Referring again to FIG. 8E, operation 506 may include operation 890 depicting receiving updated adaptation data from the further location. For example, FIG. 4, e.g., FIG. 4E, shows modified adaptation data acquiring from device module 490 receiving updated adaptation data (e.g., a modified or changed sentence diagramming path selection algorithm) from the further location (e.g., from the remote server, which has modified the adaptation data based on many speech interactions of the user).

Referring again to FIG. 8E, operation 506 may include operation 891 depicting receiving a result of the at least a portion of the speech-facilitated transaction, wherein the result indicates that the speech-facilitated transaction is moving too quickly for speech to be fully processed. For example, FIG. 4, e.g., FIG. 4E, shows potential modification data indicating a request to slow down from device module 491 receiving a result of the at least a portion of the speech-facilitated transaction, wherein the result indicates that the speech-facilitated transaction is moving too quickly for speech to be fully processed (e.g., the speaker is talking too fast and the target device cannot keep up with the processing).

Referring again to FIG. 8E, operation 506 may include operation 893 depicting facilitating presentation of a visual or audible indicator to the particular party that indicates for the particular party to slow down the speech-facilitated transaction. For example, FIG. 4, e.g., FIG. 4E, shows presentation of indicator to slow down facilitating module 493 facilitating presentation (e.g., either at a particular device, e.g., a smartphone, that is associated with the user, or a device with which the user is having a speech-facilitated transaction, e.g., an automated drive-thru window) of a visual or audible indicator (e.g., a beeping sound, or a yellow or red light) to the particular party that indicates for the particular party to slow down (e.g., either stop speaking for an interval, or slow the cadence of the user's voice) the speech-facilitated transaction.

Figure 8F:
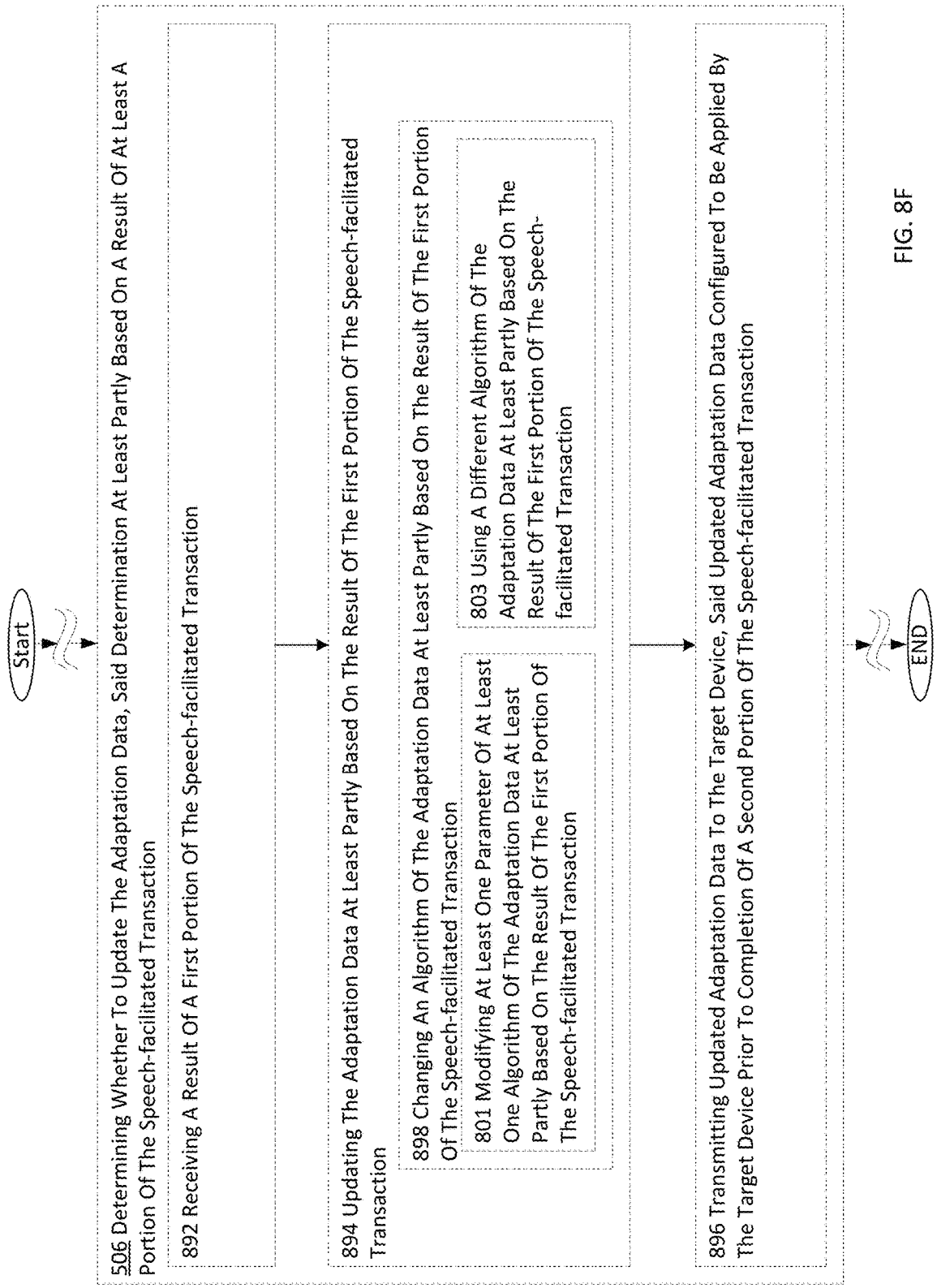
FIG. 8F is a high-level logic flowchart of a process depicting determining whether to update the adaptation data 506 of FIG. 5, according to one or more embodiments.

Referring now to FIG. 8F, operation 506 may include operation 892 depicting receiving a result of a first portion of the speech-facilitated transaction. For example, FIG. 4, e.g., FIG. 4F, shows result of particular portion of speech-facilitated transaction acquiring module 492 receiving a result of a first portion of the speech-facilitated transaction (e.g., a first sentence of interacting with an automated ticket dispenser, e.g., identifying yourself for security purposes).

Referring again to FIG. 8F, operation 506 may include operation 894 depicting updating the adaptation data at least partly based on the result of the first portion of the speech-facilitated transaction. For example, FIG. 4, e.g., FIG. 4F, shows speech adaptation data potential modification apply at least partly based on acquired result of the particular portion of speech-facilitated transaction 494 updating (e.g., changing one parameter of) the adaptation data (e.g., a regional dialect application algorithm) at least partly based on the result of the first portion of the speech-facilitated transaction (e.g., whether the device was able to efficiently identify the user and recognize the speech given to the device).

Referring again to FIG. 8F, operation 506 may include operation 896 depicting transmitting updated adaptation data to the target device, said updated adaptation data configured to be applied by the target device prior to completion of a second portion of the speech-facilitated transaction. For example, FIG. 4, e.g., FIG. 4F, shows modified speech adaptation data configured to be applied by the target device to a further portion of the speech-facilitated transaction transmitting module 496 transmitting updated adaptation data (e.g., the regional dialect application algorithm with the modified parameter) to the target device (e.g., the automated ticket dispenser), said updated adaptation data configured to be applied by the target device (e.g., the automated ticket dispenser) prior to completion of a second portion of the speech-facilitated transaction (e.g., the user giving her destination city information).

Referring again to FIG. 8F, operation 894 may include operation 898 depicting changing an algorithm of the adaptation data at least partly based on the result of the first portion of the speech-facilitated transaction. For example, FIG. 4, e.g., FIG. 4F, shows algorithm of speech adaptation data potential modification application at least partly based on acquired result of the particular portion of speech-facilitated transaction module 496 changing an algorithm (e.g., switching from a regional dialect application algorithm to an accent-based pronunciation modification algorithm) of the adaptation data at least partly based on the result of the first portion of the speech-facilitated transaction (e.g., the error rate of the first portion of the transaction was above twenty-five percent, which triggers the switching of an algorithm).

Referring again to FIG. 8F, operation 898 may include operation 801 depicting modifying at least one parameter of at least one algorithm of the adaptation data at least partly based on the result of the first portion of the speech-facilitated transaction. For example, FIG. 4, e.g., FIG. 4F, shows parameter of algorithm of speech adaptation data potential modification application at least partly based on acquired result of the particular portion of speech-facilitated transaction module 401 modifying at least one parameter of at least one algorithm (e.g., changing an amount of deamplification parameter of a noise level dependent filtration algorithm) of the adaptation data at least partly based on the result of the first portion of the speech-facilitated transaction (e.g., the result shows there were too many false positives of word fragments, so the parameter is adjusted).

Referring again to FIG. 8F, operation 896 may include operation 803 depicting using a different algorithm of the adaptation data at least partly based on the result of the first portion of the speech-facilitated transaction. For example, FIG. 4, e.g., FIG. 4F, shows different algorithm of speech adaptation data selecting at least partly based on acquired result of the particular portion of speech-facilitated transaction module 403 using a different algorithm of the adaptation data (e.g., switching from a non-lexical vocable removal algorithm to a speech disfluency detection algorithm) at least partly based on the result of the first portion of the speech-facilitated transaction (e.g., the result shows that the algorithm was not doing anything useful because no non-lexical vocables were detected).

Figure 8G:
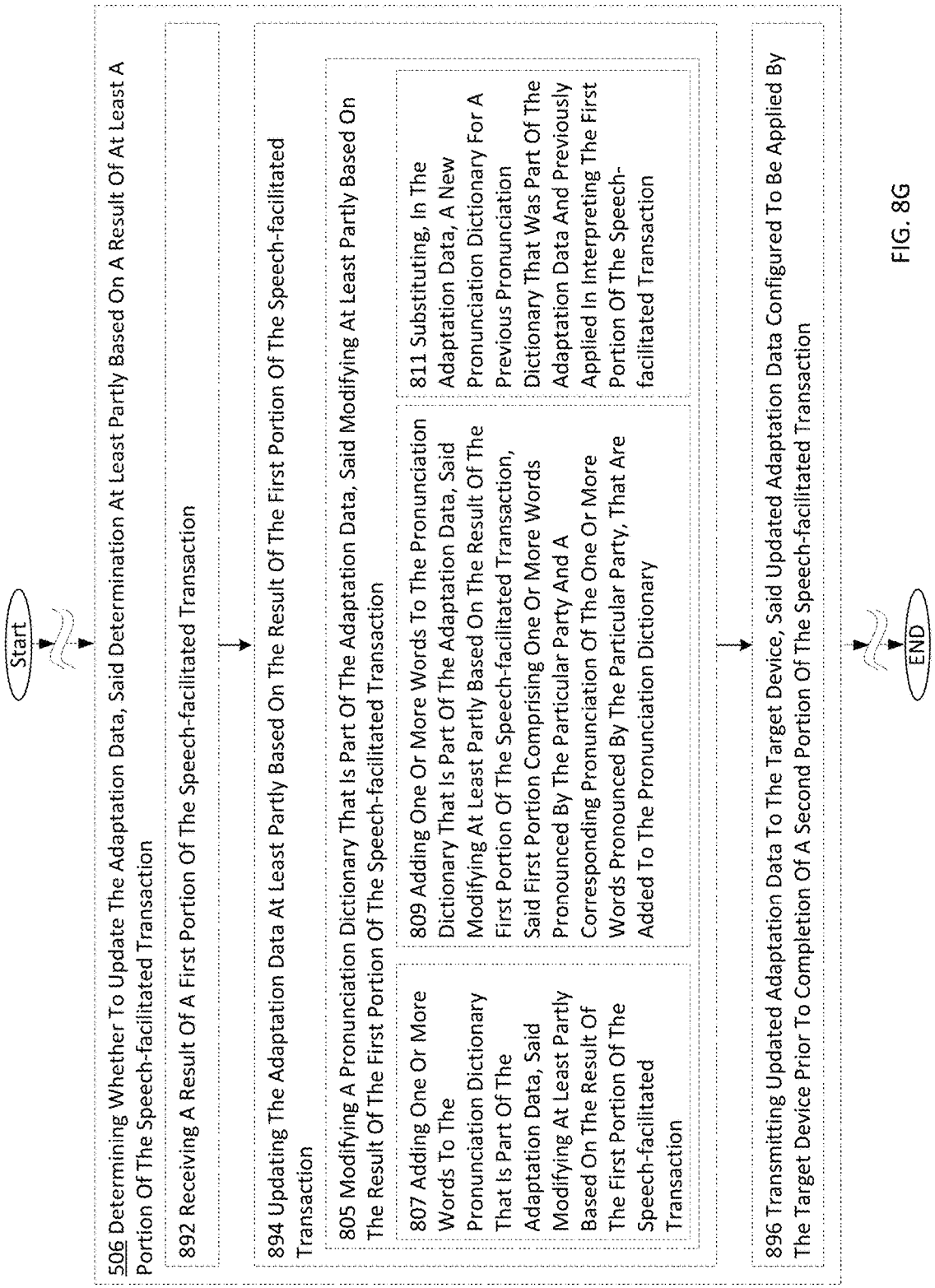
FIG. 8G is a high-level logic flowchart of a process depicting determining whether to update the adaptation data 506 of FIG. 5, according to one or more embodiments.

Referring now to FIG. 8G, operation 894 may include operation 805 depicting modifying a pronunciation dictionary that is part of the adaptation data, said modifying at least partly based on the result of the first portion of the speech-facilitated transaction. For example, FIG. 4, e.g., FIG. 4G, shows pronunciation dictionary potential modification application at least partly based on acquired result of the particular portion of speech-facilitated transaction module 405 modifying a pronunciation dictionary that is part of the adaptation data, said modifying at least partly based on the result of the first portion of the speech-facilitated transaction (e.g., the result includes a new way that the user pronounced the words "two hundred dollars" and so the pronunciation dictionary is updated to include this new pronunciation).

Referring again to FIG. 8G, operation 805 may include operation 807 depicting adding one or more words to the pronunciation dictionary that is part of the adaptation data, said modifying at least partly based on the result of the first portion of the speech-facilitated transaction. For example, FIG. 4, e.g., FIG. 4G, shows one or more word adding to pronunciation dictionary at least partly based on acquired result of the particular portion of speech-facilitated transaction module 807 adding one or more words (e.g., the words "Atlanta, Ga.") to the pronunciation dictionary that is part of the adaptation data, said modifying at least partly based on the result of the first portion of the speech-facilitated transaction (e.g., the result indicated that the target device, e.g., the personal navigation system, could not initially recognize when the user said "Atlanta, Ga.," so these words and the user's pronunciation were added to the adaptation data).

Referring again to FIG. 8G, operation 805 may include operation 809 depicting adding one or more words to the pronunciation dictionary that is part of the adaptation data, said modifying at least partly based on the result of the first portion of the speech-facilitated transaction, said first portion comprising one or more words pronounced by the particular party and a corresponding pronunciation of the one or more words pronounced by the particular party, that are added to the pronunciation dictionary. For example, FIG. 4, e.g., FIG. 4G, shows one or more word adding to pronunciation dictionary at least partly based on acquired result of the particular portion of speech-facilitated transaction that includes the one or more words module 809 adding one or more words to the pronunciation dictionary that is part of the adaptation data, said modifying at least partly based on the result of the first portion of the speech-facilitated transaction (e.g., the first portion is "entering the PIN" of a transaction of "withdrawing two hundred dollars from a checking account"), said first portion comprising one or more words pronounced by the particular party (e.g., "four," "seven," and "three") and a corresponding pronunciation of the one or more words pronounced by the particular party (e.g., the manner in which the user speaks the words "four," "seven," and "three"), that are added to the pronunciation dictionary.

Referring again to FIG. 8G, operation 805 may include operation 811 depicting substituting, in the adaptation data, a new pronunciation dictionary for a previous pronunciation dictionary that was part of the adaptation data and previously applied in interpreting the first portion of the speech-facilitated transaction. For example, FIG. 4, e.g., FIG. 4G, shows pronunciation dictionary substitution at least partly based on acquired result of the particular portion of speech-facilitated transaction module 811 substituting, in the adaptation data, a new pronunciation dictionary for a previous pronunciation dictionary that was part of the adaptation data and previously applied in interpreted in the first portion of the speech-facilitated transaction (e.g., the first part of an order at an automated drive-thru window).

Figure 8H:
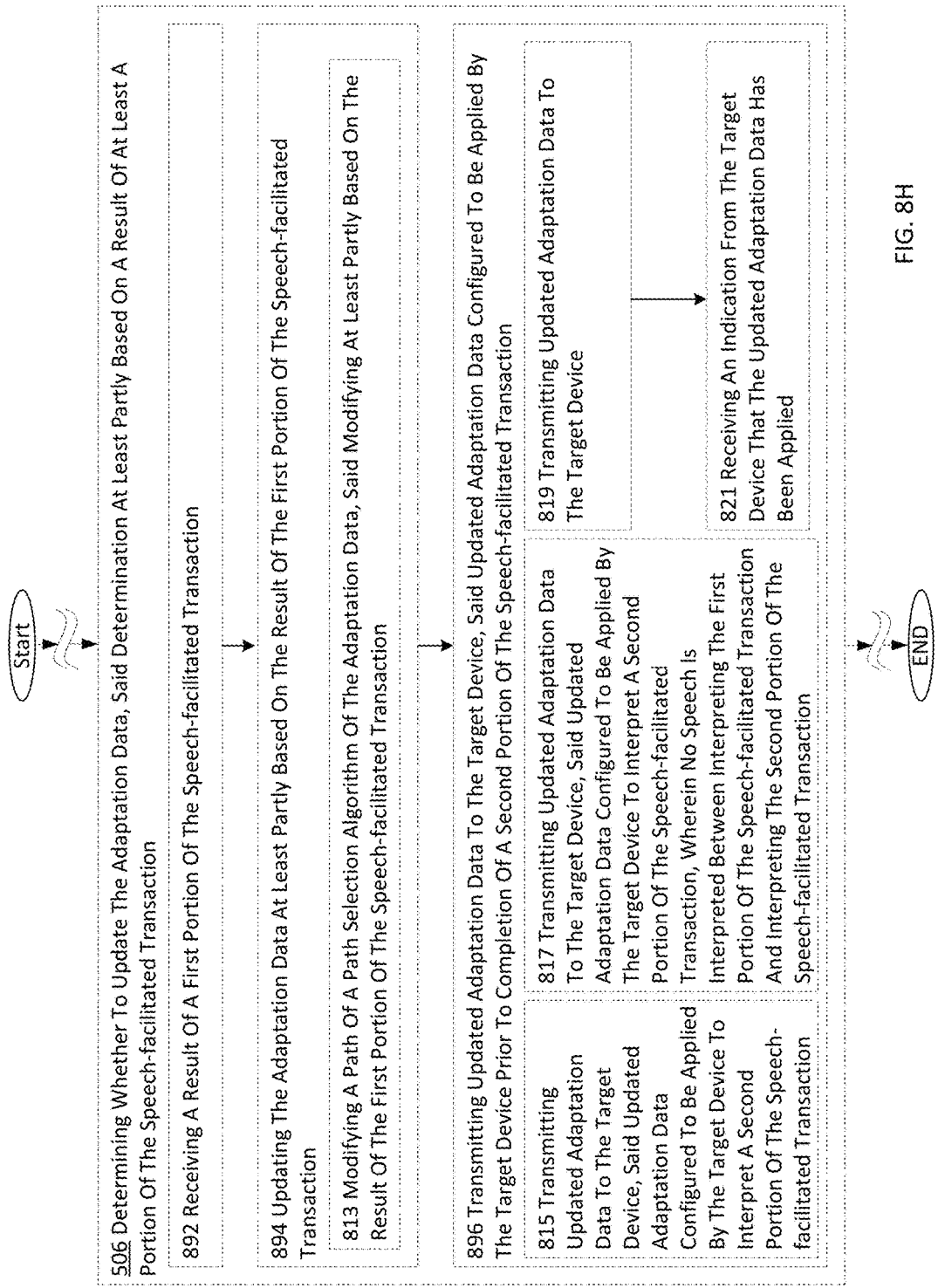
FIG. 8H is a high-level logic flowchart of a process depicting determining whether to update the adaptation data 506 of FIG. 5, according to one or more embodiments.

Referring now to FIG. 8H, operation 894 may include operation 813 depicting modifying a path of a path selection algorithm of the adaptation data, said modifying at least partly based on the result of the first portion of the speech-facilitated transaction. For example, FIG. 4, e.g., FIG. 4H, shows path of path selection algorithm potential modification application at least partly based on acquired result of the particular portion of speech-facilitated transaction module 413 modifying a path of a path selection algorithm of the adaptation data, said modifying at least partly based on the result of the first portion of the speech-facilitated transaction (e.g., the result indicating the success of the path selection algorithm as applied to the first part of a user interacting with a motor vehicle control system).

Referring again to FIG. 8H, operation 896 may include operation 815 depicting transmitting updated adaptation data to the target device, said updated adaptation data configured to be applied by the target device to interpret a second portion of the speech-facilitated transaction. For example, FIG. 4, e.g., FIG. 4H, shows modified speech adaptation data configured to be used to interpret a further portion of the speech-facilitated transaction transmitting module 415 transmitting updated adaptation data to the target device (e.g., an automated teller machine device), said updated adaptation data configured to be applied by the target device (e.g., the automated teller machine device) to interpret a second portion (e.g., indicating an amount of money to withdraw) of the speech-facilitated transaction (e.g., withdrawing two hundred dollars from a savings account).

Referring again to FIG. 8H, operation 896 may include operation 817 depicting transmitting updated adaptation data to the target device, said updated adaptation data configured to be applied by the target device to interpret a second portion of the speech-facilitated transaction, wherein no speech is interpreted between interpreting the first portion of the speech-facilitated transaction and interpreting the second portion of the speech-facilitated transaction. For example, FIG. 4, e.g., FIG. 4H, shows modified speech adaptation data configured to be used to interpret a further portion of the speech-facilitated transaction directly after interpreting the particular portion transmitting module 417 transmitting updated adaptation data to the target device (e.g., a computer configured to receive speech input), said updated adaptation data configured to be applied by the target device to interpret a second portion of the speech-facilitated transaction (e.g., a second paragraph of a dictated memorandum), wherein no speech is interpreted between interpreting the first portion of the speech-facilitated transaction (e.g., the first paragraph of the dictated memorandum) and interpreting the second portion of the speech-facilitated transaction.

Referring again to FIG. 8H, operation 896 may include operation 819 depicting transmitting updated adaptation data to the target device. For example, FIG. 4, e.g., FIG. 4H, shows modified speech adaptation data transmitting module 419 transmitting updated adaptation data (e.g., an updated part-of-speech labeling algorithm) to the target device (e.g., a speech-enabled media player).

Referring again to FIG. 8H, operation 896 may include operation 821 depicting receiving an indication from the target device that the updated adaptation data has been applied. For example, FIG. 4, e.g., FIG. 4H, shows indication of receipt of modified speech adaptation data receiving module 421 receiving an indication (e.g., receiving a signal transmitted from) from the target device (e.g., the speech-enabled media player) that the updated adaptation data has been applied (e.g., that the updated adaptation data has replaced the adaptation data, or the existing adaptation data has been modified as instructed by the updated adaptation data).

Figure 8I:
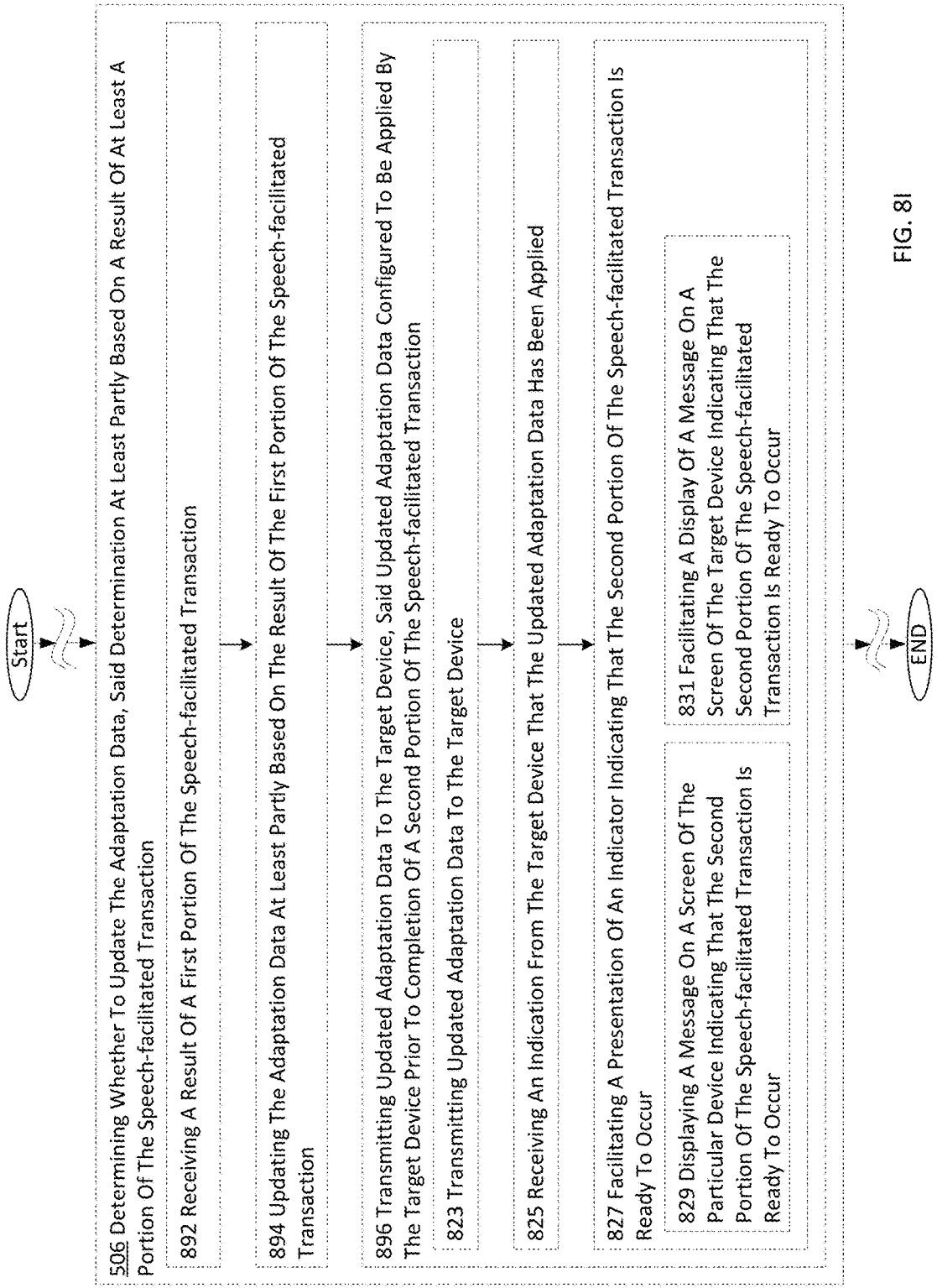
FIG. 8I is a high-level logic flowchart of a process depicting determining whether to update the adaptation data 506 of FIG. 5, according to one or more embodiments.

Referring now to FIG. 8I, operation 896 may include operation 823 depicting transmitting updated adaptation data to the target device. For example, FIG. 4, e.g., FIG. 4I, shows modified speech adaptation data transmitting module 423 transmitting updated adaptation data (e.g., a set of proper noun pronunciations, e.g., city names, that have been modified based on new user pronunciations) to the target device (e.g., a vehicle-based navigation system).

Referring again to FIG. 8I, operation 896 may include operation 825 depicting receiving an indication from the target device that the updated adaptation data has been applied. For example, FIG. 4, e.g., FIG. 4I, shows indication of application of modified speech adaptation data receiving module 425 receiving an indication (e.g., receiving data indicating successful application) from the target device (e.g., a vehicle-based navigation system) that the updated adaptation data (e.g., a set of proper noun pronunciations, e.g., city names, that have been modified based on new user pronunciations) has been applied.

Referring again to FIG. 8I, operation 896 may include operation 827 depicting facilitating a presentation of an indicator indicating that the second portion of the speech-facilitated transaction is ready to occur. For example, FIG. 4, e.g., FIG. 4I, shows indication of readiness to complete further portion of speech-facilitated transaction presenting module 427 facilitating a presentation (e.g., a visual indication, e.g., a light on the device is activated, or an audible beep is emitted) of an indicator indicating that the second portion of the speech-facilitated transaction is ready to occur (e.g., the user's cellular device beeps when the vehicle-based navigation system receives the updated adaptation data).

Referring again to FIG. 8I, operation 827 may include operation 829 depicting displaying a message on a screen of the particular device indicating that the second portion of the speech-facilitated transaction is ready to occur. For example, FIG. 4, e.g., FIG. 4I, shows message indicating readiness of further portion of speech-facilitated transaction displaying module 429 displaying a message (e.g. "continue speaking now") on a screen of the particular device (e.g., a user's universal remote control) indicating that the second portion of the speech-facilitated transaction (e.g., commanding a home theater system to play the movie "Inception") is ready to occur.

Referring again to FIG. 8I, operation 827 may include operation 831 depicting facilitating a display of a message on a screen of the target device indicating that the second portion of the speech-facilitated transaction is ready to occur. For example, FIG. 4, e.g., FIG. 4I, shows message indicating readiness of further portion of speech-facilitated transaction display on target device facilitating module 431 facilitating a display of a message on a screen of the target device (e.g., sending a signal to the automated drive-thru window that instructs the automated drive-thru window to display the words "please continue your order") indicating that the second portion of the speech-facilitated transaction (e.g., the second order of a double bacon cheeseburger and fries) is ready to occur.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A method implemented using at least one computer processor, the method comprising:
retrieving adaptation data, wherein the adaptation data is correlated to at least one aspect of speech of a particular party;
facilitating transmission of the adaptation data to a target device involved in a speech-facilitated transaction with the particular party; and
updating the adaptation data during the speech-facilitated transaction including at least:
receiving from the target device during the speech-facilitated transaction an indication that interpretation of speech data using the adaptation data has taken more than a specified amount of time,
obtaining one or more updates to the adaptation data at least partly in response to the indication that interpretation of the speech data using the adaptation data has taken more than the specified amount of time, and
facilitating transmission of the one or more updates to the target device prior to completion of the speech-facilitated transaction.

2. The method of claim 1, wherein said retrieving adaptation data, wherein the adaptation data is correlated to at least one aspect of speech of a particular party comprises:
retrieving adaptation data, wherein the adaptation data is correlated to at least one aspect of speech of a particular party and is derived from at least one previous speech-facilitated transaction involving the particular party.

3. The method of claim 1, wherein said retrieving adaptation data, wherein the adaptation data is correlated to at least one aspect of speech of a particular party comprises:
retrieving adaptation data, wherein the adaptation data includes data linking pronunciation of one or more phonemes of the particular party to one or more concepts.

4. The method of claim 1, further comprising:
obtaining a reference to a location of the adaptation data.

5. The method of claim 1, wherein said retrieving adaptation data, wherein the adaptation data is correlated to at least one aspect of speech of a particular party comprises:
retrieving adaptation data, wherein the adaptation data includes a pronunciation dictionary of the particular party.

6. The method of claim 1, wherein said retrieving adaptation data, wherein the adaptation data is correlated to at least one aspect of speech of a particular party comprises:
retrieving adaptation data, wherein the adaptation data includes a word frequency table that reflects word usage of the particular party.

7. The method of claim 1, wherein said facilitating transmission of the adaptation data to a target device involved in a speech-facilitated transaction with the particular party comprises:
facilitating transmission of the adaptation data to a target device in response to an indication that the particular party intends to conduct a speech-facilitated transaction with the target device.

8. The method of claim 7, wherein said facilitating transmission of the adaptation data to a target device in response to an indication that the particular party intends to conduct a speech-facilitated transaction with the target device comprises:
facilitating transmission of the adaptation data to a target device in response to an indication received from the target device that the particular party intends to conduct a speech-facilitated transaction with the target device.

9. The method of claim 1, wherein said facilitating transmission of the adaptation data to a target device involved in a speech-facilitated transaction with the particular party comprises:
facilitating transmission of the adaptation data to a target device in response to an indication that the particular party is speaking to the target device.

10. The method of claim 1, wherein said facilitating transmission of the adaptation data to a target device involved in a speech-facilitated transaction with the particular party comprises:
facilitating transmission of the adaptation data to a target device in response to an indication received from a device associated with the particular party of a speech-facilitated transaction of the particular party with the target device.

11. The method of claim 1, wherein said retrieving adaptation data, wherein the adaptation data is correlated to at least one aspect of speech of a particular party comprises:
retrieving adaptation data, wherein the adaptation data is correlated to an accent of the particular party.

12. The method of claim 1, wherein the facilitating transmission of the one or more updates to the target device prior to completion of the speech-facilitated transaction comprises:
facilitating transmission of the one or more updates to the target device prior to completion of the speech-facilitated transaction, in response to a request from the target device.

13. The method of claim 1, wherein said updating the adaptation data during the speech-facilitated transaction comprises:
updating the adaptation data during the speech-facilitated transaction after at least one word is spoken.

14. The method of claim 1, further comprising:
determining whether to update the adaptation data after an end of the speech-facilitated transaction at least partly based on a result of at least a portion of the speech-facilitated transaction.

15. The method of claim 1, wherein the receiving from the target device during the speech-facilitated transaction an indication that interpretation of speech data using the adaptation data has taken more than a specified amount of time comprises:
receiving from the target device during the speech-facilitated transaction an indication that interpretation of speech data using the adaptation data has taken more than a specified amount of time and an indication that at least a portion of the speech-facilitated transaction was unsuccessful.

16. The method of claim 15, wherein said receiving from the target device during the speech-facilitated transaction an indication that interpretation of speech data using the adaptation data has taken more than a specified amount of time and an indication that at least a portion of the speech-facilitated transaction was unsuccessful comprises:
receiving from the target device during the speech-facilitated transaction an indication that interpretation of speech data using the adaptation data has taken more than a specified amount of time and an indication that at least a portion of the speech data was unsuccessfully interpreted.

17. The method of claim 1, further comprising:
receiving an indication that at least a portion of the speech-facilitated transaction was unsuccessful.

18. The method of claim 17, wherein said receiving an indication that at least a portion of the speech-facilitated transaction was unsuccessful comprises:
  receiving an indication that the target device interpreted at least a portion of the speech-facilitated transaction with a confidence rate below a particular threshold.

19. The method of claim 1, further comprising:
  receiving a pronunciation of one or more words spoken by the particular party during the speech-facilitated transaction.

20. The method of claim 1, further comprising:
  receiving a table of one or more words interpreted during the speech-facilitated transaction and a pronunciation of the one or more words by the particular party.

21. The method of claim 1, further comprising:
  receiving the one or more updates from a further device; and
  updating the adaptation data based on the received update data.

22. The method of claim 1, further comprising:
  receiving an indication that the speech-facilitated transaction is moving too quickly for speech to be fully processed; and
  facilitating presentation of a visual or audible indicator that indicates for the particular party to slow speech.

23. The method of claim 1, further comprising:
  receiving a result of a first portion of the speech-facilitated transaction during the speech-facilitated transaction.

24. The method of claim 1, wherein said obtaining one or more updates to the adaptation data at least partly in response to the indication that interpretation of the speech data using the adaptation data has taken more than the specified amount of time comprises:
  changing an algorithm of the adaptation data at least partly in response to the indication that interpretation of the speech data using the adaptation data has taken more than the specified amount of time.

25. The method of claim 1, wherein said obtaining one or more updates to the adaptation data at least partly in response to the indication that interpretation of the speech data using the adaptation data has taken more than the specified amount of time comprises:
  modifying at least one parameter of at least one algorithm of the adaptation data at least partly in response to the indication that interpretation of the speech data using the adaptation data has taken more than the specified amount of time.

26. The method of claim 1, wherein the obtaining one or more updates to the adaptation data at least partly in response to the indication that interpretation of the speech data using the adaptation data has taken more than the specified amount of time comprises:
  modifying a pronunciation dictionary of the adaptation data at least partly in response to the indication that interpretation of the speech data using the adaptation data has taken more than the specified amount of time.

27. The method of claim 1, wherein the obtaining one or more updates to the adaptation data at least partly in response to the indication that interpretation of the speech data using the adaptation data has taken more than the specified amount of time comprises:
  adding one or more words to a pronunciation dictionary of the adaptation data at least partly in response to the indication that interpretation of the speech data using the adaptation data has taken more than the specified amount of time.

28. The method of claim 1, wherein the obtaining one or more updates to the adaptation data at least partly in response to the indication that interpretation of the speech data using the adaptation data has taken more than the specified amount of time comprises:
  substituting a pronunciation dictionary of the adaptation data at least partly in response to the indication that interpretation of the speech data using the adaptation data has taken more than the specified amount of time.

29. The method of claim 1, wherein the obtaining one or more updates to the adaptation data at least partly in response to the indication that interpretation of the speech data using the adaptation data has taken more than the specified amount of time comprises:
  modifying a path of a path selection algorithm of the adaptation data at least partly in response to the indication that interpretation of the speech data using the adaptation data has taken more than the specified amount of time.

30. A system comprising:
  means for retrieving adaptation data, wherein the adaptation data is correlated to at least one aspect of speech of a particular party;
  means for facilitating transmission of the adaptation data to a target device involved in a speech-facilitated transaction with the particular party; and
  means for updating the adaptation data during the speech-facilitated transaction including at least:
    receiving from the target device during the speech-facilitated transaction an indication that interpretation of speech data using the adaptation data has taken more than a specified amount of time,
    obtaining one or more updates to the adaptation data at least partly in response to the indication that interpretation of the speech data using the adaptation data has taken more than the specified amount of time, and
    facilitating transmission of the one or more updates to the target device prior to completion of the speech-facilitated transaction.

31. A system comprising:
  at least one computing device; and
  one or more instructions stored in media that program the at least one computing device to execute operations including at least:
  retrieving adaptation data, wherein the adaptation data is correlated to at least one aspect of speech of a particular party;
  facilitating transmission of the adaptation data to a target device involved in a speech-facilitated transaction with the particular party; and
  updating the adaptation data during the speech-facilitated transaction including at least:
    receiving from the target device during the speech-facilitated transaction an indication that interpretation of speech data using the adaptation data has taken more than a specified amount of time,
    obtaining one or more updates to the adaptation data at least partly in response to the indication that interpretation of the speech data using the adaptation data has taken more than the specified amount of time, and
    facilitating transmission of the one or more updates to the target device prior to completion of the speech-facilitated transaction.

32. The method of claim 1, wherein the retrieving adaptation data, wherein the adaptation data is correlated to at least one aspect of speech of a particular party comprises:
    retrieving adaptation data, wherein the adaptation data includes one or more pronunciation algorithms correlated to at least one aspect of speech of a particular party.

33. The method of claim 1, wherein the obtaining one or more updates to the adaptation data at least partly in response to the indication that interpretation of the speech data using the adaptation data has taken more than the specified amount of time comprises:
    changing a pronunciation algorithm of the adaptation data at least partly in response to the indication that interpretation of the speech data using the adaptation data has taken more than the specified amount of time and an error rate that is above a threshold amount.

34. The method of claim 1, wherein the facilitating transmission of the adaptation data to a target device involved in a speech-facilitated transaction with the particular party comprises:
    facilitating transmission of the adaptation data from a personal device associated with the particular party to a target device involved in a speech-facilitated transaction with the particular party.

35. The method of claim 1, wherein the obtaining one or more updates to the adaptation data at least partly in response to the indication that interpretation of the speech data using the adaptation data has taken more than the specified amount of time comprises:
    obtaining one or more updates to the adaptation data at least partly in response to the indication that interpretation of the speech data using the adaptation data has taken more than the specified amount of time and an indication that one or more words have been repeated a specified number of times.

36. The method of claim 1, wherein the obtaining one or more updates to the adaptation data at least partly in response to the indication that interpretation of the speech data using the adaptation data has taken more than the specified amount of time comprises:
    obtaining one or more updates to the adaptation data at least partly in response to the indication that interpretation of the speech data using the adaptation data has taken more than the specified amount of time and in response to a negative result of at least a portion of the speech-facilitated transaction.

37. The method of claim 1, wherein the obtaining one or more updates to the adaptation data at least partly in response to the indication that interpretation of the speech data using the adaptation data has taken more than the specified amount of time comprises:
    obtaining one or more updates to the adaptation data at least partly in response to the indication that interpretation of the speech data using the adaptation data has taken more than the specified amount of time and in response to a negative result of recognition of one specific word.

\* \* \* \* \*